US006868472B1

(12) United States Patent
Miyake et al.

(10) Patent No.: US 6,868,472 B1
(45) Date of Patent: Mar. 15, 2005

(54) METHOD OF CONTROLLING AND ADDRESSING A CACHE MEMORY WHICH ACTS AS A RANDOM ADDRESS MEMORY TO INCREASE AN ACCESS SPEED TO A MAIN MEMORY

(75) Inventors: Hideo Miyake, Kawasaki (JP); Atsuhiro Suga, Kawasaki (JP); Yasuki Nakamura, Kawasaki (JP); Teruhiko Kamigata, Kawasaki (JP); Hitoshi Yoda, Kawasaki (JP); Hiroshi Okano, Kawasaki (JP); Yoshio Hirose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/671,117

(22) Filed: Sep. 28, 2000

(30) Foreign Application Priority Data

Oct. 1, 1999 (JP) .......................................... 11-281958
Nov. 1, 1999 (JP) .......................................... 11-311455
Dec. 6, 1999 (JP) .......................................... 11-345824

(51) Int. Cl.[7] ............................................. G06F 12/00
(52) U.S. Cl. ............................... 711/3; 711/2; 711/118; 711/154; 711/216; 711/170
(58) Field of Search ................................. 711/3, 2, 118, 711/154, 216, 170, 173, 144, 145, 156, 158, 163, 138, 133

(56) References Cited

U.S. PATENT DOCUMENTS

| 5,353,425 | A | * | 10/1994 | Malamy et al. ............. 711/136 |
| 5,410,669 | A | * | 4/1995 | Biggs et al. ................ 711/118 |
| 5,574,922 | A | * | 11/1996 | James ....................... 712/220 |
| 5,822,764 | A | * | 10/1998 | Hardage et al. ............ 711/145 |
| 5,913,224 | A | * | 6/1999 | MacDonald ................ 711/125 |
| 6,092,151 | A | * | 7/2000 | Park .......................... 711/118 |
| 6,092,159 | A | * | 7/2000 | Ekner et al. ................ 711/152 |
| 6,148,370 | A | * | 11/2000 | Kobayashi .................. 711/118 |
| 6,230,230 | B1 | * | 5/2001 | Joy et al. ................... 710/200 |
| 6,446,181 | B1 | * | 9/2002 | Ramagopal et al. ........ 711/168 |
| 6,606,686 | B1 | * | 8/2003 | Agarwala et al. ........... 711/129 |

FOREIGN PATENT DOCUMENTS

| EP | 0 568 221 | 4/1993 |
| EP | 0 927 936 | 7/1999 |
| GB | 2 284 911 | 6/1995 |
| JP | 5-334189 | 12/1993 |
| JP | 9-325913 | 12/1997 |

OTHER PUBLICATIONS

Weissberger, "On–Chip Cache Memory Gives $\mu$Ps a Gib-–System Look", Electronic Design, vol. 31, No. 21, Oct. 1983, pp. 133–139, Penton Publishing, Cleveland, OH.

* cited by examiner

*Primary Examiner*—Hong Kim
(74) *Attorney, Agent, or Firm*—Staas & Halsey LLP

(57) ABSTRACT

In a cache memory control method and computer of the present invention, a cache memory is connected to a main memory and divided into a plurality of cache blocks, and a lock/unlock signal is supplied to the cache memory to either set a replace-inhibition state of at least one of the cache blocks in which replacing at least one of the cache blocks to the main memory is inhibited, or reset the replace-inhibition state of at least one of the cache clocks such that replacing at least one of the cache block to the main memory is allowed. Either reading or writing of the main memory is performed by using the remaining cache blocks of the cache memory, other than the at least one of the cache blocks, such that, when the replace-inhibition state is set by the lock/unlock signal, replacing the at least one of the cache blocks to the main memory is inhibited during the reading or writing of the main memory.

6 Claims, 40 Drawing Sheets

FIG. 33

| OP-CODE | AD | SIZE | FORCE |

FIG. 34

| OP-CODE | AD | REG |

METHOD OF CONTROLLING AND ADDRESSING A CACHE MEMORY WHICH ACTS AS A RANDOM ADDRESS MEMORY TO INCREASE AN ACCESS SPEED TO A MAIN MEMORY

BACKGROUND OF THE INVENTION

1. Field of the Invention

The present invention generally relates to computers, and more particularly to a method of controlling a cache memory, and a computer using the cache memory control method.

2. Description of the Related Art

Generally, a control method that effectively controls a cache memory so as to increase the access speed of a computer to the main memory is known. The fundamental principle that makes a cache memory effective is essentially the same principle that constructs virtual memory, namely "locality of reference". In the control method, the cache memory is used to suitably construct the referential locality.

The referential locality is the foundation of cache (and virtual memory) design. If cache blocks or lines are very close to each other, they can be accessed very quickly. Also, if there are a small number of cache blocks, it is easy to recognize and access the next cache block needed. If there are a large number of cache blocks, both the access time and the addressing time (i.e., time to find the right one) become much longer and make the task less efficient.

The principle of referential locality concerning a cache memory is ordinarily divided according to the basis of locality into two major categories: spatial locality (locality in space) and temporal locality (locality in time). The former one means that, if cache blocks are very close to each other, one of the cache blocks is subsequently accessed with a high probability after another adjacent cache block was accessed. The latter means that, if a certain cache block is accessed once, the cache block will be accessed two or more times with a high probability.

A description will now be given of several conventional designs of cache computers.

FIG. 1 shows a configuration of a conventional direct-mapped cache computer. In the direct-mapped cache computer, there are two types of cache computer: write-through type and write-back type. In the write-through type, the data of the cache memory is rewritten at the same time as the data of the main memory is renewed. In the write-back type, the data of the cache memory is first rewritten, and subsequently the data contained in the cache blocks is written back to the main memory so that the data of the main memory is renewed.

As shown in FIG. 1, the conventional direct-mapped cache computer generally comprises a CPU 1, a cache memory 3 connected to the CPU 1, and a main memory 5 connected to the cache memory 3. The cache memory 3 includes an address register 7, a comparator 9, a control unit 11, a data register 13, and a data storage portion 10 having cache blocks #0 through #n.

In the cache computer of FIG. 1, the address register 7 is connected to the CPU 1, and this address register 7 holds an address signal supplied by the CPU 1. The data register 13 is connected to both the control unit 10 and the CPU 1, and this data register 13 holds a read data sent to the CPU 1, a writing data sent from the CPU 1, a read data sent from the control unit 11 and a writing data sent to the data storage portion 10.

The data storage portion 10 is constituted by a plurality of cache blocks #0 through #n. Each cache block includes a tag (TAG), a validity flag (V), and a cache block data (DATA). In a case of the write-back type cache computer, each cache block further includes a modification flag (M) as shown in FIG. 1.

The tag contains a subset of main memory address that identifies a cached data of a cache block in the cache memory. The validity flag V is reset to zero (V=0) when the cache block is invalid, and set to one (V=1) when the cache block is valid. The modification flag M, in the case of the write-back type, is reset to zero (M=0) when the cache block is not written back to the main memory (non-replacement or non-modification), and set to one (M=1) when the cache block is written back to the main memory (replacement or modification).

The cache blocks #0 through #n of the data storage portion 10 retain respective data blocks of a cache block data supplied from the main memory 5. The comparator 9 compares the address signal, supplied by the CPU 1 via the address register 7, with the tag (TAG) of the data storage portion 10. When the validity flag V of the cache block is equal to zero (V=0), it is always determined that the address signal does not match with the tag of that cache block.

In the cache computer of FIG. 1, the control unit 11 controls an operation of the cache memory 3 to read an instruction sent by the CPU 1.

FIG. 2 shows a configuration of the control unit 11 in the conventional direct-mapped cache computer of FIG. 1.

As shown in FIG. 2, the control unit 11 generally includes a decoder 30, a read control unit (RD CNTL) 31, and a write control unit (WR CNTL) 32. The decoder 30 decodes an instruction signal supplied by the CPU 1. The write control unit 32 is connected to the decoder 30 and controls the writing of data to the data storage portion 10 and the main memory 5. The read control unit 31 is connected to the decoder 30 and controls the reading of data from the data storage portion 10 and the main memory 5.

In the control unit 11 of FIG. 2, when the reading of data is performed by the CPU 1, the comparator 9 compares the address signal, supplied by the CPU 1, with the tag TAG of each of the cache blocks of the cache memory 3, the validity flag (V) of which is set to one. When a match between the address and the tag of the data storage portion 10 (or a cache hit) takes place, the comparator 9 outputs a signal indicating the match, to the read control unit 31 and the write control unit 32. In accordance with the block address supplied by the address register 7, the read control unit 31 reads out the cache block data (DATA) from the data storage portion 10. The read control unit 31 sends the data (DATA), read from the data storage portion 10, to the CPU 1 via the data register 13.

When a cache miss between the address and the tag of the data storage portion 10 takes place (or there is no match), the comparator 9 outputs a signal indicating the non-match, to the read control unit 31 and the write control unit 32. A location of the main memory 5 for replacement is determined by the read control unit 31 and the write control unit 32 by using the block address supplied by the address register 7. The read control unit 31 reads out the data (DATA) from the location of the main memory 5. The write control unit 32 writes the read data (DATA) to the cache block of the data storage portion 10, and sets the validity flag V of the cache block.

In the case of the write-back type cache computer, when the modification flag M of the cache block at that time is set to one, the read control unit 31 writes the cache block data (DATA) of that cache block of the data storage portion 10 back to the main memory 5. Thereafter, the modification flag M is reset to zero, and a new data is written to that cache block of the data storage portion 10. Further, the new data that is written to the cache block of the cache memory 3 is supplied to the CPU 1.

Further, in the control unit 11 of FIG. 2, when the writing of data is performed by the CPU 1, the comparator 9 compares the address signal, supplied by the CPU 1, with the tag TAG of each of the cache blocks of the cache memory 3, the validity flag (V) of which is set to one. When a match between the address and the tag of the data storage portion 10 (or a cache hit) takes place, the write control unit 32 writes the writing data, supplied by the CPU 1, to the cache block of the data storage portion 10 in accordance with the block address supplied by the address register 7. In the case of the write-back type cache computer, the modification flag M of the cache block is set to one at that time.

On the other than, when a cache miss between the address and the tag of the data storage portion 10 takes place (or there is no match), the write control unit 32 writes the writing data, supplied by the CPU 1, to the main memory 5.

Next, FIG. 3 shows a configuration of a conventional fully associative cache computer. Similar to the direct-mapped cache computer, in the fully associative cache computer, there are also two types of computer design: the write-through design and the write-back design.

As shown in FIG. 3, the conventional fully associative computer generally comprises a CPU 1, a cache memory 3A connected to the CPU 1, and a main memory 5 connected to the cache memory 3A. The cache memory 3A includes an address register 14, a plurality of comparators 15, 17, 19 and 20, a control unit 23, a data register 21, and a plurality of cache blocks #0 through #n.

FIG. 4 shows a configuration of the control unit 23 in the conventional fully associative cache computer of FIG. 3.

As shown in FIG. 4, the control unit 23 generally includes a block address calculating unit (BL ADDR CALC) 33A, an OR gate 34A, a decoder 30A, a read control unit (RD CNTL) 31A, and a write control unit (WR CNTL) 32A. The block address calculating unit 33A is connected to the respective comparators 15, 17, 19 and 20, and the values of the validity flags (V) of the cache blocks #0 through #n are supplied from the respective comparators 15, 17, 19 and 20 to the block address calculating unit 33A. Further, the values of the validity flags (V) of the cache blocks #0 through #n are supplied to the OR gate 34A.

The decoder 30A is connected to the CPU 1 and decodes an instruction signal supplied by the CPU 1. The write control unit 32A is connected to the decoder 30A, the block address calculating unit 33A and the OR gate 34A, and controls the writing of data to the cache blocks #0 through #n and to the main memory 5. The read control unit 31A is connected to the decoder 30A, the block address calculating unit 33A and the Or gate 34A, and controls the reading of data from the cache blocks #0 through #n and from the main memory 5.

The read/write operations of the control unit 23 of FIG. 4 are similar to those of the control unit 11 of FIG. 2. In the control unit 23 of FIG. 4, the read control unit 31A and the write control unit 32A are configured to select any of the cache blocks #0 through #n that are subjected to the reading or the writing, in accordance with both the cache block address signal (CBA) supplied by the block address calculating unit 33A and the signal supplied by the OR gate 34A.

When a cache miss between the address signal and the tags of the cache blocks #0 through #n takes place (or there is no match) during the writing operation of the CPU 1, the location of the cache blocks #0 through #n for replacement is determined by the read control unit 31A and the write control unit 32A by using the block address supplied by the address register 14. The validity flag V of the cache block determined is set to one. The write control unit 32A writes the writing data, supplied by the CPI 1, to both the determined cache block of the cache memory 3A and the main memory 5.

In the case of the write-back type cache computer, when the modification flag (M) of the cache block is set to one during the reading operation of the CPU 1, the read control unit 31 writes the cache block data (DATA) of that cache block of the cache memory 3A back to the main memory 5. Thereafter, the modification flag (M) is reset to zero, and a new data is written to that cache block of the cache memory 3A.

FIG. 5 shows a configuration of a conventional 2-way set-associative cache computer.

Similar to the cache computer of FIG. 1, the conventional 2-way set-associative cache computer of FIG. 5 generally comprises a CPU 1, a cache memory 3B connected to the CPU 1, and a main memory 5 connected to the cache memory 3B. The cache memory 3B includes an address register 14, a comparator 9A, a comparator 9B, a control unit 23B, a data register 21, a pair of data storage portions 10A and 10B (the two ways) each including a plurality of cache blocks #0 through #n.

FIG. 6 shows a configuration of the control unit 23B in the conventional 2-way set-associative cache computer of FIG. 5.

As shown in FIG. 6, the control unit 23B generally includes a block address calculating unit (BL ADDR CALC) 33B, an OR gate 34B, a decoder 30B, a read control unit (RD CNTL) 31B, and a write control unit (WR CNTL) 32B. The block address calculating unit 33B is connected to both the comparators 9A and 9B, and the values of the validity flags (V) of the cache blocks #0 through #n of each of the data storage portions 10A and 10B are supplied from the comparators 9A and 9B to the block address calculating unit 33B. Further, the values of the validity flags (V) of the cache blocks #0 through #n of each of the data storage portions 10A and 10B are supplied to the OR gate 34B.

The decoder 30B is connected to the CPU 1 and decodes an instruction signal supplied by the CPU 1. The write control unit 32B is connected to the decoder 30B, the block address calculating unit 33B and the OR gate 34B, and controls the writing of data to the cache blocks #0 through #n of each of the data storage portions 10A and 10B and to the main memory 5. The read control unit 31B is connected to the decoder 30B, the block address calculating unit 33B and the Or gate 34B, and controls the reading of data from the cache blocks #0 through #n of each of the data storage portions 10A and 10B and from the main memory 5.

The read/write operations of the control unit 23B of FIG. 6 are similar to those of the control unit 11 of FIG. 2. In the control unit 23B of FIG. 6, the read control unit 31B and the write control unit 32B are configured to select any of the cache blocks #0 through #n that are subjected to the reading or the writing, in accordance with both the cache block address signal (CBA) supplied by the block address calculating unit 33B and the signal supplied by the OR gate 34B.

In the case of the write-back type cache computer, when the writing of data is performed by the CPU 1, the write control unit 32B writes the writing data, supplied by the CPU 1, to only the cache block of the cache memory 3B for replacement. In the case of the write-back type cache computer, only the cache memory 3B is first written to. Thereafter, the data of the cache blocks in each of the data storage portions 10A and 10B for replacement are written back to the main memory 5 so that the main memory 5 is renewed.

The above-described cache computers are designed to increase the access speed of the CPU 1 to the main memory 5 by using the cache memory. However, when a program of asynchronous data processing, such as external interrupt processing, or a program of multimedia processing that requires the data processing of various types of signals is executed by the CPU 1, it is not expected that the above-described cache computers achieve an adequate level of the referential locality by using the cache memory. It is difficult for the above-described cache computers to sufficiently increase the access speed of the CPU 1 to the main memory 5 when the program of asynchronous data processing or the program of multimedia processing is executed by the CPU 1.

SUMMARY OF THE INVENTION

In order to overcome the problems described above, preferred embodiments of the present invention provide an improved cache memory control method as well as a computer using the improved cache memory control method, which effectively increases the access speed of the CPU to the main memory even when a program with which it is not expected to suitably construct the referential locality is executed by the CPU.

According to one preferred embodiment of the present invention, a method of controlling a cache memory connected to a main memory and divided into a plurality of cache blocks, which is executed by a computer that accesses the main memory through the cache memory, comprises the steps of: supplying a lock/unlock signal to the cache memory to either set a replace-inhibition state of at least one of the cache blocks in which replacing at least one of the cache blocks to the main memory is inhibited, or reset the replace-inhibition state of at least one of the cache clocks such that replacing at least one of the cache block to the main memory is allowed; and performing either reading or writing of the main memory by using the remaining cache blocks of the cache memory, other than the at least one of the cache blocks, such that, when the replace-inhibition state is set by the lock/unlock signal, replacing the at least one of the cache blocks to the main memory is inhibited during the reading or writing of the main memory.

In the cache memory control method of the above preferred embodiment of the invention, the lock/unlock signal is supplied to the cache memory to either set a replace-inhibition state of at least one of the cache blocks in which replacing at least one of the cache blocks to the main memory is inhibited, or reset the replace-inhibition state of at least one of the cache clocks such that replacing at least one of the cache block to the main memory is allowed. The cache memory control method of the above preferred embodiment is effective in increasing the access speed of the CPU to the main memory even when a program with which it is not expected to suitably construct the referential locality is executed by the CPU.

According to one preferred embodiment of the present invention, a computer including a main memory and a cache memory, the cache memory being connected to the main memory and divided into a plurality of cache blocks, comprises: a block state setting unit which supplies a lock/unlock signal to the cache memory to either set a replace-inhibition state of at least one of the cache blocks in which replacing at least one of the cache blocks to the main memory is inhibited, or reset the replace-inhibition state of at least one of the cache clocks such that replacing the at least one of the cache block to the main memory is allowed; and a reading/writing unit which performs either reading or writing of the main memory by using the remaining cache blocks of the cache memory, other than the at least one of the cache blocks, such that, when the replace-inhibition state is set by the lock/unlock signal supplied by the block state setting unit, replacing the at least one of the cache blocks to the main memory is inhibited during the reading or writing of the main memory.

According to one preferred embodiment of the present invention, a method of controlling a cache memory connected to a main memory and a peripheral system and divided into a plurality of cache blocks, comprises the steps of: determining that an address designated by an instruction matches with an address of one of the cache blocks of the cache memory; and supplying, when a lock/unlock instruction is received from a CPU and the match is determined, a lock/unlock signal to the cache memory to either set a replace-inhibition state of the one of the cache blocks in which replacing the one of the cache blocks to the main memory or the peripheral system is inhibited, or reset the replace-inhibition state of the one of the cache blocks such that replacing the one of the cache blocks to the main memory or the peripheral system is allowed.

According to one preferred embodiment of the present invention, a computer including a main memory and a cache memory, the cache memory being connected to the main memory and a peripheral system and divided into a plurality of cache blocks, comprises: a comparator which determines that an address designated by an instruction matches with an address of one of the cache blocks; and a lock/unlock control unit which supplies, when a lock/unlock instruction is received from a CPU and the match is determined by the comparator, a lock/unlock signal to the cache memory to either set a replace-inhibition state of the one of the cache blocks in which replacing the one of the cache blocks to the main memory or the peripheral system is inhibited, or reset the replace-inhibition state of the one of the cache blocks such that replacing the one of the cache blocks to the main memory or the peripheral system is allowed.

According to one preferred embodiment of the present invention, a method of controlling a cache memory that is connected to a main memory with a first address space and capable of acting as a random access memory, which is executed by a computer that accesses the main memory through the cache memory, comprises the steps of: determining whether the cache memory is acting as the random access memory; and assigning a second address space, which is separate from the first address space of the main memory, for the cache memory when the cache memory is acting as the random access memory.

According to one preferred embodiment of the present invention, a computer including a main memory and a cache memory, the main memory having a first address space and the cache memory being capable of acting as a random access memory, comprises: a determination unit which determines whether the cache memory is acting as the random access memory; and an assignment unit which assigns a second address space, which is separate from the first address space of the main memory, for the cache memory when the cache memory is acting as the random access memory.

In the above preferred embodiment, the lock/unlock signal is supplied to the cache memory to either set replace-inhibition states of all the cache blocks of the cache memory in which replacing all the cache blocks to the main memory is inhibited, or reset the replace-inhibition states of all the cache clocks such that replacing all the cache block to the main memory is allowed. The cache memory control method and computer of the above preferred embodiment is effective in increasing the access speed of the CPU to the main memory even when a program with which it is not expected to suitably construct the referential locality is executed by the CPU.

BRIEF DESCRIPTION OF THE DRAWINGS

Other objects, features and advantages of the present invention will become apparent from the following detailed description when read in conjunction with the accompanying drawings.

FIG. 33 is a diagram for explaining a format of an instruction in the above preferred embodiment of the invention, which includes a force designation field.

FIG. 34 is a diagram for explaining a format of a load/store instruction for a single register in the above preferred embodiment of the invention.

DETAILED DESCRIPTION OF PREFERRED EMBODIMENTS

A description will now be provided of the preferred embodiments of the present invention with reference to the accompanying drawings.

A cache computer of one preferred embodiment of the invention is a direct-mapped cache computer in which a lock/unlock signal is supplied to the cache memory such that a replace-inhibition state of at least one of cache blocks of the cache memory is set or reset by the lock/unlock signal, such that the replacing of at least one of the cache blocks to the main memory is inhibited or allowed. The cache computer of the present embodiment is applicable to both the write-through type cache computer and the write-back type cache computer.

Figure 7:
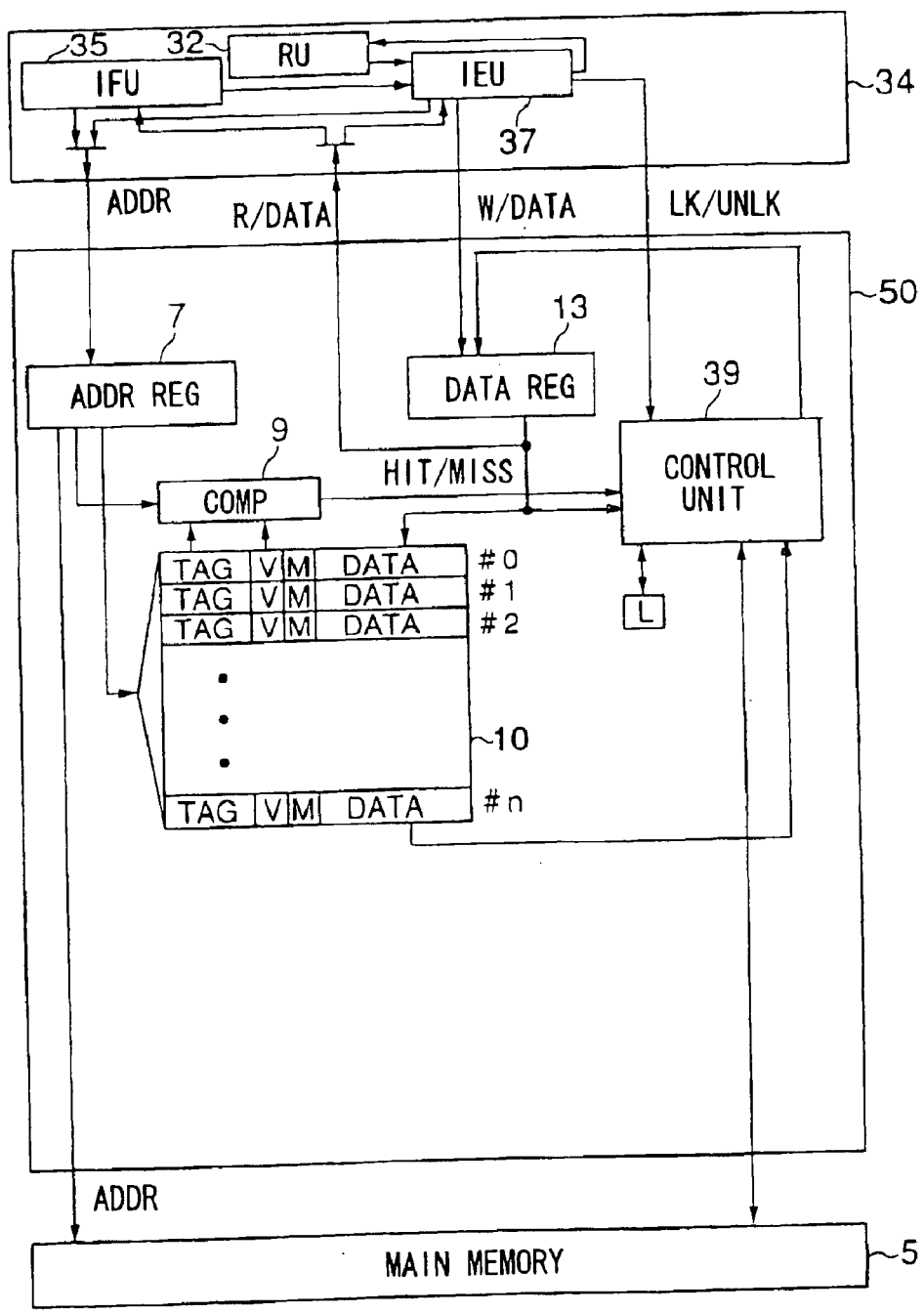
FIG. 7 is a block diagram of a direct-mapped unified cache computer to which one preferred embodiment of the invention is applied.

FIG. 7 shows a configuration of a direct-mapped unified cache computer to which one preferred embodiment of the invention is applied.

Generally, there are three types of cache memory: an instruction cache memory storing instructions; a data cache memory storing data; and an unified cache memory storing instructions and data. The cache computer of the present embodiment includes a unified cache memory 50 that stores both instructions and data.

As shown in FIG. 7, the cache computer of the present embodiment generally comprises a CPU 34, a cache memory 50 connected to the CPU 34, and a main memory 5 connected to the cache memory 50. The cache memory 50 includes an address register 7, a comparator 9, a control unit 39, a data register 13, and a data storage portion 10 having cache blocks #0 through #n. The cache computer of the present embodiment is similar in construction to the cache computer of FIG. 1 except that the CPU 34 includes an instruction fetching unit (IFU) 35, a register unit (RU) 32, and an instruction execution unit (IEU) 37, and that the cache memory 50 includes a lock flag (L) connected to the control unit 39.

Figure 1:
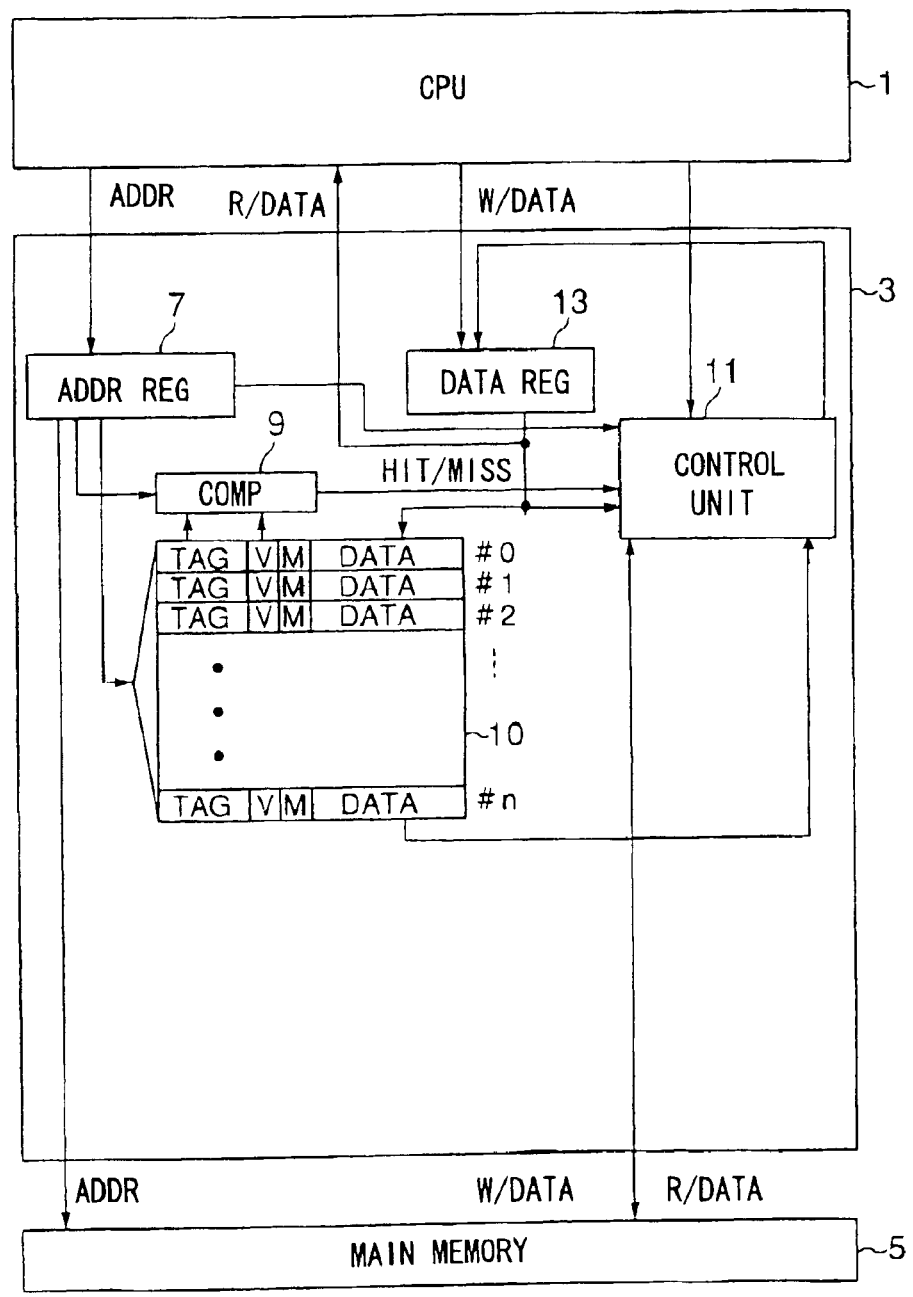
FIG. 1 is a block diagram of a conventional direct-mapped cache computer.
Figure 2:
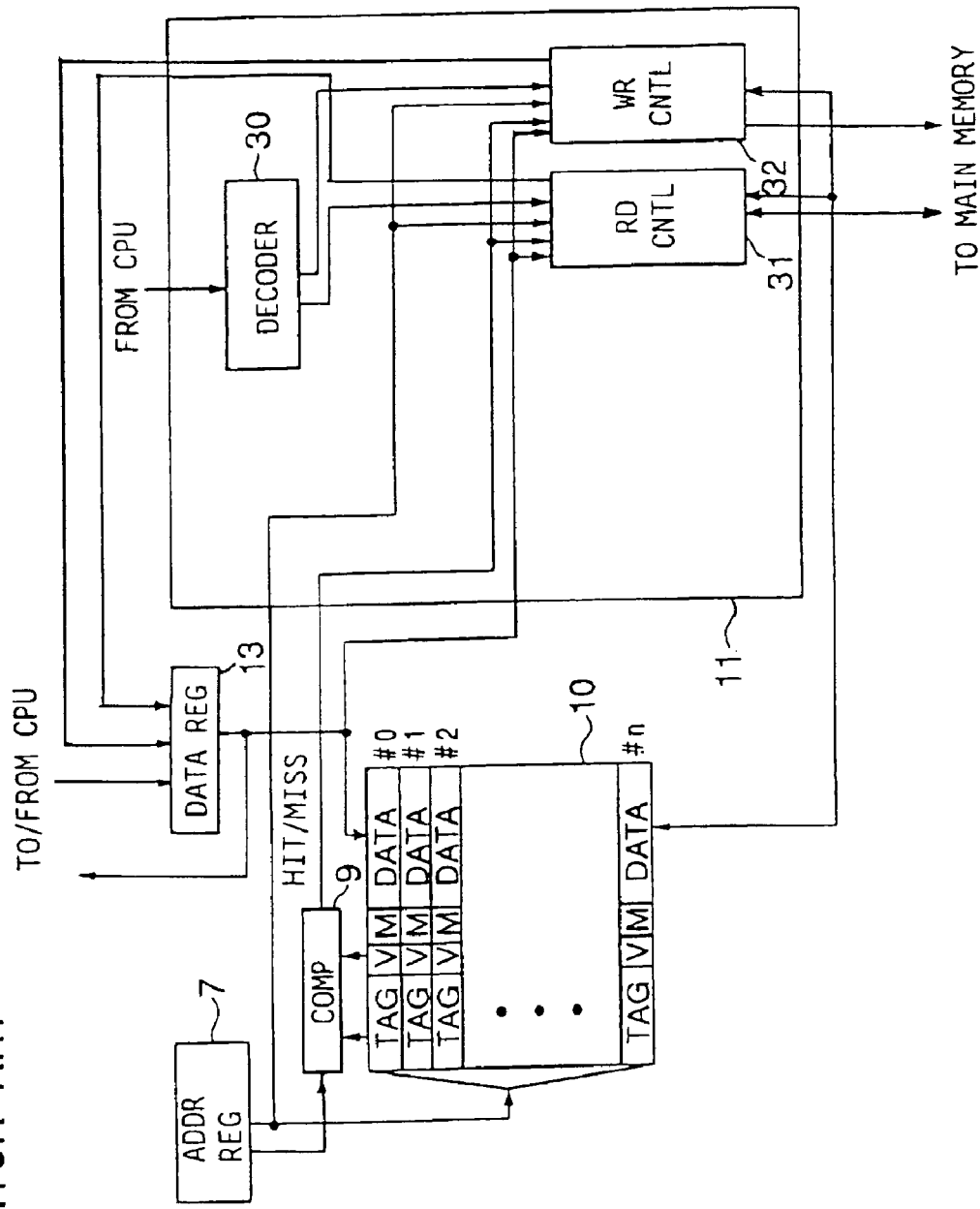
FIG. 2 is a block diagram of a control unit in the conventional direct-mapped cache computer of FIG. 1.

In FIG. 7, the elements which are essentially the same as corresponding elements in FIG. 1 are designated by the same reference numerals, and a description thereof will be omitted.

Figure 8:
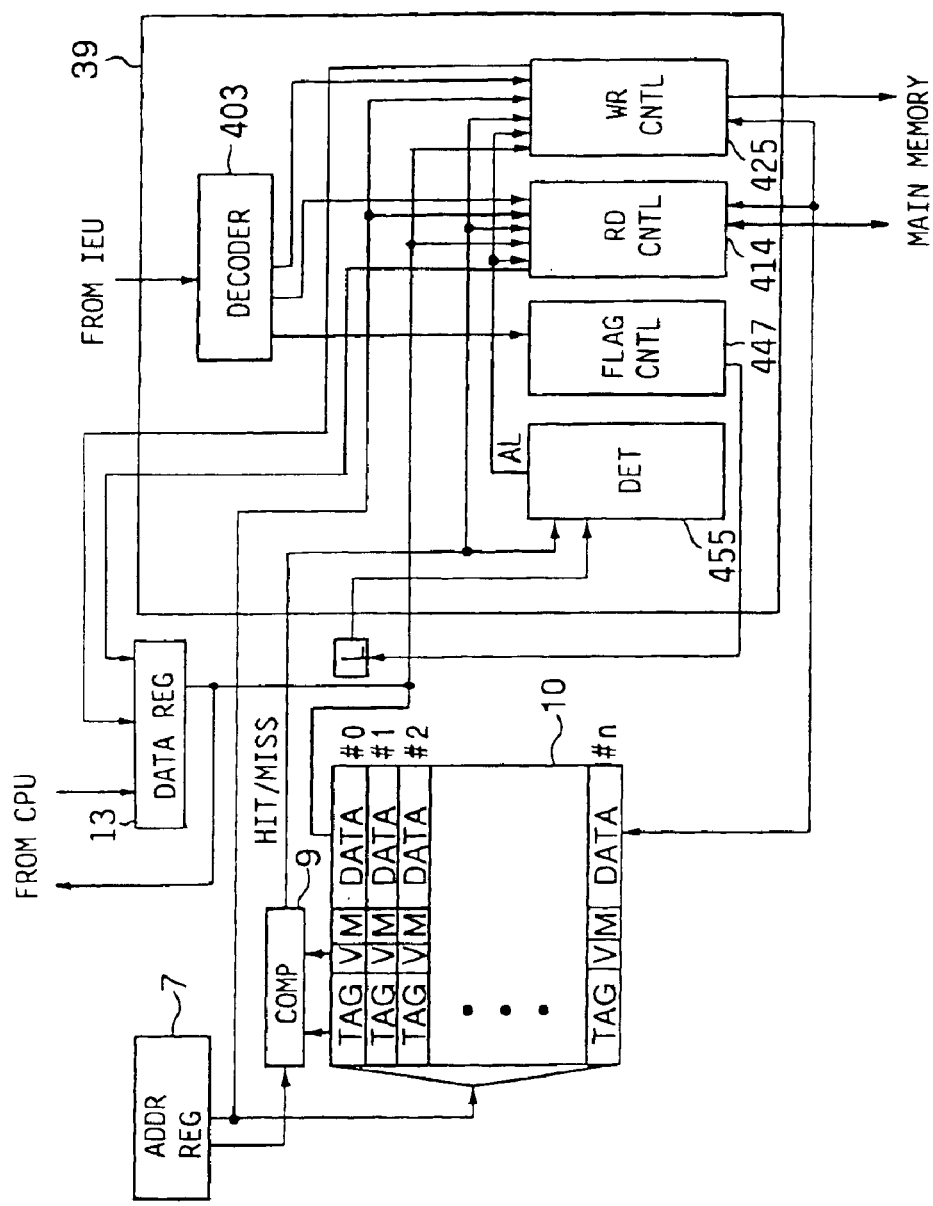
FIG. 8 is a block diagram of a control unit in the direct-mapped unified cache computer of FIG. 7.

FIG. 8 shows a configuration of the control unit 39 in the direct-mapped unified cache computer of FIG. 7.

As shown in FIG. 8, the control unit 39 generally includes a decoder 403, a determination unit (DET) 455, a flag control unit (FLAG CNTL) 447, a read control unit (RD CNTL) 414, and a write control unit (WR CNTL) 425. The IEU 37 of the CPU 34 is connected to the decoder 403. The comparator 9 and the lock flag L are connected to the determination unit 455. The decoder 403 and the lock flag L are connected to the flag control unit 447. The decoder 403, the address register 7, the comparator 9 and the determination unit 455 are connected to both the read control unit 414 and the write control unit 425.

The read/write operations of the cache computer of the present embodiment are similar to those of the cache computer of FIG. 1 except that the IFU 35 reads instructions from the cache memory 50 (or the main memory 5), and, when the IFU 35 reads a cache lock instruction from the cache memory 50 (or the main memory 5), the IFU 35 supplies the cache lock instruction to the IEU 37.

In the cache computer of FIG. 7, the IFU 35 reads an instruction from the cache memory 50, and, when a cache miss occurs, the IFU 35 reads an instruction from the main memory 5 through the data register 13. The IEU 37 reads data from the main memory 5 through the data register 13.

The IFU 35 supplies an instruction address to the address register 7. The IEU 37 supplies a data address to the address register 7. The RU 32 is connected to the IEU 37 and provides a temporary recording area for the IEU 37. The IEU 37 executes the instruction supplied by the IFU 35.

When a cache lock instruction is supplied from the IFU 35 to the IEU 37, the IEU 37 instructs (or supplies a lock signal to) the control unit 39 of the cache memory 50 to set replace-inhibition states of all the cache blocks of the data storage portion 10 in which replacing all the cache blocks to the main memory 5 is inhibited. When a cache unlock instruction is supplied from the IFU 35 to the IEU 37, the IEU 37 instructs (or supplies an unlock signal to) the control unit 39 of the cache memory 50 to reset the replace-inhibition states of all the cache blocks of the data storage portion 10 such that replacing all the cache blocks to the main memory 5 is allowed.

When the setting of the replace-inhibition states of all the cache blocks is instructed to the control unit 39 by the IEU 37, the flag control unit 447 sets the lock flag L to one. On the other hand, when the resetting of the replace-inhibition states of all the cache blocks is instructed to the control unit 39 by the IEU 37, the flag control unit 447 resets the lock flag L to zero.

In the control unit 39 of FIG. 8, when the reading of data from the main memory 5 is performed by the CPU 34, the read control unit 414 and the write control unit 425 determine whether the lock flag L is equal to 0 (zero) or 1 (one), in accordance with an all lock signal AL supplied by the determination unit 455. When the lock flag L is equal to 0, replacing the whole data storage portion 10 to the main memory 5 is allowed. When the lock flag L is equal to 1, replacing the whole data storage portion 10 to the main memory 5 is inhibited. In the latter case, the data is read from the main memory 5 by the CPU 34, and replacing the data storage portion 10 to the main memory 5 is inhibited during the reading of the data.

Similarly, when the writing of data to the main memory 5 is performed by the CPU 34, the read control unit 414 and the write control unit 425 determine whether the lock flag L is equal to 0 (zero) or 1 (one), in accordance with an all lock signal AL supplied by the determination unit 455. When the lock flag L is equal to 0, replacing the whole data storage portion 10 to the main memory 5 is allowed. When the lock flag L is equal to 1, replacing the whole data storage portion 10 to the main memory 5 is inhibited. In the latter case, the new data is written to the main memory 5 by the CPU 34, and replacing the data storage portion 10 to the main memory 5 is inhibited during the writing of the data.

Figure 9:
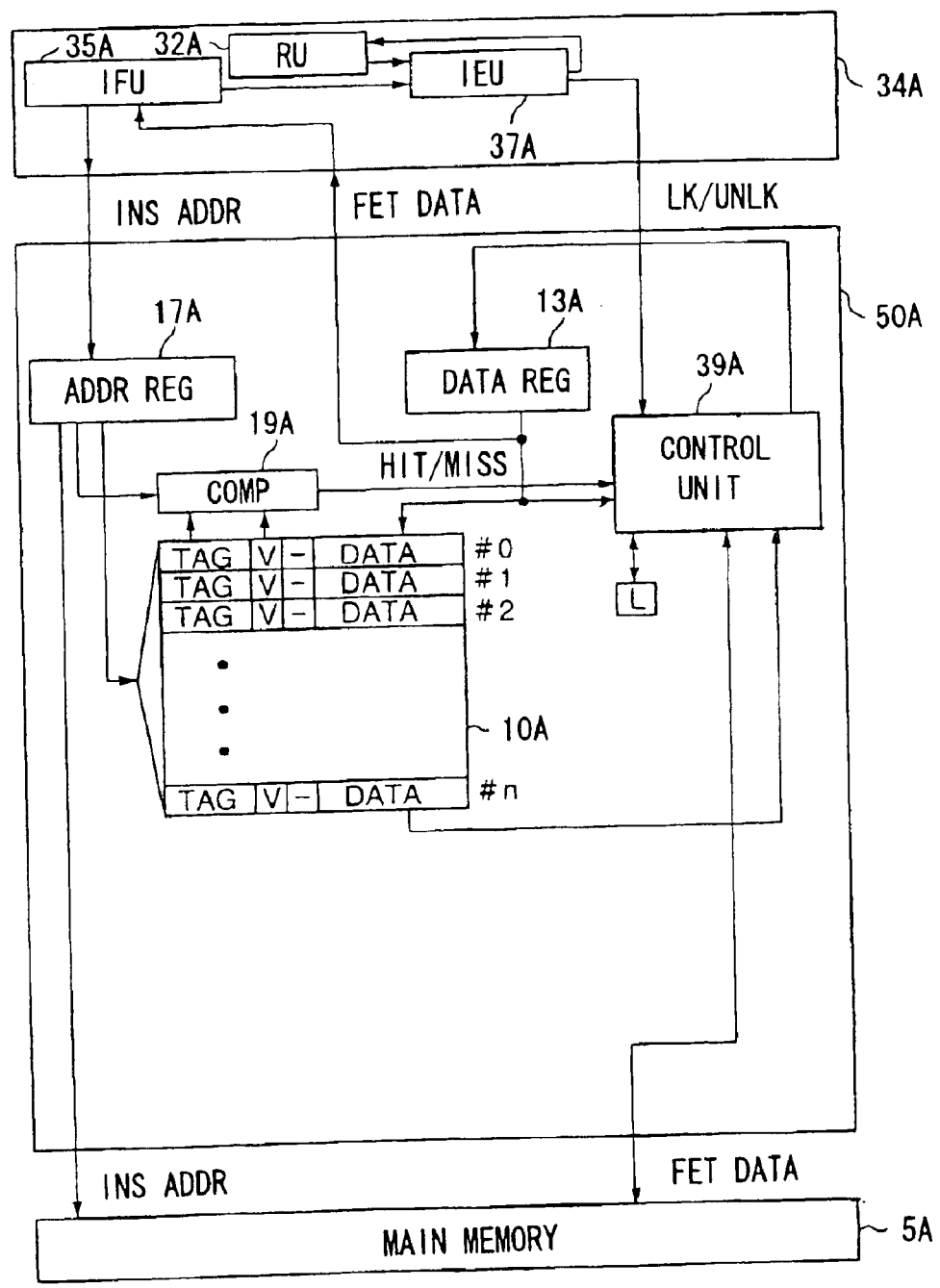
FIG. 9 is a block diagram of a direct-mapped instruction cache computer to which the above preferred embodiment of the invention is applied.

Accordingly, the cache memory control method and computer of the present embodiment is effective in increasing the access speed of the CPU to the main memory even when a program with which it is not expected to suitably construct the referential locality is executed by the CPU. FIG. 9 shows a configuration of a direct-mapped instruction cache computer to which the above preferred embodiment of the invention is applied. The cache computer of the present embodiment includes an instruction cache memory that stores instructions only.

As shown in FIG. 9, the cache computer of the present embodiment generally comprises a CPU 34A, a cache memory 50A connected to the CPU 34A, and a main memory 50A connected to the cache memory 50A. The cache memory 50A includes an address register 17A, a comparator 19A, a control unit 39A, a data register 13A, a lock flag L, and a data storage portion 10A having cache blocks #0 through #n. The cache computer of the present embodiment is similar to the cache computer of FIG. 1 except that the CPU 34A includes an instruction fetching unit (IFU) 35A, a register unit (RU) 32A, and an instruction execution unit (IEU) 37A, and that the cache memory 50A includes a lock flag (L) connected to the control unit 39A.

In the cache computer of FIG. 9, the IFU 35A reads an instruction from the cache memory 50A, and, when a cache miss occurs, the IFU 35A reads an instruction from the main memory 5A through the data register 13A.

The IFU 35A supplies an instruction address to the address register 17A. The comparator 19A compares the instruction address supplied from the address register 17A with the address read from the data storage portion 10A. Based on the result of the comparison, the control unit 39A controls the reading of data from or the writing of data to the main memory 5A. The RU 32A is connected to the IEU 37A and provides a temporary recording area for the IEU 37A.

Figure 10:
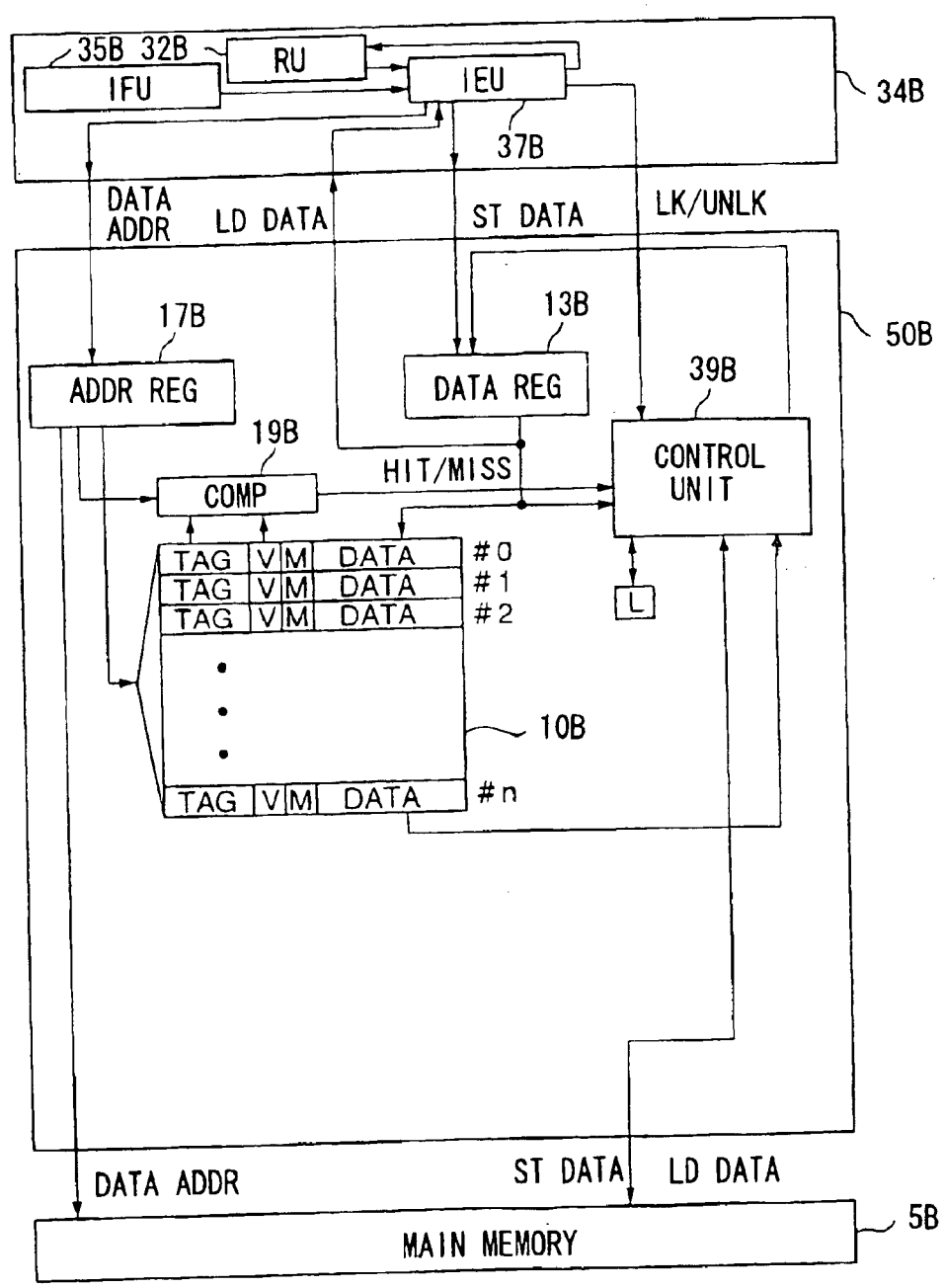
FIG. 10 is a block diagram of a direct-mapped data cache computer to which the above preferred embodiment of the invention is applied.

FIG. 10 shows a configuration of a direct-mapped data cache computer to which the above preferred embodiment of the invention is applied. The cache computer of the present embodiment includes a data cache memory that stores data only.

As shown in FIG. 10, the cache computer of the present embodiment generally comprises a CPU 34B, a cache memory 50B connected to the CPU 34B, and a main memory 5B connected to the cache memory 50B. The cache memory 50B includes an address register 17B, a comparator 19B, a control unit 39B, a data register 13B, a lock flag L, and a data storage portion 10B having cache blocks #0 through #n. The cache computer of the present embodiment is similar to the cache computer of FIG. 1 except that the CPU 34B includes an instruction fetching unit (IFU) 35B, a register unit (RU) 32B, and an instruction execution unit (IEU) 37B, and that the cache memory 50B includes a lock flag (L) connected to the control unit 39B.

In the cache computer of FIG. 10, the IFU 35B reads a load data from the cache memory 50B, and, when a cache miss occurs, the IFU 35B reads a data from the main memory 5B through the data register 13B.

The IFU 35B supplies a data address to the address register 17B. The comparator 19B compares the data address supplied from the address register 17B with the address read from the data storage portion 10B. Based on the result of the comparison, the control unit 39B controls the reading of data from or the writing of data to the main memory 5B. The RU 32B is connected to the IEU 37B and provides a temporary recording area for the IEU 37.

Figure 11:
FIG. 11 is a diagram for explaining a format of a lock/unlock instruction in the above preferred embodiment of the invention.

FIG. 11 shows a format of a cache lock/unlock instruction in the above preferred embodiment of the invention. As shown in FIG. 11, each of a cache lock instruction and a cache unlock instruction contains an operation code (OP-CODE) only. Each of the operation codes of the cache lock instruction and the cache unlock instruction identifies a specific one of these instructions.

In the above described embodiment, the lock/unlock signal is supplied to the cache memory to either set replace-inhibition states of all the cache blocks of the cache memory in which replacing all the cache blocks to the main memory is inhibited, or reset the replace-inhibition states of all the cache clocks such that replacing all the cache block to the main memory is allowed. The cache memory control method and computer of the above described embodiment is effective in increasing the access speed of the CPU to the main memory even when a program with which it is not expected to suitably construct the referential locality is executed by the CPU.

Figure 12:
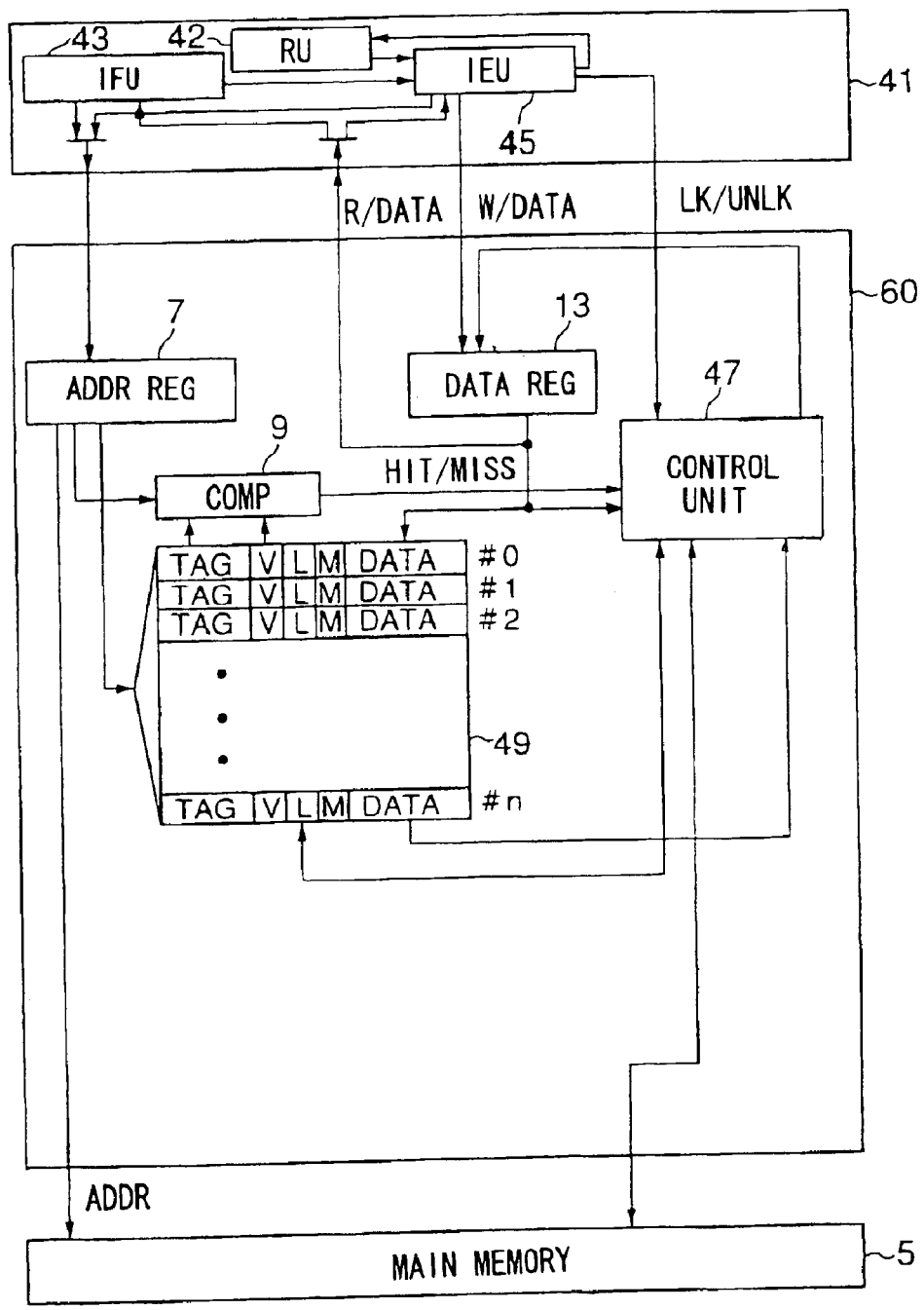
FIG. 12 is a block diagram of a direct-mapped cache computer to which another preferred embodiment of the invention is applied.

Next, FIG. 12 shows a configuration of a direct-mapped cache computer to which another preferred embodiment of the invention is applied.

In the present embodiment, a lock/unlock signal is supplied to the cache memory so that a replace-inhibition state of each of respective cache blocks of the cache memory is set or reset by the lock/unlock signal, and the replacing of each of the respective cache blocks to the main memory is inhibited or allowed. The cache computer of the present embodiment is the unified cache type but is applicable to both the instruction cache type and the data cache type.

As shown in FIG. 12, the cache computer of the present embodiment is similar to the cache computer of FIG. 7 except that the cache memory 60 includes respective lock flags L for the cache blocks #0 through #n, instead of a single lock flag (L) in the embodiment of FIG. 7.

Figure 13:
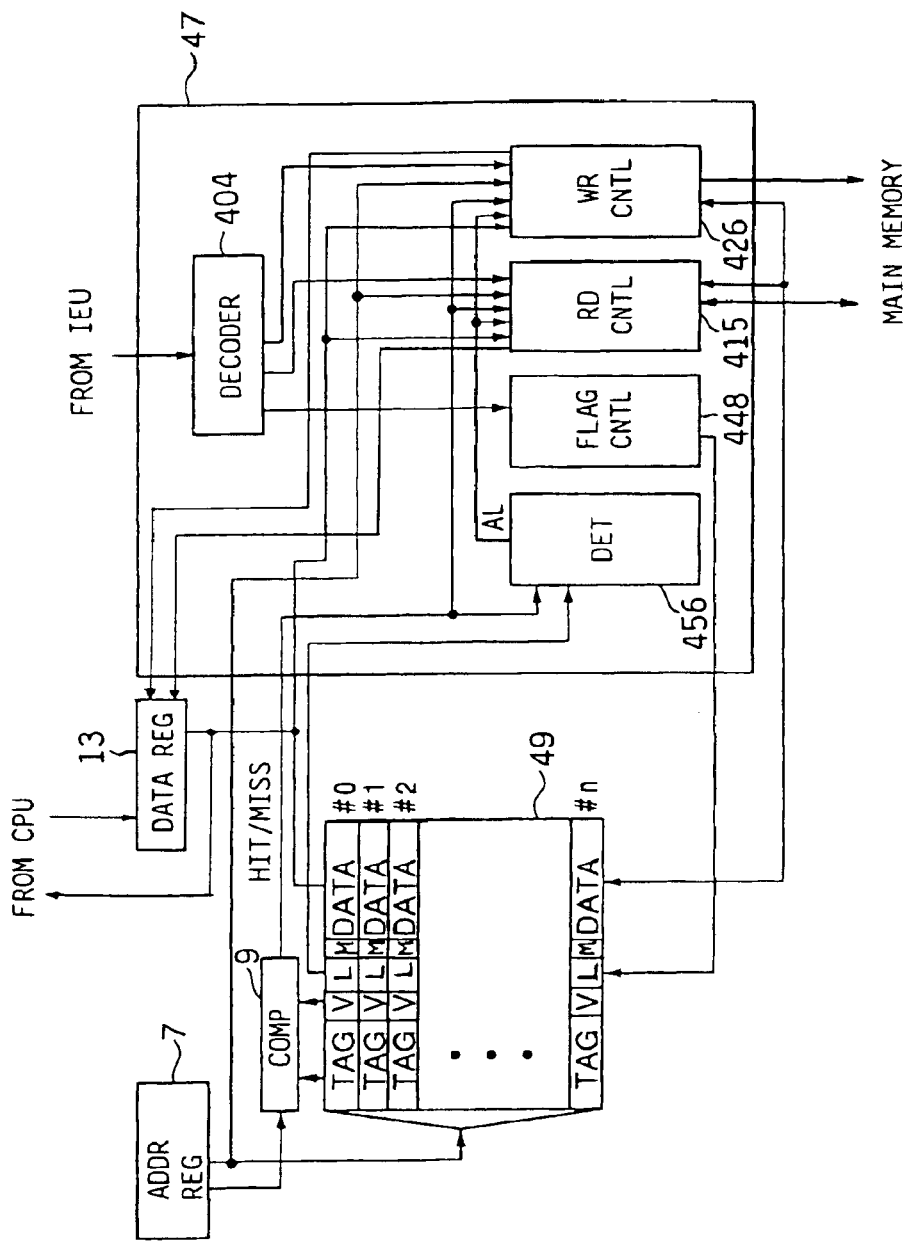
FIG. 13 is a block diagram of a control unit in the direct-mapped cache computer of FIG. 12.

FIG. 13 shows a configuration of a control unit 47 in the direct-mapped cache computer of FIG. 12.

As shown in FIG. 13, the control unit 47 generally includes a decoder 404, a determination unit (DET) 456, a flag control unit (FLAG CNTL) 448, a read control unit (RD CNTL) 415, and a write control unit (WR CNTL) 426. The control unit 47 of the present embodiment is similar to the control unit 39 of FIG. 8 except that the flag control unit 448 and the determination unit 456 are connected to the lock flags L of the cache blocks #0 through #n in the data storage portion 49 of the cache memory 60.

The read/write operations of the cache computer of the present embodiment are similar to those of the cache computer of FIG. 7 except that the IFU 43 reads instructions from the cache memory 60 (or the main memory 5), and, when the IFU 43 reads a cache block lock instruction, a cache block unlock instruction or a cache unlock instruction from the cache memory 50 (or the main memory 5), the IFU 43 supplies the cache lock instruction to the IEU 45.

When a cache block lock instruction is supplied from the IFU 43 to the IEU 45, the IEU 45 instructs (or supplies a lock signal to) the control unit 47 of the cache memory 60 to set a replace-inhibition state of a specified one of the cache blocks of the data storage portion 49 (which is specified by the cache block lock instruction) in which replacing the specified cache block to the main memory 5 is inhibited. The IEU 45 selects the specified cache block to be set in the replace-inhibition state in accordance with the memory address supplied by the RU 42 in response to the cache block lock instruction. Similarly, when a cache block unlock instruction is supplied from the IFU 43 to the IEU 45, the IEU 45 selects the specified cache block to be set in the replace-inhibition state in accordance with the memory address supplied by the RU 42 in response to the cache block unlock instruction.

When a cache block unlock instruction is supplied from the IFU 43 to the IEU 45, the IEU 45 instructs (or supplies an unlock signal to) the control unit 47 of the cache memory 60 to reset the replace-inhibition state of the specified one of the cache blocks of the data storage portion 49 (which is specified by the cache block unlock instruction) in which replacing the specified cache block to the main memory 5 is inhibited.

When a cache unlock instruction is supplied from the IFU 43 to the IEU 45, the IEU 45 instructs (or supplies an unlock signal to) the control unit 47 to reset the replace-inhibition states of all the cache blocks #0 through #n such that replacing all the cache blocks #0 through #n to the main memory 5 is allowed.

When the setting of the replace-inhibition state of the specified one of the cache blocks is instructed to the control unit 47 by the IEU 45, the flag control unit 448 sets the lock flag L of the specified cache block to one. When the resetting of the replace-inhibition state of the specified cache block is instructed to the control unit 47 by the IEU 45, the flag control unit 448 resets the lock flag L of the specified cache block to zero. Further, when the resetting of all the replace-inhibition states of all the cache blocks is instructed to the control unit 47 by the IEU 45, the flag control unit 448 resets the lock flags L of all the cache blocks to zero.

In the control unit 47 of FIG. 13, when the reading of data from the main memory 5 is performed by the CPU 41, the read control unit 415 and the write control unit 426 determine whether each of the lock flags L of the cache blocks #0 through #n is equal to 0 (zero) or 1 (one), in accordance with the all lock signal AL supplied by the determination unit 456. When the lock flag L is equal to 0, replacing a corresponding cache block of the data storage portion 49 to the main memory 5 is allowed. When the lock flag L is equal to 1, replacing a corresponding cache block of the data storage portion 49 to the main memory 5 is inhibited. In the latter case, the data is read from the main memory 5 by the CPU 34, and replacing the corresponding cache block of the data storage portion 49 to the main memory 5 is inhibited during the reading of the data.

Similarly, when the writing of data to the main memory 5 is performed by the CPU 41, the read control unit 415 and the write control unit 426 determine whether each of the lock flags L of the cache blocks #0 through #n is equal to 0 (zero) or 1 (one), in accordance with the all lock signal AL supplied by the determination unit 456. When the lock flag L is equal to 0, replacing a corresponding cache block of the data storage portion 49 to the main memory 5 is allowed. When the lock flag L is equal to 1, replacing a corresponding cache block of the data storage portion 49 to the main memory 5 is inhibited. In the latter case, the new data is written to the main memory 5 by the CPU 41, and replacing the corresponding cache block of the data storage portion 49 to the main memory 5 is inhibited during the writing of the data.

Accordingly, the cache memory control method and computer of the present embodiment is effective in increasing the access speed of the CPU to the main memory even when a program with which it is not expected to suitably construct the referential locality is executed by the CPU.

Figure 14:
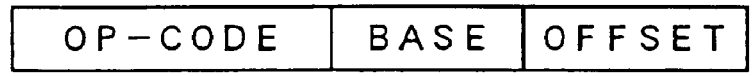
FIG. 14 is a diagram for explaining a format of a lock/unlock instruction in the above preferred embodiment of the invention.

FIG. 14 shows a format of a cache block lock/unlock instruction in the above preferred embodiment of the invention.

As shown in FIG. 14, each of a cache block lock instruction and a cache block unlock instruction contains an operation code (OP-CODE), a base address (BASE), and an offset address (OFFSET). The base address (BASE) indicates a number of a register in the RU 42 which retains a base value of a cache memory address needed to identify one of the cache blocks of the cache memory 60. The offset address (OFFSET) indicates a number of a register in the RU 42 which retains an offset value of the cache memory address needed to identify one of the cache blocks of the cache memory 60. The memory address is calculated by adding the offset address to the base address.

In the above-described embodiment, the lock/unlock instruction is supplied to the cache memory to either set or reset the replace-inhibition state of each of the respective cache blocks of the cache memory, such that the replacing of each of the respective cache blocks to the main memory is inhibited or allowed. The cache memory control method and computer of the above described embodiment is effective in increasing the access speed of the CPU to the main memory even when a program with which it is not expected to suitably construct the referential locality is executed by the CPU.

Figure 15:
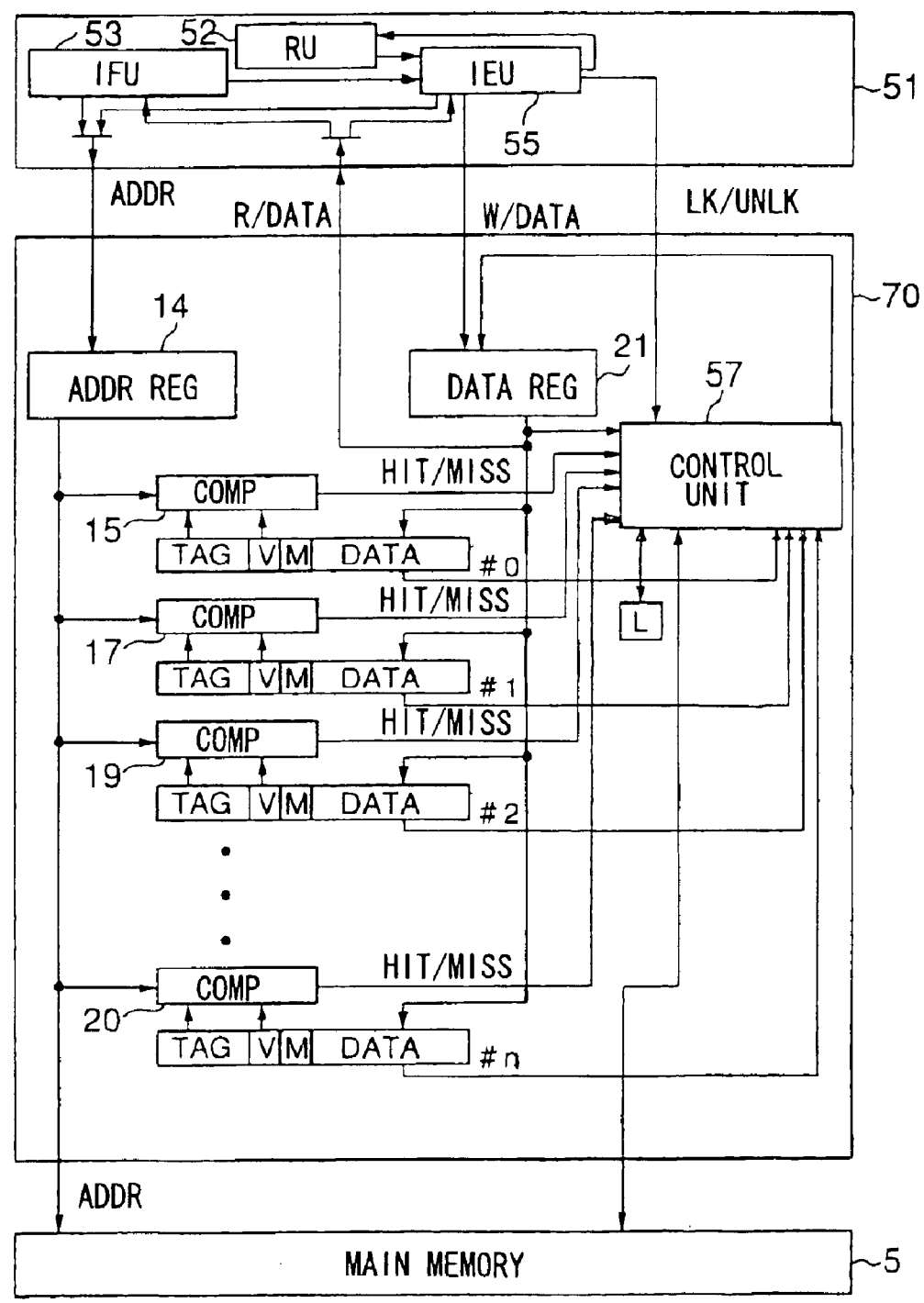
FIG. 15 is a block diagram of a fully associative cache computer to which one preferred embodiment of the invention is applied.

Next, FIG. 15 shows a configuration of a fully associative cache computer to which one preferred embodiment of the invention is applied.

In the present embodiment, a lock/unlock instruction is supplied to the cache memory so that a replace-inhibition state of at least one of cache blocks of the cache memory is set or reset by the lock/unlock instruction, and the replacing of at least one of the cache blocks to the main memory is inhibited or allowed. The cache computer of the present embodiment is applicable to both the write-through type cache computer and the write-back type cache computer.

The cache computer of the present embodiment, which will now be described, is a fully associative unified cache computer including a unified cache memory 70 that stores both instructions and data. However, the cache computer of the present embodiment is applicable to both the instruction cache computer and the data cache computer.

As shown in FIG. 15, the cache computer of the present embodiment is capable of setting the replace-inhibition states of all the cache blocks #0 through #n of the cache memory 70 in which replacing all the cache blocks to the main memory 5 is inhibited. The cache computer of FIG. 15 is similar in construction to the cache computer of FIG. 3 except that the CPU 51 includes an instruction fetching unit (IFU) 53, a register unit (RU) 52, and an instruction execution unit (IEU) 55, and that the cache memory 70 includes a lock flag (L) connected to the control unit 57.

Figure 16:
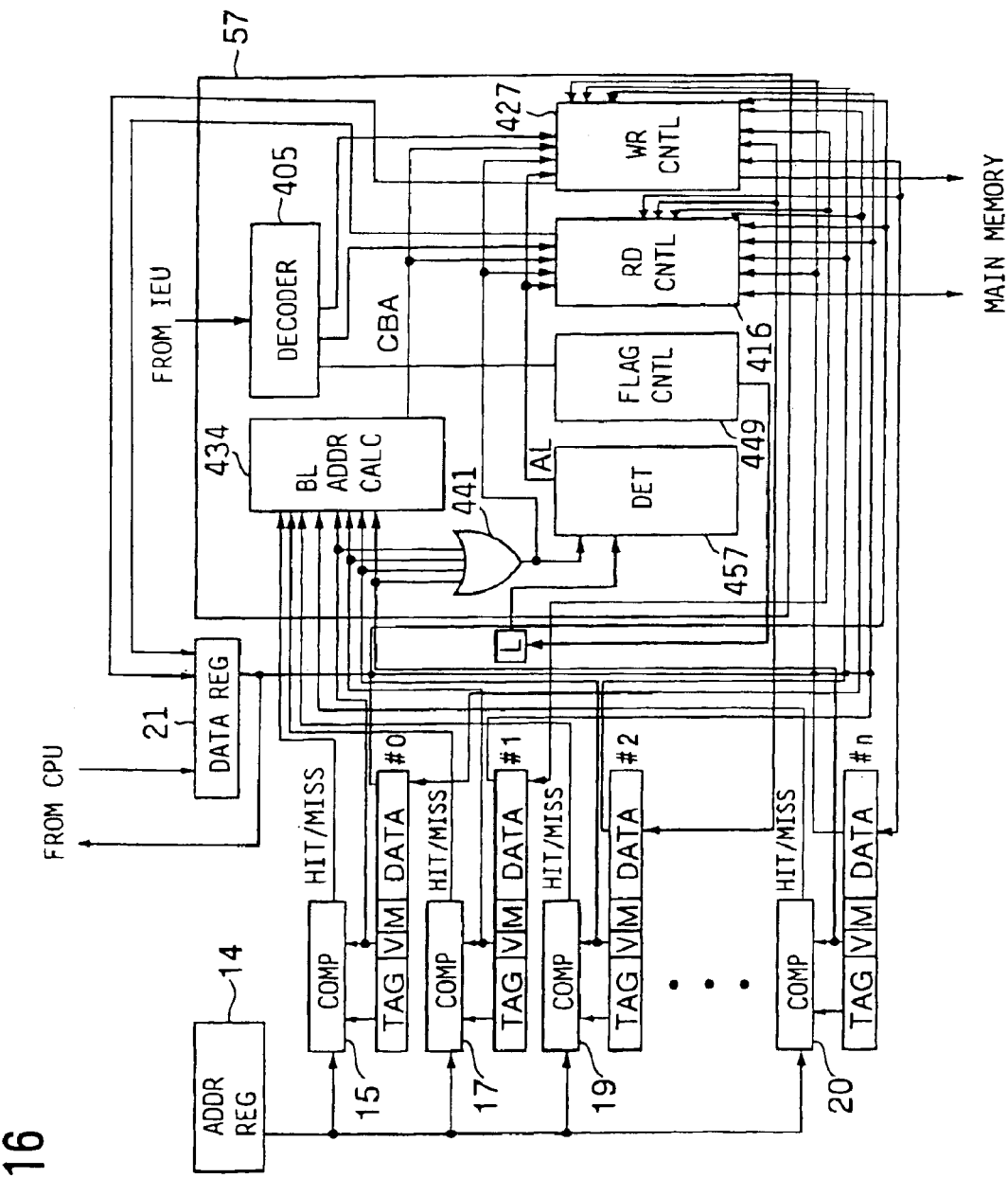
FIG. 16 is a block diagram of a control unit in the fully associative cache computer of FIG. 15.

FIG. 16 shows a configuration of the control unit 57 in the fully associative cache computer of FIG. 15.

Figure 4:
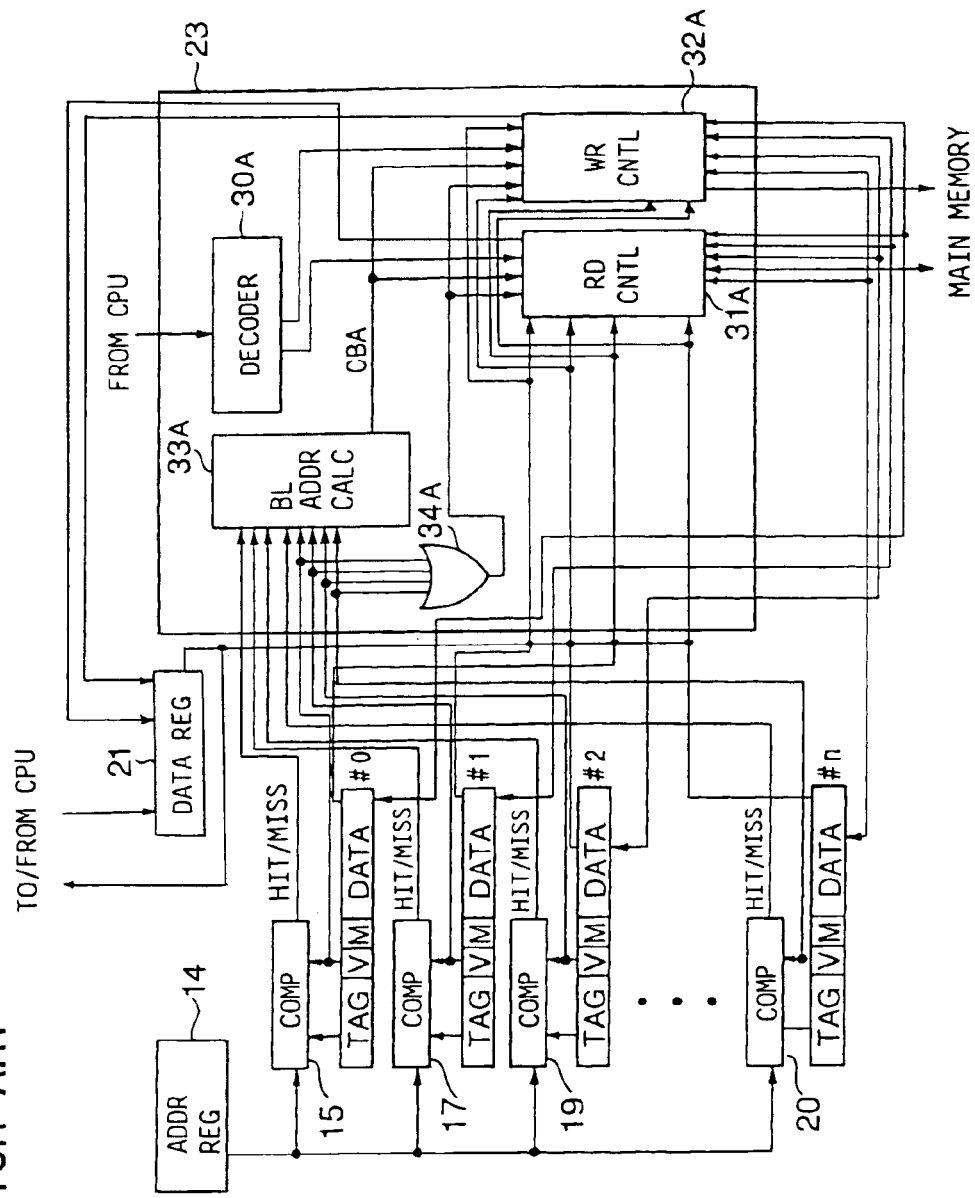
FIG. 4 is a block diagram of a control unit in the conventional fully associative cache computer of FIG. 3.

As shown in FIG. 16, the control unit 57 of the present embodiment is similar in construction to the control unit 23 of FIG. 4 except that the control unit 57 further includes a flag control unit 449 and a determination unit 457, in addition to a decoder 405, a block address calculation unit 434, an OR gate 441, a read control unit 416 and a write control unit 427. In the present embodiment, the decoder 405 and the lock flag L are connected to the flag control unit 449. The determination unit 457 is connected to the lock flag L, the OR gate 441, the read control unit 416 and the write control unit 427.

Figure 3:
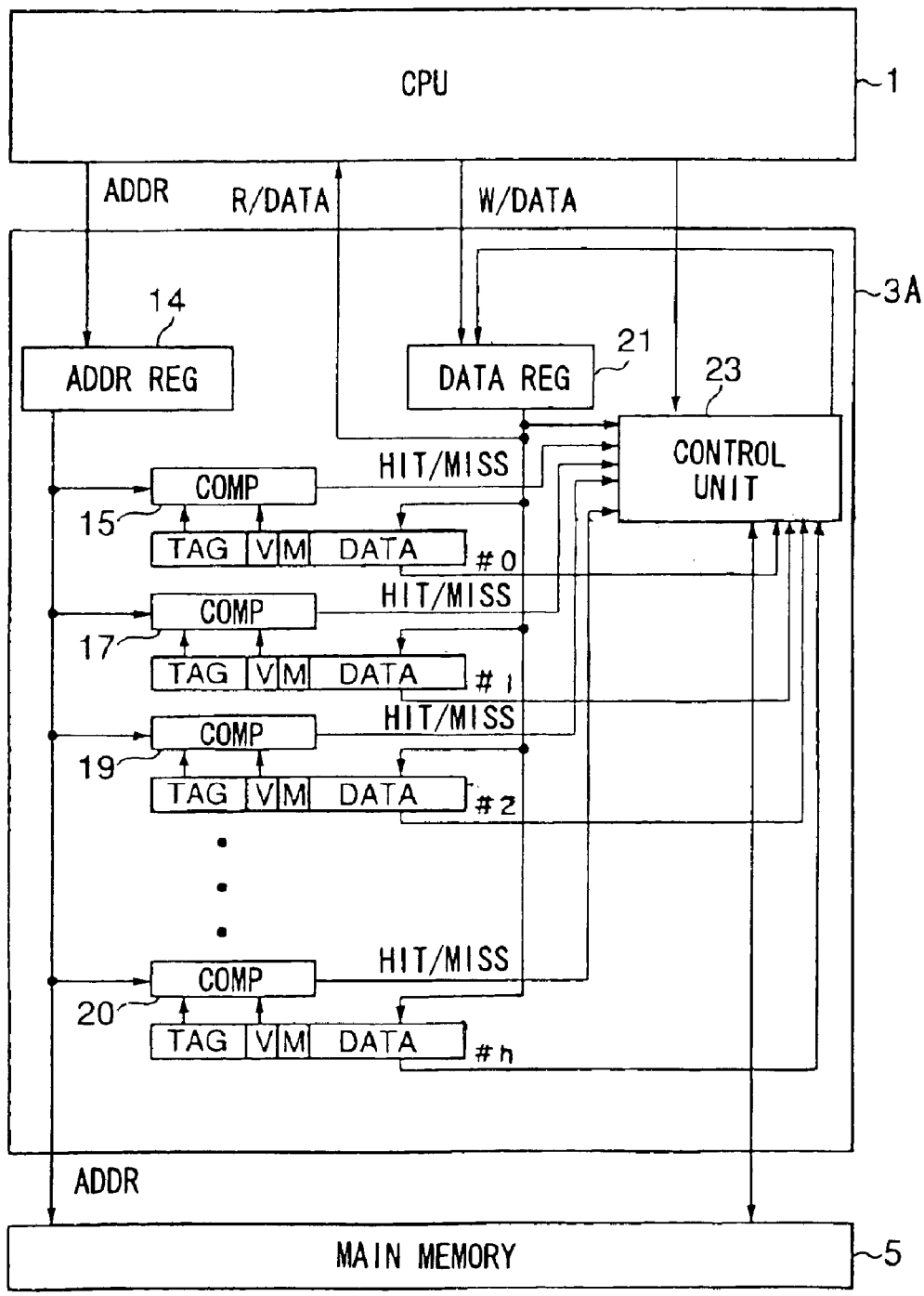
FIG. 3 is a block diagram of a conventional fully associative cache computer.

The read/write operations of the cache computer of FIG. 15 are similar to those of the cache computer of FIG. 3 except that the IFU 53 reads instructions from the cache memory 70 (or the main memory 5), and, when the IFU 53 reads a cache lock instruction from the cache memory 70 (or the main memory 5), the IFU 53 supplies the cache lock instruction to the IEU 55.

In the cache computer of FIG. 15, the IFU 53 reads an instruction from the cache memory 70, and, when a cache miss occurs, the IFU 53 reads an instruction from the main memory 5 through the data register 21. The IEU 55 reads data from the main memory 5 through the data register 21.

The IFU 53 supplies an instruction address to the address register 14. The IEU 55 supplies a data address to the address register 21. The RU 52 is connected to the IEU 55 and provides a temporary recording area for the IEU 55. The IEU 55 executes the instruction supplied by the IFU 53.

When the cache lock instruction is supplied from the IFU 53 to the IEU 55, the IEU 55 instructs (or supplies the lock signal to) the control unit 57 of the cache memory 70 to set replace-inhibition states of all the cache blocks #0 through #n of the cache memory 70 in which replacing all the cache blocks to the main memory 5 is inhibited. When the cache unlock instruction is supplied from the IFU 53 to the IEU 55, the IEU 55 instructs (or supplies the unlock signal to) the control unit 57 to reset the replace-inhibition states of all the cache blocks #0 through #n of the cache memory 70 such that replacing all the cache blocks to the main memory 5 is allowed.

When the setting of the replace-inhibition states of all the cache blocks is instructed to the control unit 57 by the IEU 55, the flag control unit 449 sets the lock flag L to one. On the other hand, when the resetting of the replace-inhibition states of all the cache blocks is instructed to the control unit 57 by the JEU 55, the flag control unit 449 resets the lock flag L to zero.

In the control unit 57 of FIG. 16, when the reading of data from the main memory 5 is performed by the CPU 51, the read control unit 416 and the write control unit 427 determine whether the lock flag L is equal to 0 (zero) or 1 (one), in accordance with the all lock signal AL supplied by the determination unit 457. When the lock flag L is equal to 0, replacing the whole cache memory 70 to the main memory 5 is allowed. When the lock flag L is equal to 1, replacing the whole cache memory 70 to the main memory 5 is inhibited. In the latter case, the data is read from the main memory 5 by the CPU 51, and replacing the whole cache memory 70 to the main memory 5 is inhibited during the reading of the data.

Similarly, when the writing of data to the main memory 5 is performed by the CPU 51, the read control unit 416 and the write control unit 427 determine whether the lock flag L is equal to 0 (zero) or 1 (one), in accordance with the all lock signal AL supplied by the determination unit 457. When the lock flag L is equal to 0, replacing the whole cache memory 70 to the main memory 5 is allowed. When the lock flag L is equal to 1, replacing the whole cache memory 70 to the main memory 5 is inhibited. In the latter case, the new data is written to the main memory 5 by the CPU 51, and replacing the cache memory 70 to the main memory 5 is inhibited during the writing of the data.

The format of the cache lock/unlock instruction in the present embodiment is the same as that shown in FIG. 11. Each of the cache lock instruction and the cache unlock instruction contains an operation code (OP-CODE) only. Each of the operation codes of the cache lock instruction and the cache unlock instruction identifies a specific one of these instructions.

The cache memory control method and computer of the present embodiment is effective in increasing the access speed of the CPU to the main memory even when a program with which it is not expected to suitably construct the referential locality is executed by the CPU.

Figure 17:
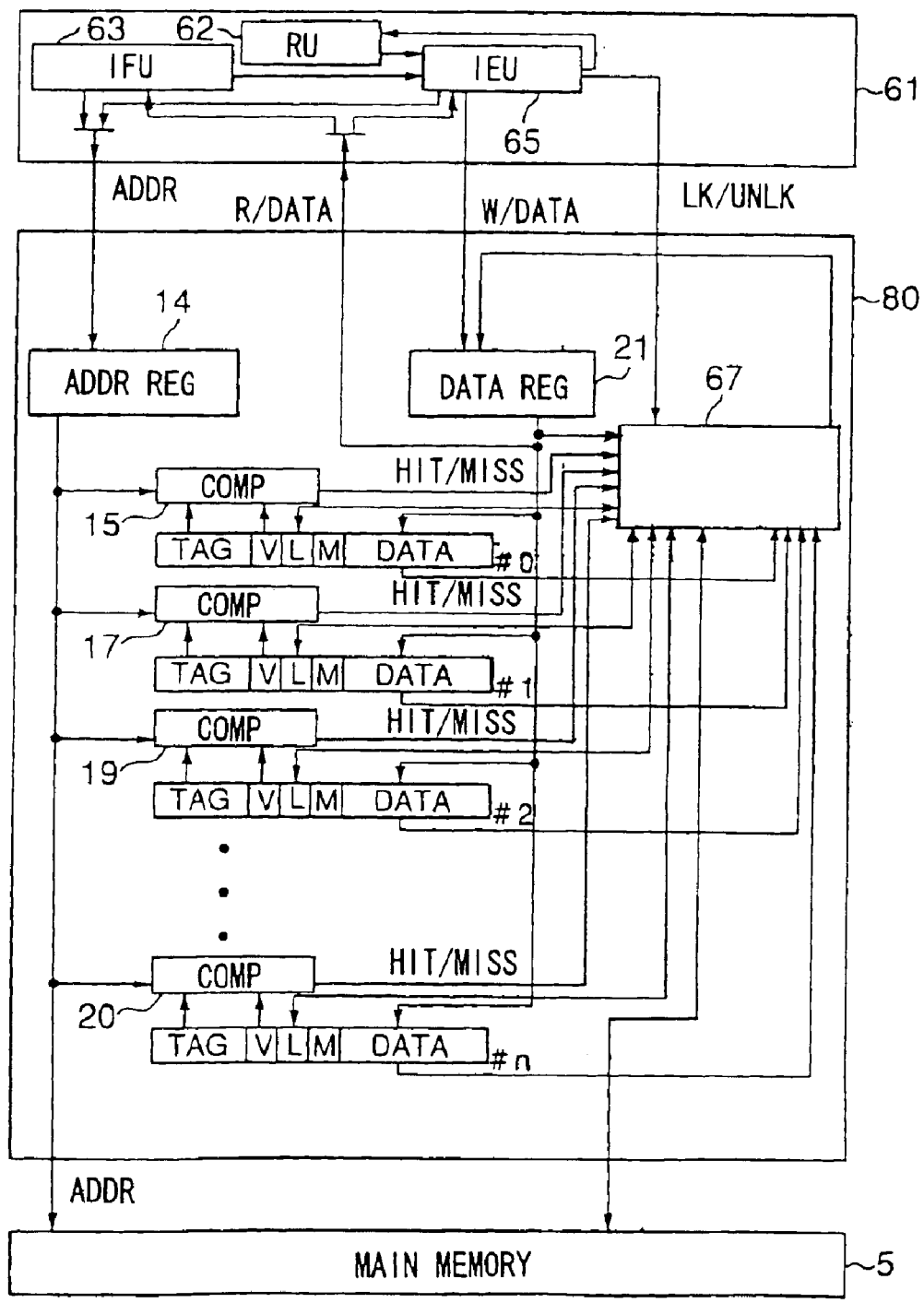
FIG. 17 is a block diagram of a fully associative cache computer to which another preferred embodiment of the invention is applied.

FIG. 17 shows a configuration of a fully associative cache computer to which another preferred embodiment of the invention is applied.

In the present embodiment, a lock/unlock instruction is supplied to the cache memory so that a replace-inhibition state of each of respective cache blocks of the cache memory is set or reset by the lock/unlock instruction, and the replacing of each of the respective cache blocks to the main memory is inhibited or allowed.

As shown in FIG. 17, the cache computer of the present embodiment is similar in construction to the cache computer of FIG. 15 except that the cache memory 80 includes respective lock flags L for the cache blocks #0 through #n, instead of a single lock flag (L) in the embodiment of FIG. 15.

Figure 18:
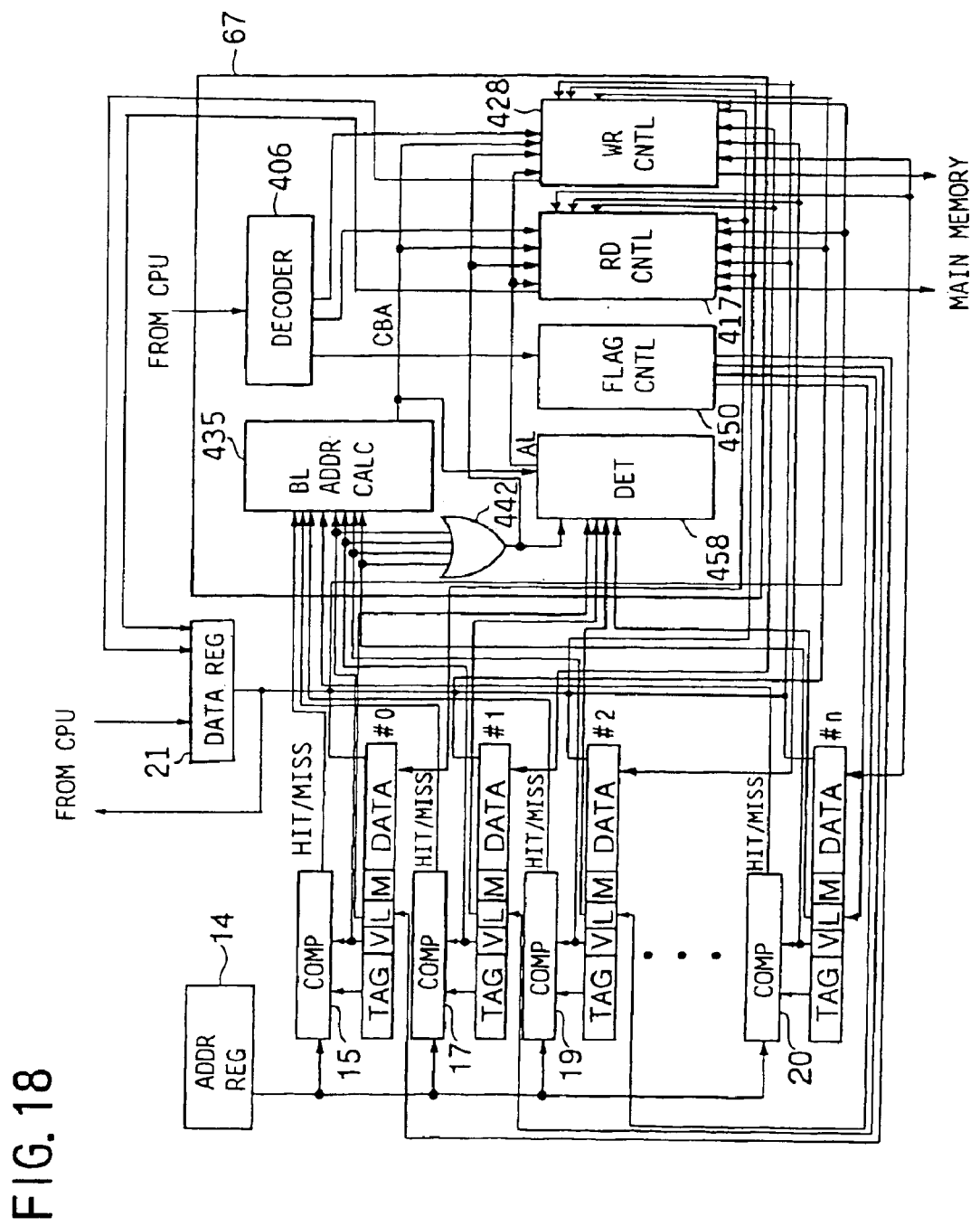
FIG. 18 is a block diagram of a control unit in the fully associative cache computer of FIG. 17.

FIG. 18 shows a configuration of the control unit 67 in the fully associative cache computer of FIG. 17.

As shown in FIG. 18, the control unit 67 generally includes a decoder 406, a determination unit (DET) 458, a flag control unit (FLAG CNTL) 450, a read control unit (RD CNTL) 417, and a write control unit (WR CNTL) 428. The control unit 67 of the present embodiment is similar to the control unit 57 of FIG. 16 except that the flag control unit 450 and the determination unit 458 are connected to the lock flags L of the cache blocks #0 through #n of the cache memory 80.

The read/write operations of the cache computer of the present embodiment are similar to those of the cache computer of FIG. 15 except that the IFU 63 reads instructions from the cache memory 80 (or the main memory 5), and, when the IFU 63 reads a cache block lock instruction, a cache block unlock instruction or a cache unlock instruction from the cache memory 80 (or the main memory 5), the IFU 63 supplies the lock/unlock instruction to the IEU 65.

When the cache block lock instruction is supplied from the IFU 63 to the IEU 65, the IEU 65 instructs (or supplies the lock signal to) the control unit 67 of the cache memory 80 to set a replace-inhibition state of a specified one of the cache blocks #0 through #n of the cache memory 80 (which is specified by the cache block lock instruction) in which replacing the specified cache block to the main memory 5 is inhibited. The JEU 65 selects the specified cache block to be set in the replace-inhibition state in accordance with the memory address supplied by the RU 62 in response to the cache block lock instruction. Similarly, when the cache block unlock instruction is supplied from the IFU 63 to the IEU 65, the IEU 65 selects the specified cache block to be reset in the write-allowance state in accordance with the memory address supplied by the RU 62 in response to the cache block unlock instruction.

When the cache block unlock instruction is supplied from the IFU 63 to the IEU 65, the IEU 65 instructs (or supplies the unlock signal to) the control unit 67 to reset the replace-inhibition state of the specified one of the cache blocks of the cache memory 80 (which is specified by the cache block unlock instruction) in which replacing the specified cache block to the main memory 5 is inhibited.

When the cache unlock instruction is supplied from the IFU 63 to the IEU 65, the IEU 65 instructs (or supplies the unlock signal to) the control unit 67 to reset the replace-inhibition states of all the cache blocks #0 through #n such that replacing all the cache blocks #0 through #n to the main memory 5 is allowed.

When the setting of the replace-inhibition state of the specified one of the cache blocks is instructed to the control unit 67 by the IEU 65, the flag control unit 450 sets the lock flag L of the specified cache block to one. When the resetting of the replace-inhibition state of the specified cache block is instructed to the control unit 67 by the IEU 65, the flag control unit 450 resets the lock flag L of the specified cache block to zero. Further, when the resetting of all the replace-inhibition states of all the cache blocks is instructed to the control unit 67 by the IEU 65, the flag control unit 450 resets the lock flags L of all the cache blocks to zero.

In the control unit 67 of FIG. 18, when the reading of data from the main memory 5 is performed by the CPU 61, the read control unit 417 and the write control unit 428 determine whether each of the lock flags L of the cache blocks #0 through #n is equal to 0 (zero) or 1 (one), in accordance with the all lock signal AL supplied by the determination unit 458. When the lock flag L is equal to 0, replacing a corresponding cache block of the cache memory 80 to the main memory 5 is allowed. When the lock flag L is equal to 1, replacing a corresponding cache block of the cache memory 80 to the main memory 5 is inhibited. In the latter case, the data is read from the main memory 5 by the CPU 61, and replacing the corresponding cache block of the cache memory 80 to the main memory 5 is inhibited during the reading of the data.

Similarly, when the writing of data to the main memory 5 is performed by the CPU 61, the read control unit 417 and the write control unit 428 determine whether each of the lock flags L of the cache blocks #0 through #n is equal to 0 (zero) or 1 (one), in accordance with the all lock signal AL supplied by the determination unit 458. When the lock flag L is equal to 0, replacing a corresponding cache block of the cache memory 80 to the main memory 5 is allowed. When the lock flag L is equal to 1, replacing a corresponding cache block of the cache memory 80 to the main memory 5 is inhibited. In the latter case, the new data is written to the main memory 5 by the CPU 61, and replacing the corresponding cache block of the cache memory 80 to the main memory 5 is inhibited during the writing of the data.

Accordingly, the cache memory control method and computer of the present embodiment is effective in increasing the access speed of the CPU to the main memory even when a program with which it is not expected to suitably construct the referential locality is executed by the CPU.

The format of the cache block lock/unlock instruction in the present embodiment of the invention is the same as that shown in FIG. 14. Similar to that shown in FIG. 14, each of the cache block lock instruction and the cache block unlock instruction contains an operation code (OP-CODE), a base address (BASE), and an offset address (OFFSET). The base address (BASE) indicates a number of a register in the RU 62 which retains a base value of a cache memory address needed to identify one of the cache blocks of the cache memory 80. The offset address (OFFSET) indicates a number of a register in the RU 62 which retains an offset value of the cache memory address needed to identify one of the cache blocks of the cache memory 80. The memory address is calculated by adding the offset address to the base address.

In the above-described embodiment, the lock/unlock instruction is supplied to the cache memory to either set or reset the replace-inhibition state of each of the respective cache blocks of the cache memory, such that the replacing of each of the respective cache blocks to the main memory is inhibited or allowed. The cache memory control method and computer of the above described embodiment is effective in increasing the access speed of the CPU to the main memory even when a program with which it is not expected to suitably construct the referential locality is executed by the CPU.

Figure 19:
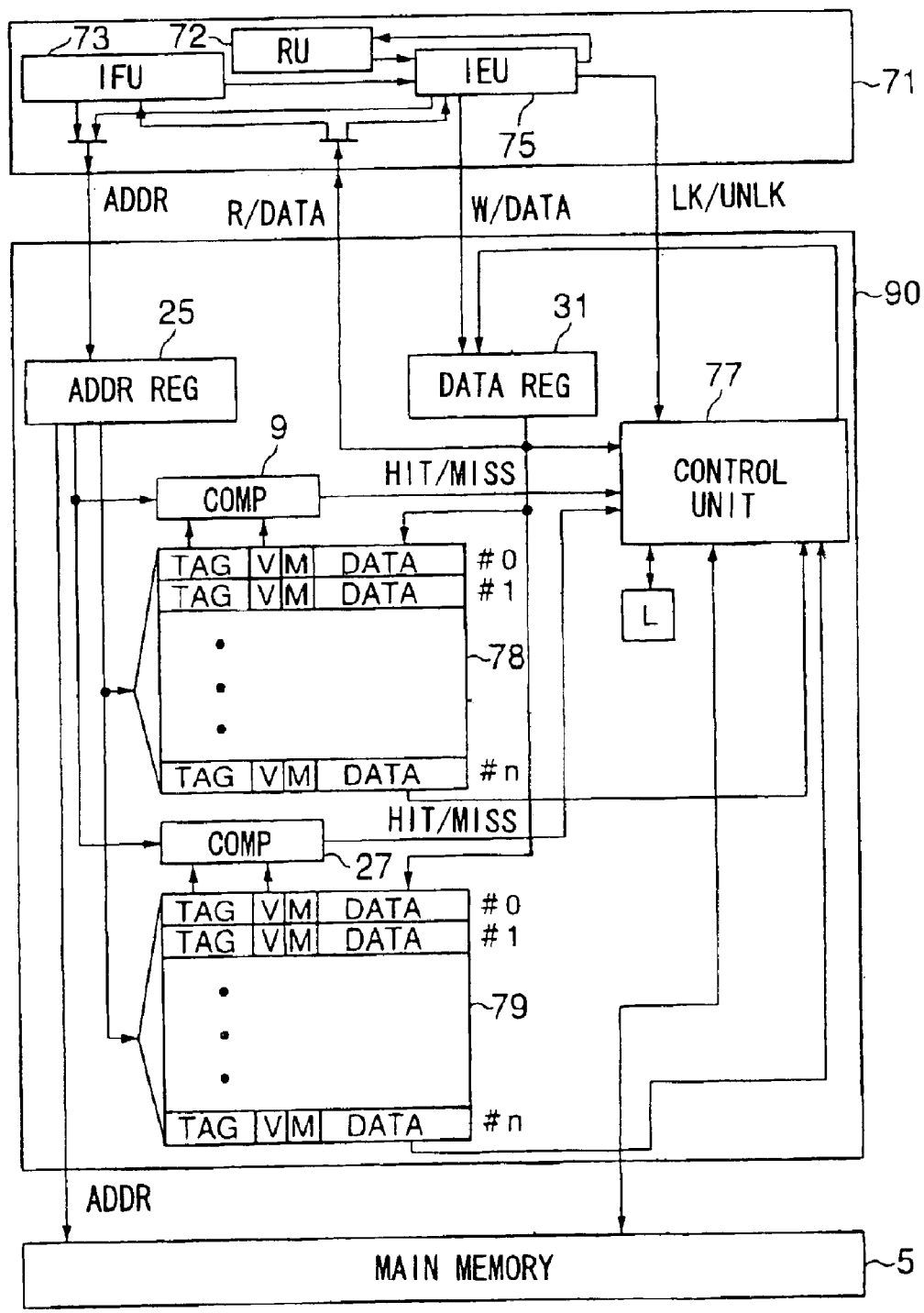
FIG. 19 is a block diagram of a 2-way set-associative cache computer to which one preferred embodiment of the invention is applied.

Next, FIG. 19 shows a configuration of a 2-way set-associative cache computer to which one preferred embodiment of the invention is applied.

In the present embodiment, a lock/unlock instruction is supplied to the cache memory so that a replace-inhibition state of at least one of cache blocks of the cache memory is set or reset by the lock/unlock instruction, and the replacing of at least one of the cache blocks to the main memory is inhibited or allowed. The cache computer of the present embodiment is applicable to both the write-through type cache computer and the write-back type cache computer.

The cache computer of the present embodiment, which will now be described, is a 2-way set-associative unified cache computer including a unified cache memory 90 that stores both instructions and data. However, the cache computer of the present embodiment is applicable to both the instruction cache computer and the data cache computer.

As shown in FIG. 19, the cache computer of the present embodiment is capable of setting the replace-inhibition states of both a cache way 78 and a cache way 79 of the cache memory 90 in which replacing all the cache blocks to the main memory 5 is inhibited. The cache computer of FIG. 19 is similar in construction to the cache computer of FIG. 5 except that the CPU 71 includes an instruction fetching unit (IFU) 73, a register unit (RU) 72, and an instruction execution unit (IEU) 75, and that the cache memory 90 includes a lock flag (L) connected to the control unit 77.

Figure 20:
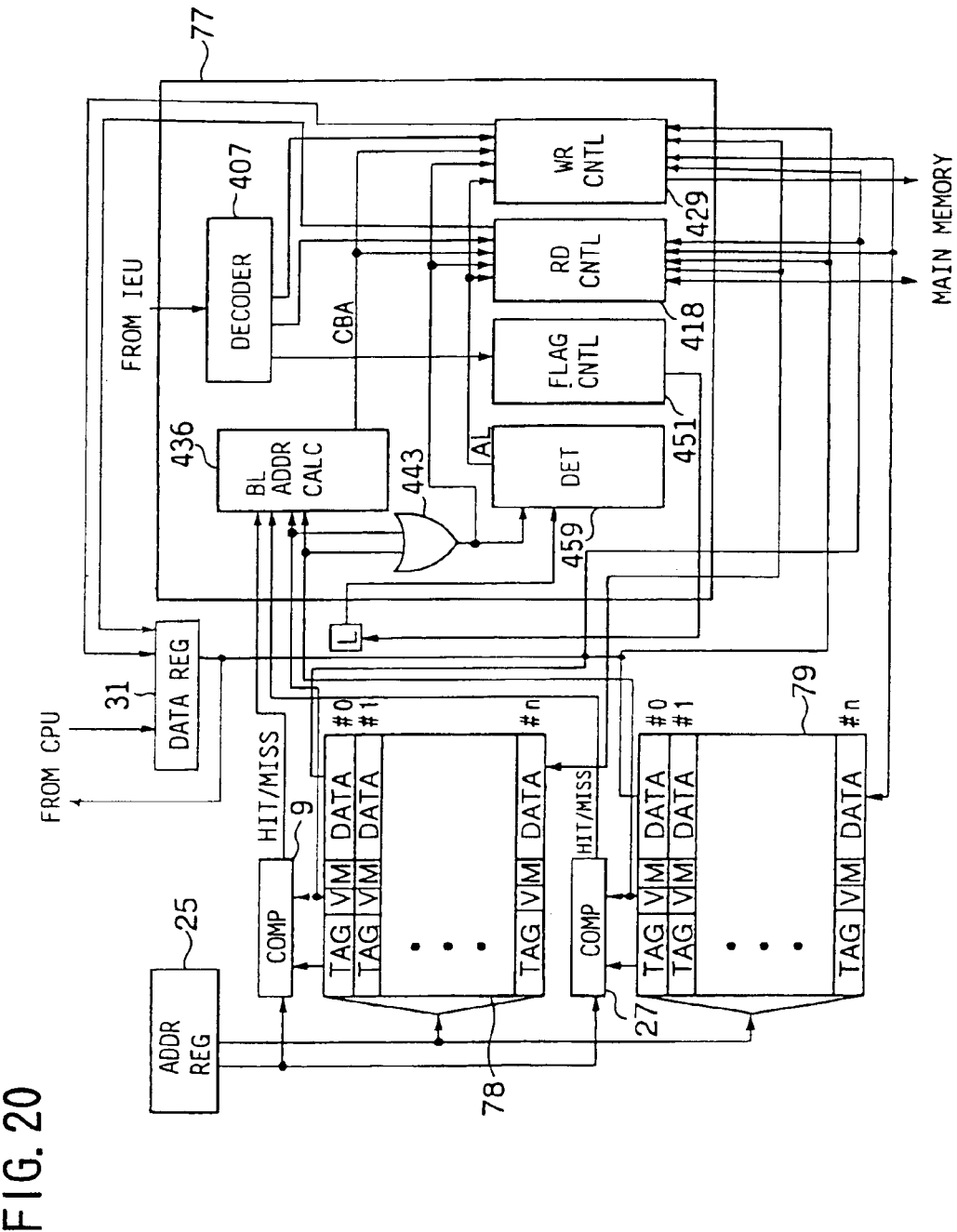
FIG. 20 is a block diagram of a control unit in the 2-way set-associative cache computer of FIG. 19.

FIG. 20 shows a configuration of the control unit 77 in the 2-way set-associative cache computer of FIG. 19.

Figure 6:
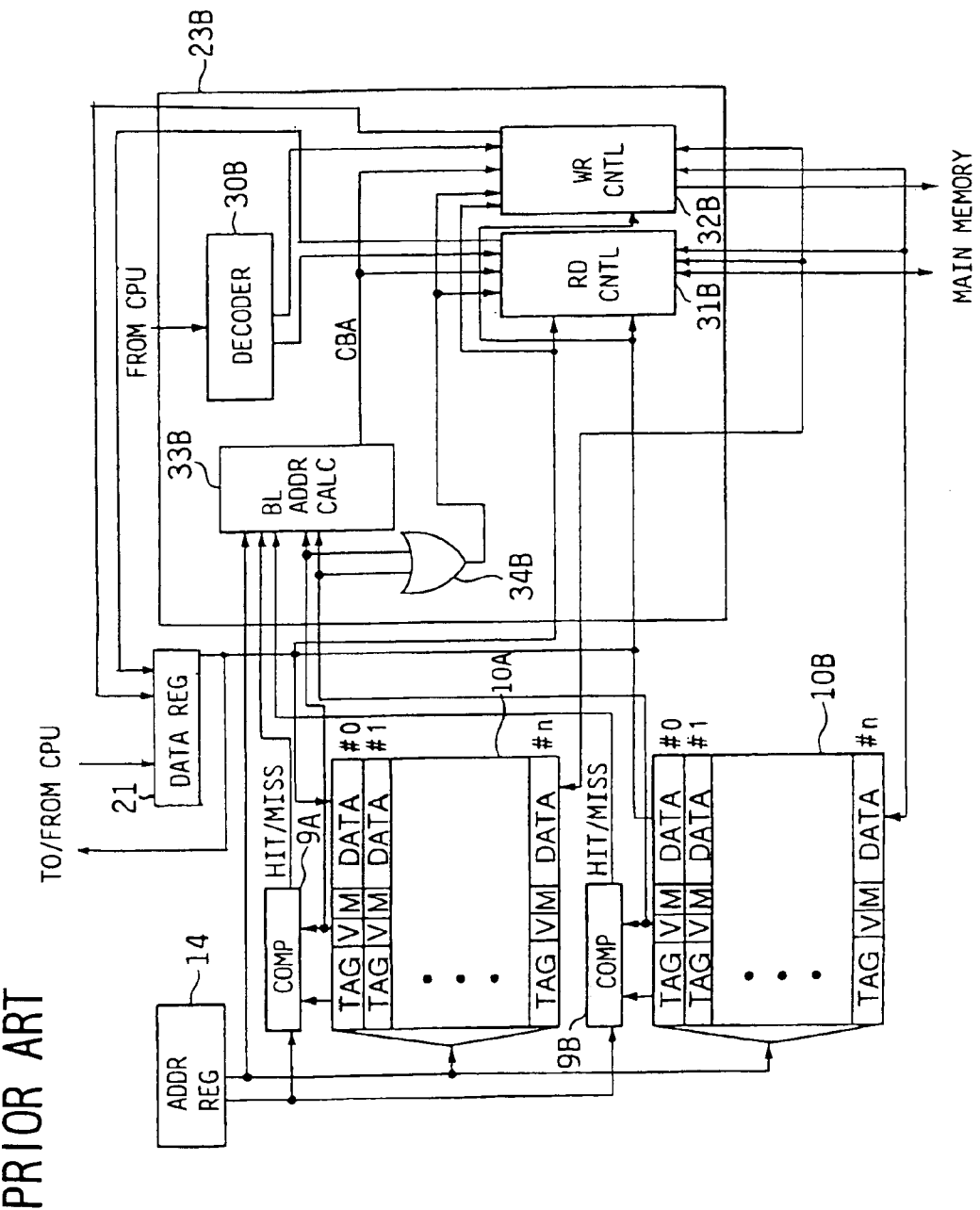
FIG. 6 is a block diagram of a control unit in the conventional 2-way set-associative cache computer of FIG. 5.

As shown in FIG. 20, the control unit 77 of the present embodiment is similar in construction to the control unit 23B of FIG. 6 except that the control unit 77 further includes a flag control unit 451 and a determination unit 459, in addition to a decoder 407, a block address calculation unit 436, an OR gate 443, a read control unit 418 and a write control unit 429. In the present embodiment, the decoder 407 and the lock flag L are connected to the flag control unit 451. The determination unit 459 is connected to the lock flag L, the OR gate 443, the read control unit 418 and the write control unit 429.

Figure 5:
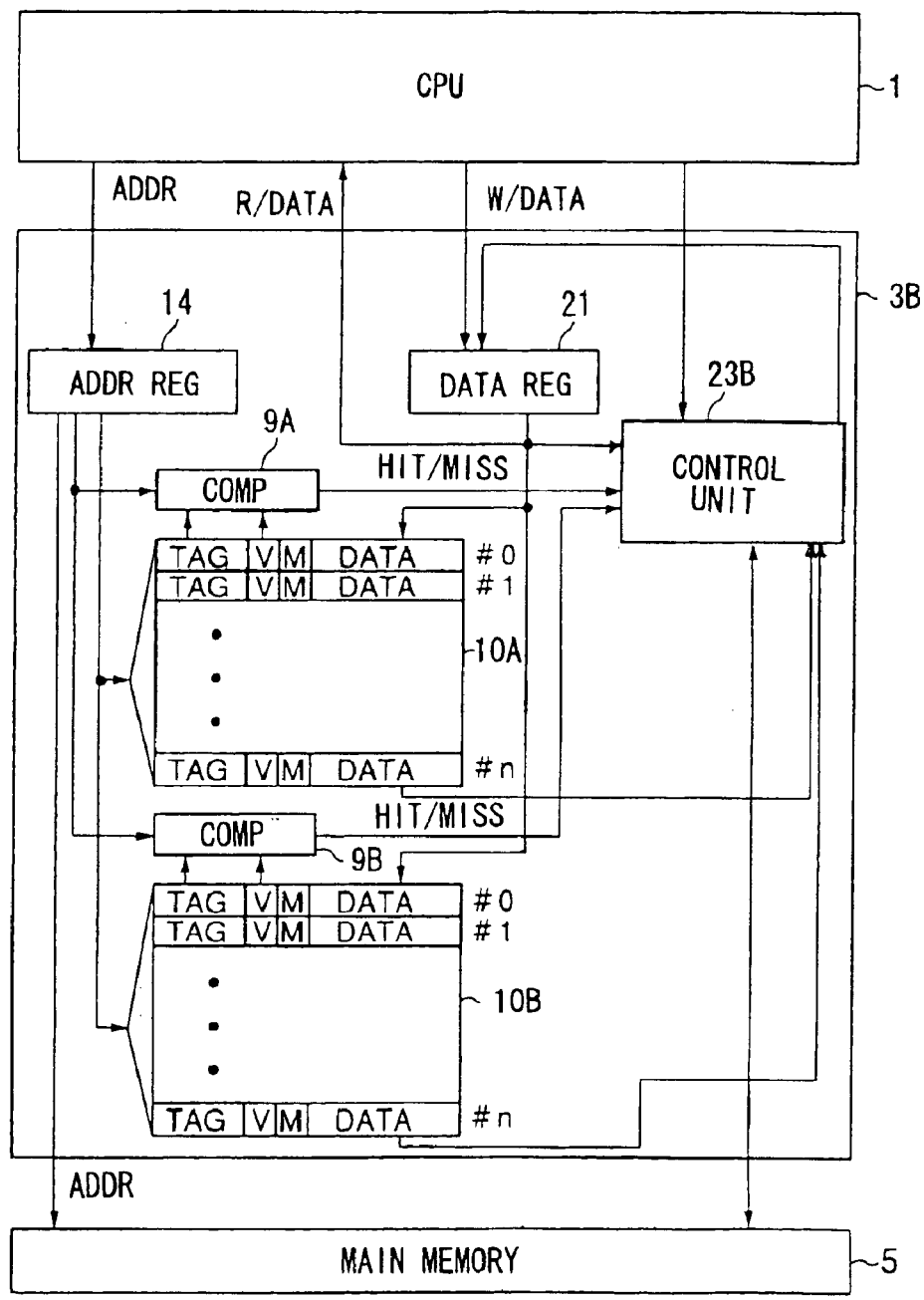
FIG. 5 is a block diagram of a conventional 2-way set-associative cache computer.

The read/write operations of the cache computer of FIG. 19 are similar to those of the cache computer of FIG. 5 except that the IFU 73 reads instructions from the cache memory 90 (or the main memory 5), and, when the IFU 73 reads a cache lock instruction from the cache memory 90 (or the main memory 5), the IFU 73 supplies the cache lock instruction to the IEU 75.

In the cache computer of FIG. 19, the IFU 73 reads an instruction from the cache memory 90, and, when a cache miss occurs, the IFU 73 reads an instruction from the main memory 5 through the data register 31. The IEU 75 reads data from the main memory 5 through the data register 31.

The IFU 73 supplies an instruction address to the address register 25. The IEU 75 supplies a data address to the address register 25. The RU 72 is connected to the IEU 75 and provides a temporary recording area for the IEU 75. The IEU 75 executes the instruction supplied by the IFU 73.

When the cache lock instruction is supplied from the IFU 73 to the IEU 75, the IEU 75 instructs (or supplies the lock signal to) the control unit 77 of the cache memory 90 to set replace-inhibition states of both the cache way 78 and the cache way 79 of the cache memory 90 in which replacing all the cache blocks to the main memory 5 is inhibited. When the cache unlock instruction is supplied from the IFU 73 to the IEU 75, the IEU 75 instructs (or supplies the unlock signal to) the control unit 77 to reset the replace-inhibition states of both the cache way 78 and the cache way 79 of the cache memory 90 such that replacing all the cache blocks to the main memory 5 is allowed.

When the setting of the replace-inhibition states of both the cache ways 78 and 79 is instructed to the control unit 77 by the IEU 75, the flag control unit 451 sets the lock flag L to one. On the other hand, when the resetting of the replace-inhibition states of all the cache blocks is instructed to the control unit 77 by the IEU 75, the flag control unit 451 resets the lock flag L to zero.

In the control unit 77 of FIG. 20, when the reading of data from the main memory 5 is performed by the CPU 71, the read control unit 418 and the write control unit 429 determine whether the lock flag L is equal to 0 (zero) or 1 (one), in accordance with the all lock signal AL supplied by the determination unit 459. When the lock flag L is equal to 0, replacing both the cache ways 78 and 79 to the main memory 5 is allowed. When the lock flag L is equal to 1, replacing both the cache ways 78 and 79 to the main memory 5 is inhibited. In the latter case, the data is read from the main memory 5 by the CPU 71, and replacing both the cache ways 78 and 79 to the main memory 5 is inhibited during the reading of the data by the CPU 71.

Similarly, when the writing of data to the main memory 5 is performed by the CPU 71, the read control unit 418 and the write control unit 429 determine whether the lock flag L is equal to 0 (zero) or 1 (one), in accordance with the all lock signal AL supplied by the determination unit 459. When the lock flag L is equal to 0, replacing both the cache ways 78 and 79 to the main memory 5 is allowed. When the lock flag L is equal to 1, replacing both the cache ways 78 and 79 to the main memory 5 is inhibited. In the latter case, the new data is written to the main memory 5 by the CPU 71, and replacing both the cache ways 78 and 79 to the main memory 5 is inhibited during the writing of the data by the CPU 71.

The format of the cache lock/unlock instruction in the present embodiment is the same as that shown in FIG. 11. Each of the cache lock instruction and the cache unlock instruction contains an operation code (OP-CODE) only. Each of the operation codes of the cache lock instruction and the cache unlock instruction identifies a specific one of these instructions.

The cache memory control method and computer of the present embodiment is effective in increasing the access speed of the CPU to the main memory even when a program with which it is not expected to suitably construct the referential locality is executed by the CPU.

Figure 21:
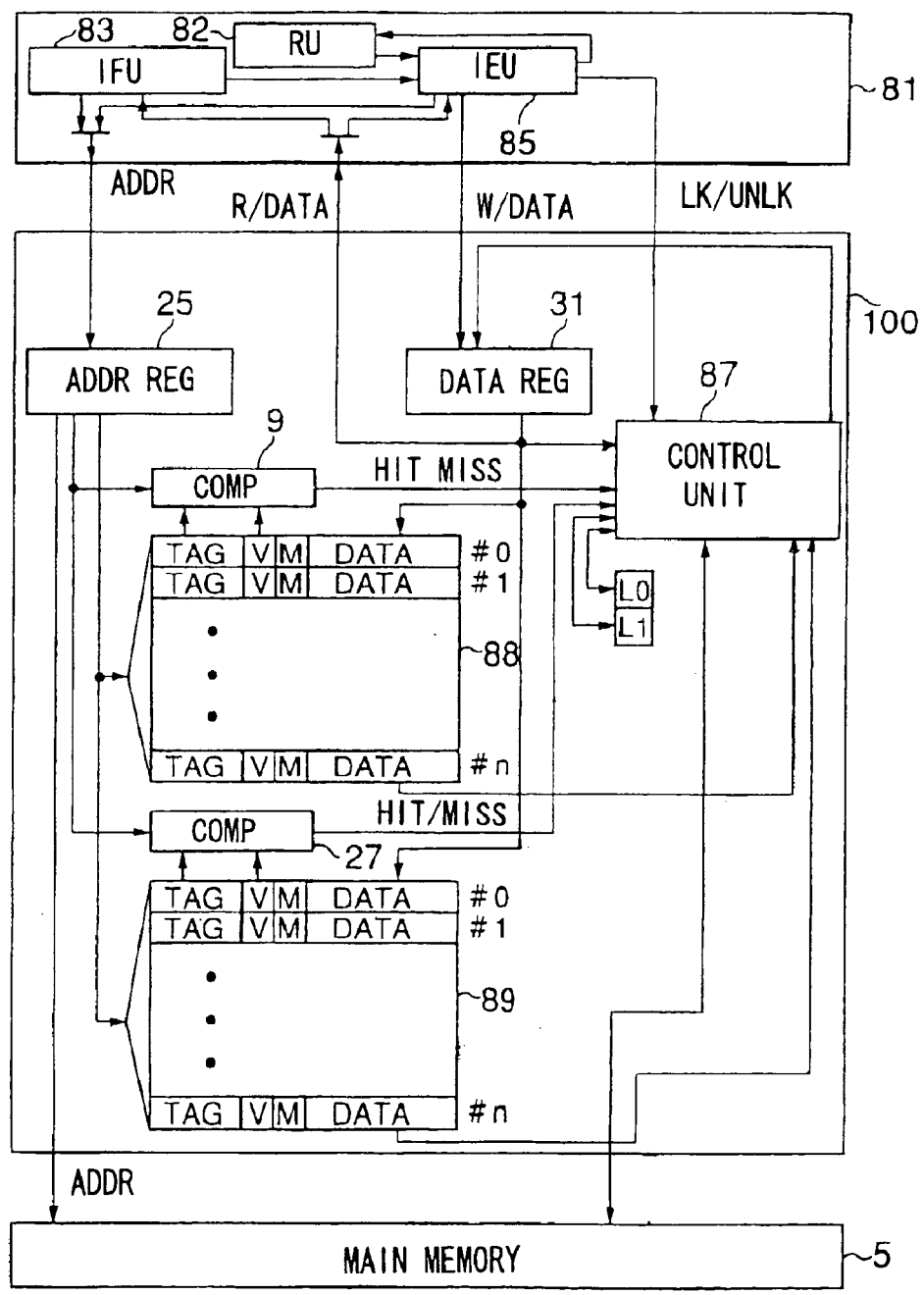
FIG. 21 is a block diagram of a 2-way set-associative cache computer to which another preferred embodiment of the invention is applied.

FIG. 21 shows a configuration of a 2-way set-associative cache computer to which another preferred embodiment of the invention is applied.

The cache computer of FIG. 21 is similar to the cache computer of FIG. 19. However, in the present embodiment, a lock/unlock instruction is supplied to the cache memory so that a replace-inhibition state of each of respective cache ways of the cache memory is set or reset by the lock/unlock instruction, and the replacing of each of the respective cache ways to the main memory is inhibited or allowed.

As shown in FIG. 21, the cache computer of the present embodiment is capable of setting the replace-inhibition states of each of a cache way 88 and a cache way 89 of the cache memory 100 in which replacing each of the respective cache ways 88 and 89 to the main memory 5 is inhibited. The cache computer of FIG. 21 is similar in construction to the cache computer of FIG. 19 except that the CPU 81 includes an instruction fetching unit (IFU) 83, a register unit (RU) 82, and an instruction execution unit (IEU) 85, and that the cache memory 100 includes a lock flag (L0) and a lock flag (L1), which respectively corresponds to the cache way 88 and the cache way 89, both connected to the control unit 87.

Figure 22:
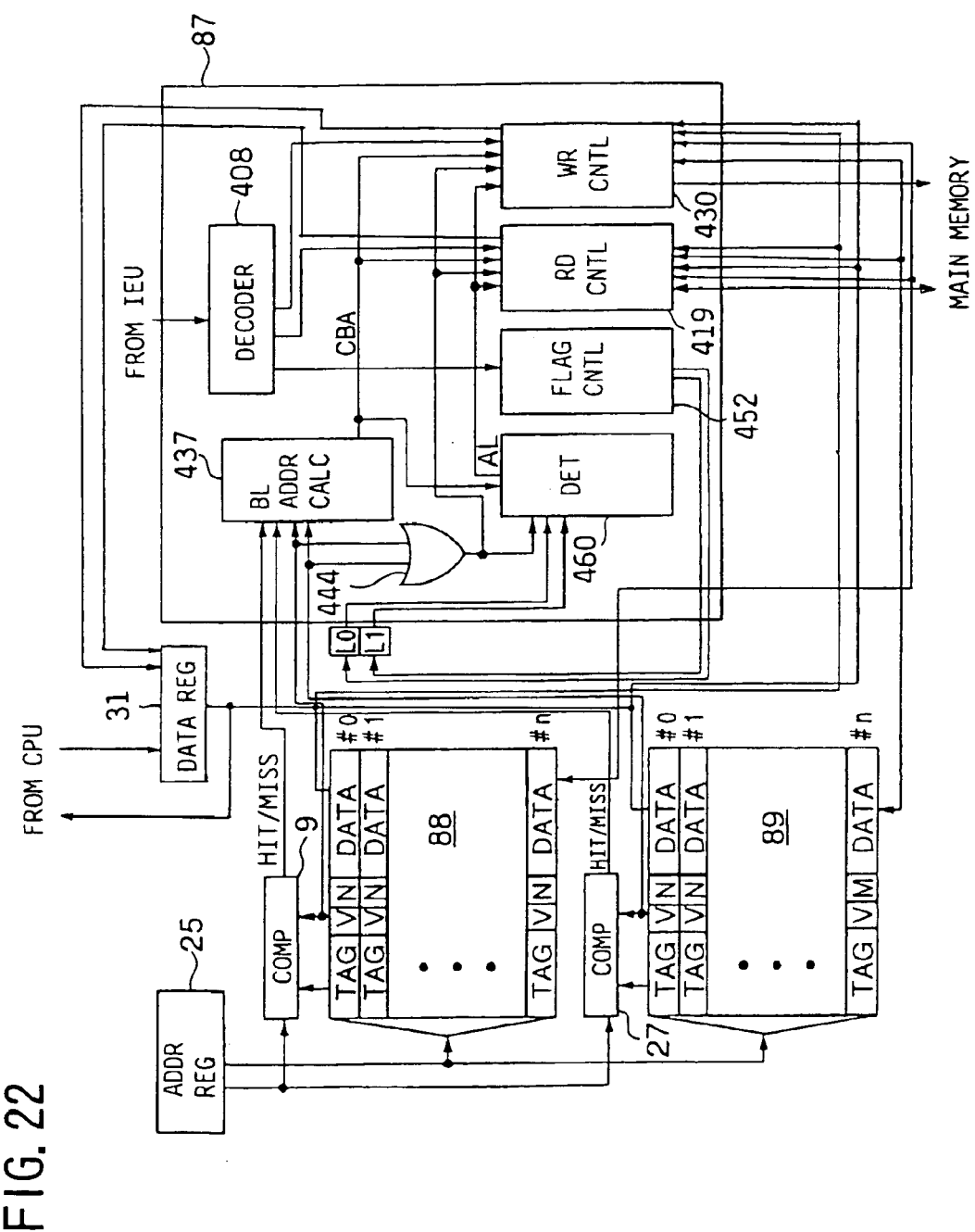
FIG. 22 is a block diagram of a control unit in the 2-way set-associative cache computer of FIG. 21.

FIG. 22 shows a configuration of the control unit 87 in the 2-way set-associative cache computer of FIG. 21.

As shown in FIG. 22, the control unit 87 of the present embodiment is similar in construction to the control unit 77 of FIG. 19 except that each of a flag control unit 452 and a determination unit 460 are connected to both the lock flags L0 and L1. A decoder 408, a block address calculation unit 437, an OR gate 444, a read control unit 419 and a write control unit 430 in the present embodiment are essentially the same as corresponding elements in the previous embodiment of FIG. 20.

The read/write operations of the cache computer of FIG. 21 are similar to those of the cache computer of FIG. 19 except that the IFU 83 reads instructions from the cache memory 100 (or the main memory 5), and, when the IFU 83 reads a cache way lock/unlock instruction or a cash unlock instruction from the cache memory 100 (or the main memory 5), the IFU 83 supplies the lock/unlock instruction to the IEU 85.

When the cache way lock instruction is supplied from the IFU 83 to the IEU 85, the IEU 85 instructs (or supplies the lock signal to) the control unit 87 of the cache memory 100 to set a replace-inhibition state of one of the cache way 88 or the cache way 89 of the cache memory 100 in which replacing the one of the cache ways 88 and 89 to the main memory 5 is inhibited. When the cache way unlock instruction is supplied from the IFU 83 to the IEU 85, the IEU 85 instructs (or supplies the unlock signal to) the control unit 87 to reset the replace-inhibition state of one of the cache way 88 or the cache way 89 of the cache memory 90 such that replacing the one of the cache ways 88 and 89 to the main memory 5 is allowed. Further, when the cache unlock instruction is supplied from the IFU 83 to the IEU 85, the IEU 85 instructs (or supplies the unlock signal to) the control unit 87 of the cache memory 100 to reset the replace-inhibition states of both the cache way 88 and the cache way 89 such that replacing both the cache ways 88 and 89 to the main memory 5 is allowed.

When the setting of the replace-inhibition state of one of the cache ways 88 and 89 is instructed to the control unit 87 by the IEU 85, the flag control unit 452 sets a corresponding one of the lock flag L0 and the lock flag L1 to one. On the other hand, when the resetting of the replace-inhibition state of one of the cache ways 88 and 89 is instructed to the control unit 87 by the IEU 85, the flag control unit 452 resets a corresponding one of the lock flags L0 and L1 to zero. Further, when the resetting of both the replace-inhibition states of the cache ways 88 and 89 is instructed to the control unit 87 by the IEU 85, the flag control unit 452 resets both the lock flags L0 and L1 to zero.

In the control unit 87 of FIG. 22, when the reading of data from the main memory 5 is performed by the CPU 81, the read control unit 419 and the write control unit 430 determine whether each of the lock flags L0 and L1 is equal to 0 (zero) or 1 (one), in accordance with the all lock signal AL supplied by the determination unit 460. When the lock flag L0 or L1 is equal to 0, replacing a corresponding one of the cache ways 88 and 89 to the main memory 5 is allowed. When the lock flag L0 or L1 is equal to 1, replacing a corresponding one of the cache ways 88 and 89 to the main memory 5 is inhibited. In the latter case, the data is read from the main memory 5 by the CPU 71, and replacing the corresponding one of the cache ways 88 and 89 to the main memory 5 is inhibited during the reading of the data by the CPU 81.

Similarly, when the writing of data to the main memory 5 is performed by the CPU 81, the read control unit 419 and the write control unit 430 determine whether each of the lock flags L0 and L1 is equal to 0 (zero) or 1 (one), in accordance with the all lock signal AL supplied by the determination unit 460. When the lock flag L0 or L1 is equal to 0, replacing a corresponding one of the cache ways 88 and 89 to the main memory 5 is allowed. When the lock flag L0 or L1 is equal to 1, replacing a corresponding one of the cache ways 88 and 89 to the main memory 5 is inhibited. In the latter case, the new data is written to the main memory 5 by the CPU 81, and replacing the corresponding one of the cache ways 88 and 89 to the main memory 5 is inhibited during the writing of the data by the CPU 81.

Figure 23:
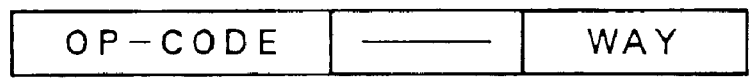
FIG. 23 is a diagram for explaining a format of a cache way lock/unlock instruction in the above preferred embodiment of the invention.

FIG. 23 shows a format of the cache way lock/unlock instructions in the present embodiment of the invention. As shown in FIG. 23, each of the cache way lock/unlock instructions includes an operation code (OP-CODE) and a cache way designation field (WAY). Each of the operation codes of the cache way lock/unlock instructions identifies a specific one of these instructions. The cache way designation field (WAY) contains a specific cache way number that identifies one of the cache ways 88 and 89, both of which are retained in the register unit (RU) 82.

In the above-described embodiment, the cache way lock/unlock instruction is supplied to the cache memory to either set or reset the replace-inhibition state of each of the respective cache ways of the cache memory, such that the replacing of each of the respective cache ways to the main memory is inhibited or allowed. The cache memory control method and computer of the above-described embodiment is effective in increasing the access speed of the CPU to the main memory even when a program with which it is not expected to suitably construct the referential locality is executed by the CPU.

Figure 24:
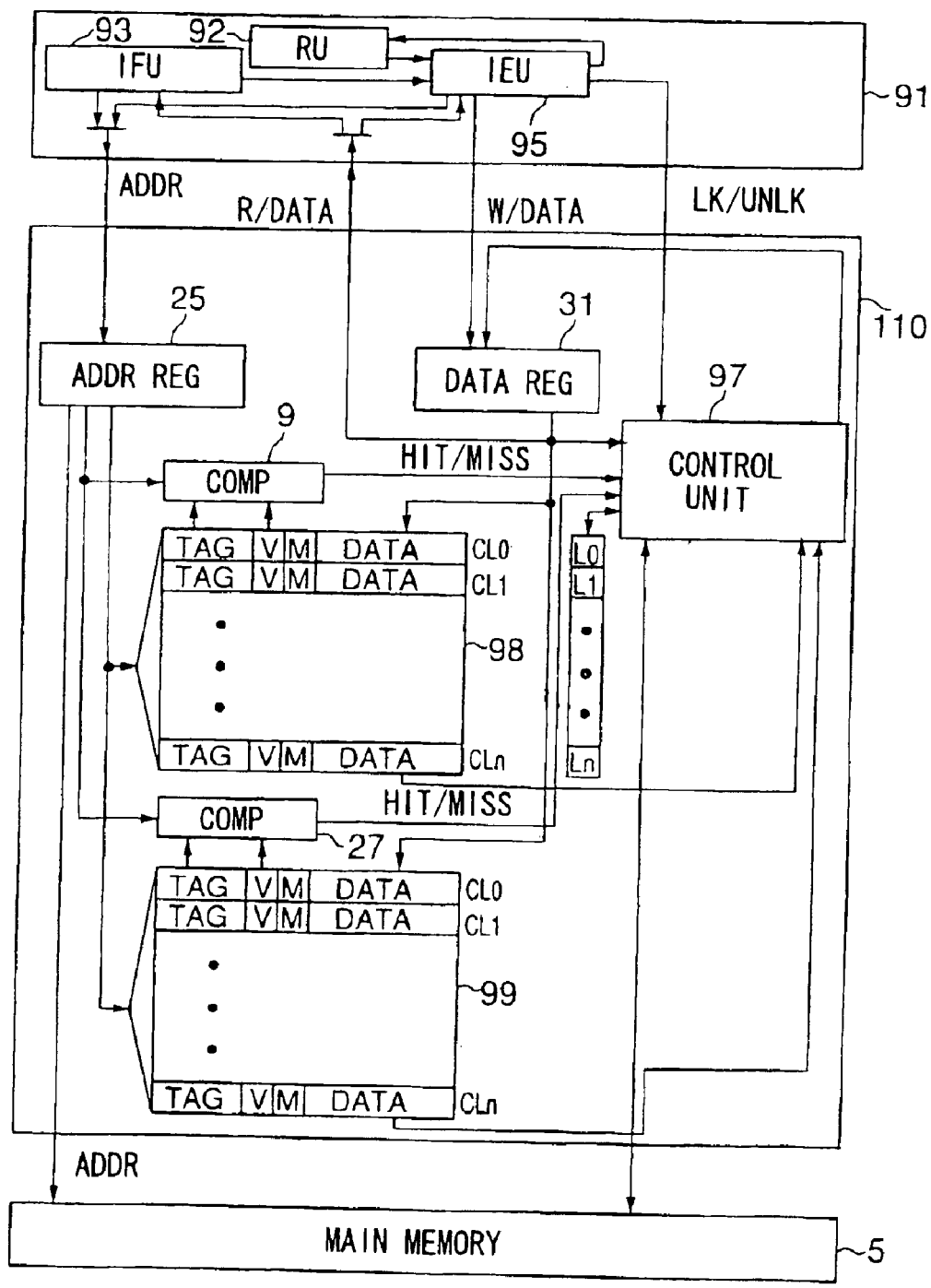
FIG. 24 is a block diagram of a 2-way set-associative cache computer to which another preferred embodiment of the invention is applied.

FIG. 24 shows a configuration of a 2-way set-associative cache computer to which another preferred embodiment of the invention is applied.

As shown in FIG. 24, the cache computer of the present embodiment is capable of setting a replace-inhibition state of each of a plurality of cache lines CL0 through CLn in one of a cache way 98 and a cache way 99 of the cache memory 110 in which replacing each of the respective cache lines CL0 through CLn to the main memory 5 is inhibited. The cache computer of FIG. 24 is similar in construction to the cache computer of FIG. 21 except that the CPU 91 includes an instruction fetching unit (IFU) 93, a register unit (RU) 92, and an instruction execution unit (IEU) 95, and that the cache memory 100 includes a plurality of lock flags L0 through Ln, which respectively correspond to the cache lines CL0 through CLn in one of the cache ways 98 and 99, each of which is connected to the control unit 97.

Figure 25:
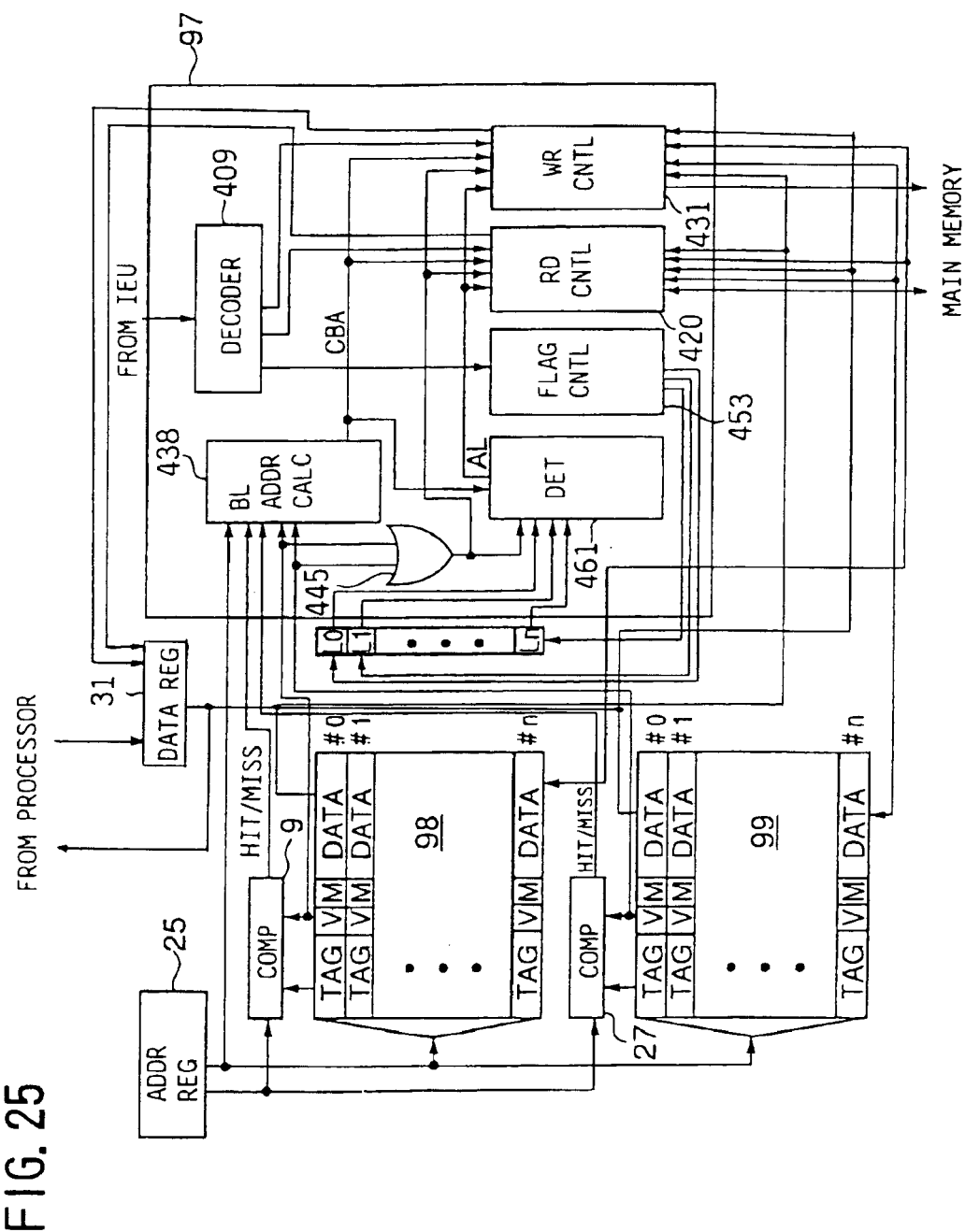
FIG. 25 is a block diagram of a control unit in the 2-way set-associative cache computer of FIG. 24.

FIG. 25 shows a configuration of the control unit 97 in the 2-way set-associative cache computer of FIG. 24.

As shown in FIG. 25, the control unit 97 of the present embodiment is similar in construction to the control unit 87 of FIG. 22 except that each of a flag control unit 453 and a determination unit 461 is connected to all of the lock flags L0 through Ln. A decoder 409, a block address calculation unit 438, an OR gate 445, a read control unit 420 and a write control unit 431 in the present embodiment are essentially the same as corresponding elements in the previous embodiment of FIG. 22.

The read/write operations of the cache computer of FIG. 24 are similar to those of the cache computer of FIG. 21 except that the IFU 93 reads instructions from the cache memory 110 (or the main memory 5), and, when the IFU 93 reads a cache line lock/unlock instruction or a cash unlock instruction from the cache memory 110 (or the main memory 5), the IFU 93 supplies the lock/unlock instruction to the IEU 95.

When the cache line lock instruction is supplied from the IFU 93 to the IEU 95, the IEU 95. instructs (or supplies the lock signal to) the control unit 97 of the cache memory 110 to set a replace-inhibition state of one of the cache lines CL0–CLn in one of the cache way 98 or the cache way 99 of the cache memory 110 in which replacing the one of the cache lines CL0–CLn to the main memory 5 is inhibited. When the cache line unlock instruction is supplied from the IFU 93 to the IEU 95, the IEU 95 instructs (or supplies the unlock signal to) the control unit 97 to reset the replace-inhibition state of one of the cache lines CL0–CLn in one of the cache way 98 or the cache way 99 of the cache memory 110 such that replacing the one of the cache lines CL0–CLn to the main memory 5 is allowed. Further, when the cache unlock instruction is supplied from the IFU 93 to the IEU 95, the IEU 95 instructs (or supplies the unlock signal to) the control unit 97 of the cache memory 110 to reset the replace-inhibition states of all the cache lines CL0–CLn in one of the cache way 98 and the cache way 99 such that replacing all the cache lines CL0–CLn to the main memory 5 is allowed.

When the setting of the replace-inhibition state of one of the cache lines CL0–CLn is instructed to the control unit 97 by the IEU 95, the flag control unit 453 sets a corresponding one of the lock flags L0–Ln to one. On the other hand, when the resetting of the replace-inhibition state of one of the cache lines CL0–CLn is instructed to the control unit 97 by the IEU 95, the flag control unit 453 resets a corresponding one of the lock flags L0–Ln to zero. Further, when the resetting of all the replace-inhibition states of the cache lines CL0–CLn is instructed to the control unit 97 by the IEU 95, the flag control unit 453 resets all the lock flags L0–Ln to zero.

In the control unit 97 of FIG. 25, when the reading of data from the main memory 5 is performed by the CPU 91, the read control unit 420 and the write control unit 431 determine whether each of the lock flags L0–Ln is equal to 0 (zero) or 1 (one), in accordance with the all lock signal AL supplied by the determination unit 461. When any of the lock flags L0–Ln is equal to 0, replacing a corresponding one of the cache lines CL0–CLn to the main memory 5 is allowed. When any of the lock flags L0–Ln is equal to 1, replacing a corresponding one of the cache lines CL0–CLn to the main memory 5 is inhibited. In the latter case, the data is read from the main memory 5 by the CPU 91, and replacing the corresponding one of the cache lines CL0–CLn to the main memory 5 is inhibited during the reading of the data by the CPU 91.

Similarly, when the writing of data to the main memory 5 is performed by the CPU 91, the read control unit 420 and the write control unit 431 determine whether each of the lock flags L0–Ln is equal to 0 (zero) or 1 (one), in accordance with the all lock signal AL supplied by the determination unit 461. When any of the lock flags L0–Ln is equal to 0, replacing a corresponding one of the cache lines CL0–CLn to the main memory 5 is allowed. When any of the lock flags L0–Ln is equal to 1, replacing a corresponding one of the cache lines CL0–CLn to the main memory 5 is inhibited. In the latter case, the new data is written to the main memory 5 by the CPU 91, and replacing the corresponding one of the cache lines CL0–CLn to the main memory 5 is inhibited during the writing of the data by the CPU 91.

Figure 26:
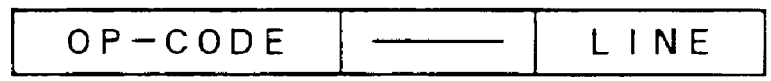
FIG. 26 is a diagram for explaining a format of a cache line lock/unlock instruction in the above preferred embodiment of the invention.

FIG. 26 shows a format of the cache line lock/unlock instructions in the present embodiment of the invention. As shown in FIG. 26, each of the cache line lock/unlock instructions includes an operation code (OP-CODE) and a cache line designation field (LINE). Each of the operation codes of the cache line lock/unlock instructions identifies a specific one of these instructions. The cache line designation field (LINE) contains a specific cache line number that identifies one of the cache lines CL0–CLn in one of the cache ways 98 and 99, all of which are retained in the register unit (RU) 92.

In the above-described embodiment, the cache line lock/unlock instruction is supplied to the cache memory to either set or reset the replace-inhibition state of each of the respective cache lines of the cache memory, such that the replacing of each of the respective cache lines to the main memory is inhibited or allowed. The cache memory control method and computer of the above-described embodiment is effective in increasing the access speed of the CPU to the main memory even when a program with which it is not expected to suitably construct the referential locality is executed by the CPU.

Figure 27:
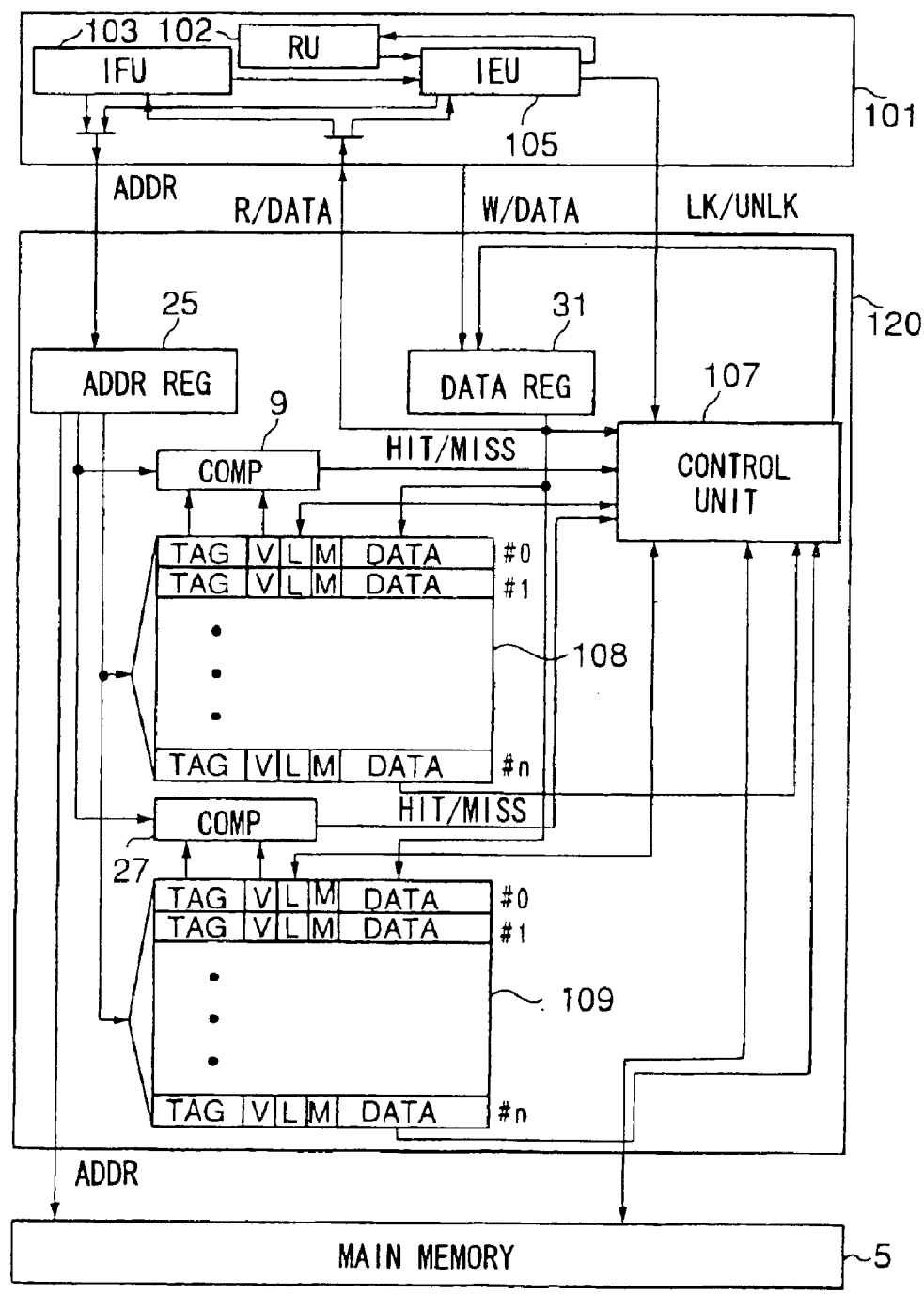
FIG. 27 is a block diagram of a 2-way set-associative cache computer to which another preferred embodiment of the invention is applied.

FIG. 27 shows a configuration of a 2-way set-associative cache computer to which another preferred embodiment of the invention is applied.

As shown in FIG. 27, the cache computer of the present embodiment is capable of setting a replace-inhibition state of each of a plurality of cache blocks #0 through #n in one of a cache way 108 and a cache way 109 of the cache memory 120 in which replacing each of the respective cache blocks #0 through #n to the main memory 5 is inhibited. The cache computer of FIG. 27 is similar in construction to the cache computer of FIG. 24 except that the CPU 101 includes an instruction fetching unit (IFU) 103, a register unit (RU) 102, and an instruction execution unit (IEU) 105, and that the cache memory 120 includes respective lock flags L for the cache blocks #0 through #n in one of the cache ways 108 and 109.

Figure 28:
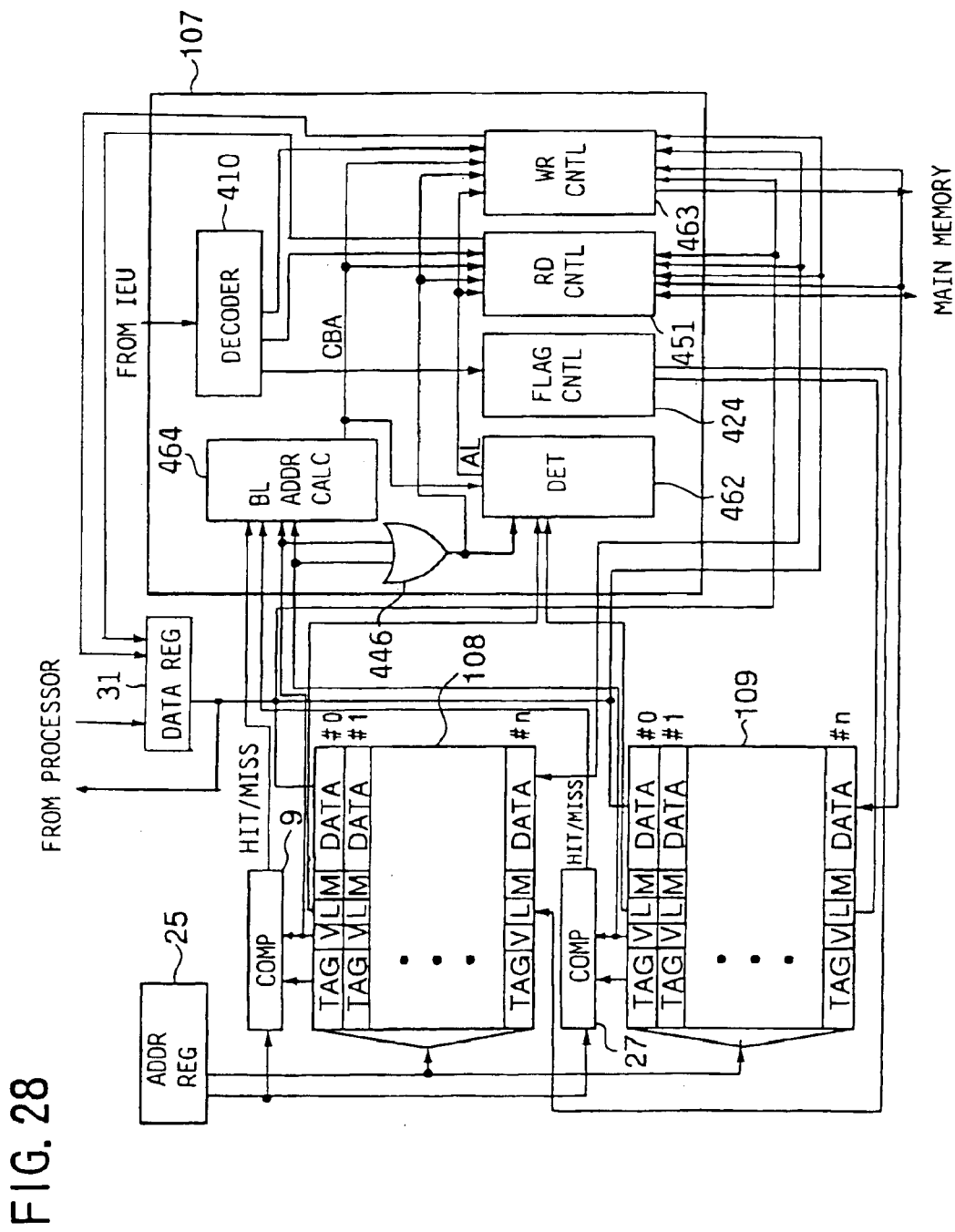
FIG. 28 is a block diagram of a control unit in the 2-way set-associative cache computer of FIG. 27.

FIG. 28 shows a configuration of the control unit 107 in the 2-way set-associative cache computer of FIG. 27.

As shown in FIG. 28, the control unit 107 of the present embodiment is similar in construction to the control unit 97 of FIG. 25 except that each of a flag control unit 454 and a determination unit 462 is connected to the lock flags L for each of the cache ways 108 and 109. A decoder 410, a block address calculation unit 464, an OR gate 446, a read control unit 421 and a write control unit 463 in the present embodiment are essentially the same as corresponding elements in the previous embodiment of FIG. 25.

The read/write operations of the cache computer of FIG. 27 are similar to those of the cache computer of FIG. 24 except that the IFU 103 reads instructions from the cache memory 120 (or the main memory 5), and, when the IFU 103 reads a cache block lock/unlock instruction or a cash unlock instruction from the cache memory 120 (or the main memory 5), the IFU 103 supplies the lock/unlock instruction to the IEU 105.

When the cache block lock instruction is supplied from the IFU 103 to the IEU 105, the IEU 105 instructs (or supplies the lock signal to) the control unit 107 of the cache memory 110 to set a replace-inhibition state of one of the cache blocks #0–#n in one of the cache way 108 or the cache way 109 of the cache memory 110 in which replacing the one of the cache blocks #0–#n to the main memory 5 is inhibited. When the cache block unlock instruction is supplied from the IFU 103 to the IEU 105, the IEU 105 instructs (or supplies the unlock signal to) the control unit 107 to reset the replace-inhibition state of one of the cache blocks #0–#n in one of the cache way 108 or the cache way 109 of the cache memory 110 such that replacing the one of the cache blocks #0–#n to the main memory 5 is allowed. Further, when the cache unlock instruction is supplied from the IFU 103 to the IEU 105, the IEU 105 instructs (or supplies the unlock signal to) the control unit 107 of the cache memory 110 to reset the replace-inhibition states of all the cache blocks #0–#n in one of the cache way 108 or the cache way 109 such that replacing all the cache blocks #0–#n to the main memory 5 is allowed.

When the setting of the replace-inhibition state of one of the cache blocks #0–#n is instructed to the control unit 107 by the IEU 105, the flag control unit 454 sets a corresponding one of the lock flags L for the cache block to one. On the other hand, when the resetting of the replace-inhibition state of one of the cache blocks #0–#n is instructed to the control unit 107 by the IEU 105, the flag control unit 454 resets a corresponding one of the lock flags L for the cache block to zero. Further, when the resetting of all the replace-inhibition states of the cache blocks #0–#n is instructed to the control unit 107 by the IEU 105, the flag control unit 454 resets all the lock flags L for the cache blocks to zero.

In the control unit 107 of FIG. 28, when the reading of data from the main memory 5 is performed by the CPU 101, the read control unit 421 and the write control unit 463 determine whether each of the lock flags L of the cache blocks is equal to 0 (zero) or 1 (one), in accordance with the all lock signal AL supplied by the determination unit 462. When any of the lock flags L is equal to 0, replacing a corresponding one of the cache blocks #0–#n to the main memory 5 is allowed. When any of the lock flags L is equal to 1, replacing a corresponding one of the cache blocks #0–#n to the main memory 5 is inhibited. In the latter case, the data is read from the main memory 5 by the CPU 101, and replacing the corresponding one of the cache blocks #0–#n to the main memory 5 is inhibited during the reading of the data by the CPU 101.

Similarly, when the writing of data to the main memory 5 is performed by the CPU 101, the read control unit 421 and the write control unit 463 determine whether each of the lock flags L of the cache blocks is equal to 0 (zero) or 1 (one), in accordance with the all lock signal AL supplied by the determination unit 462. When any of the lock flags L is equal to 0, replacing a corresponding one of the cache blocks #0–#n to the main memory 5 is allowed. When any of the lock flags L is equal to 1, replacing a corresponding one of the cache blocks #0–#n to the main memory 5 is inhibited. In the latter case, the new data is written to the main memory 5 by the CPU 101, and replacing the corresponding one of the cache blocks #0–#n to the main memory 5 is inhibited during the writing of the data by the CPU 101.

The format of the cache block lock/unlock instruction in the present embodiment of the invention is the same as that shown in FIG. 14. Similar to that shown in FIG. 14, each of the cache block lock/unlock instructions contains an operation code (OP-CODE), a base address (BASE), and an offset address (OFFSET). The base address (BASE) indicates a number of a register in the RU 102 which retains a base value of a cache memory address needed to identify one of the cache blocks of the cache memory 120. The offset address (OFFSET) indicates a number of a register in the RU 102 which retains an offset value of the cache memory address needed to identify one of the cache blocks of the cache memory 120. The memory address is calculated by adding the offset address to the base address.

In the above-described embodiment, the cache block lock/unlock instruction is supplied to the cache memory to either set or reset the replace-inhibition state of each of the respective cache blocks of the cache memory, such that the replacing of each of the respective cache blocks to the main memory is inhibited or allowed. The cache memory control method and computer of the above described embodiment is effective in increasing the access speed of the CPU to the main memory even when a program with which it is not expected to suitably construct the referential locality is executed by the CPU.

Figure 29:
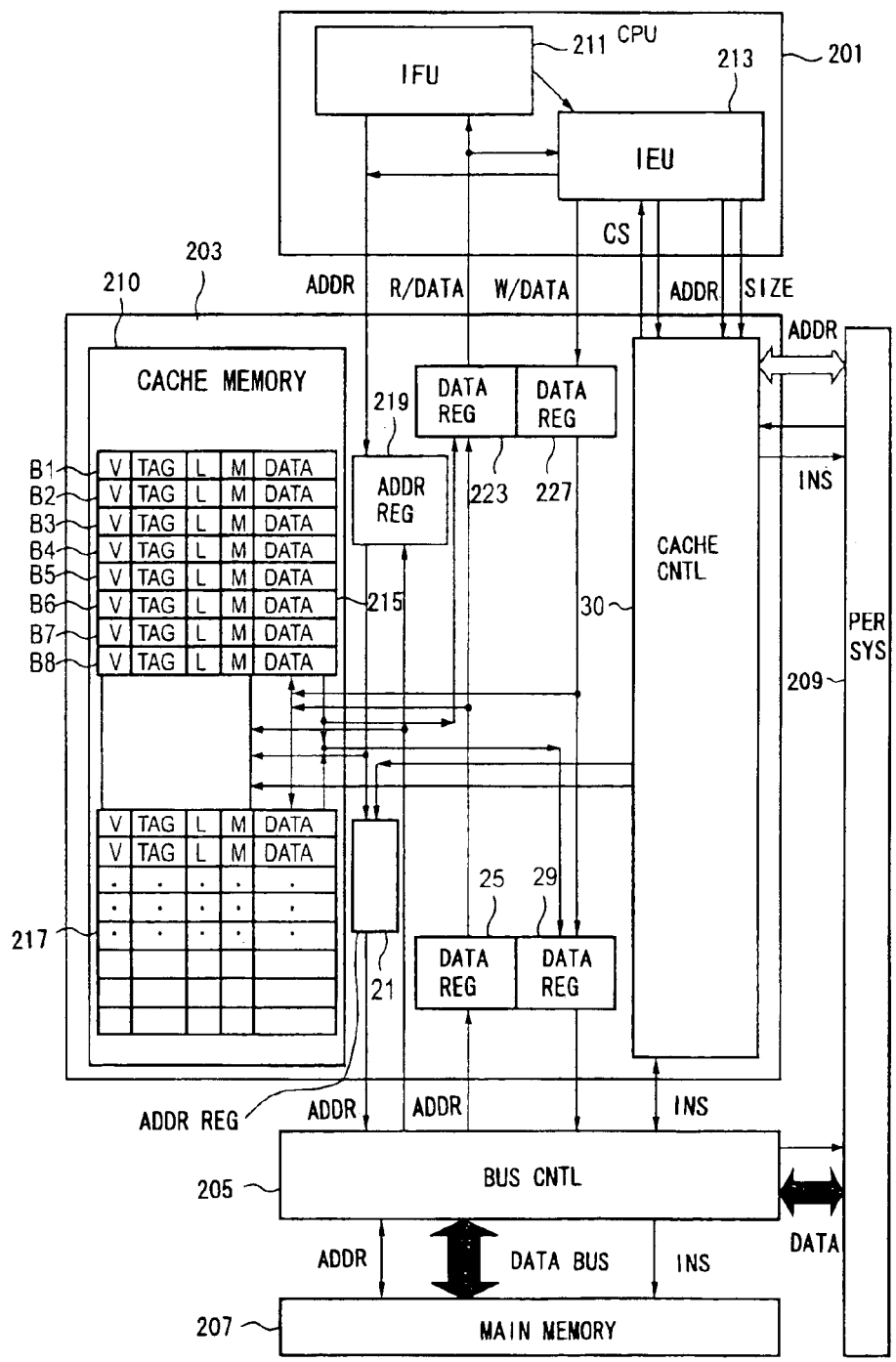
FIG. 29 is a block diagram of a cache computer to which another preferred embodiment of the invention is applied.

Next, FIG. 29 shows a cache computer to which another preferred embodiment of the invention is applied.

In a conventional cache computer, a part of the controlling processing of the cache memory is not carried out by the program code instructions (or the software). Even if writing the data of the cache memory to the main memory is not needed, the writing is actually performed by the conventional cache computer, and the efficiency of the accessing of the CPU to the main memory is deteriorated due to the execution of the unnecessary writing operation.

In a conventional cache memory control method, a fetch instruction is executed so that data is loaded from the main memory into the cache memory on one cache block. In the conventional cache memory control method, it is not assured that the data in the cache memory is unchanged until a time the data is actually needed.

In the cache computer of the present embodiment, a cache controller processes information stored in a cache block of the cache memory at a designated address when an instruction including the designated address is executed by the CPU, in order to increase the access speed of the CPU to the main memory.

As shown in FIG. 29, the cache computer of the present embodiment generally comprises a CPU 201, a cache portion 203, a bus control unit 205, a main memory 207, and a peripheral system 209. The CPU 201 includes an instruction fetching unit (IFU) 211 and an instruction execution unit (IEU) 213. The cache portion 203 includes a cache memory 210, a first cache way 215, a second cache way 217, address registers 219 and 221, data registers 223, 225, 227 and 229, and a cache control unit 230.

In the cache computer of FIG. 29, the CPU 201 performs arithmetic/logic computations. The cache portion 203 is connected between the CPU 201 and the bus control unit 205, and connected to the peripheral system 209. The cache memory 210 temporarily stores the data sent from either the main memory 207 or the peripheral system 209. The IEU 213 is connected to the cache control unit 230, and this cache control unit 230 controls the cache memory 210 in response to a request sent from either the CPU 201 or the peripheral system 209.

The bus control unit 205 controls the data bus between the cache memory 210 and the main memory 207 as well as the address bus between the cache memory 210 and the main memory 207. The bus control unit 205 controls the data transfer between the cache memory 210 and the peripheral system 209. The main memory 207 is connected to the bus control unit 205 and holds an instruction and/or data. The cache memory 210 is divided into the first and second cache ways 215 and 217, and each of the cache ways 215 and 217 includes a plurality of cache blocks B1 through B8.

As shown in FIG. 29, each of the cache blocks B1 through B8 includes a validity flag (V), a tag (TAG), a lock flag (L), and a cache block data (DATA). In a case of the write-back type cache memory 210, each cache block further includes a modification flag (M) in addition to the above elements.

In the cache memory 210 of FIG. 29, the validity flag V is reset to zero (V=0) when the cache block is invalid, and set to one (V=1) when the cache block is valid. When V=0, the validity flag indicates that there is no data in the cache block. The tag contains a subset of main memory address that identifies a cached data of a cache block in the cache memory. The lock flag (L) is reset to zero (L=0) when the updating of the address contained in the tag is allowed, and set to one (L=1) when the updating of the address contained in the tag is inhibited.

The modification flag M, in the case of the write-back type, is reset to zero (M=0) when the cache block is not written back to the main memory (non-replacement or non-modification), and set to one (M=1) when the cache block is written back to the main memory (replacement or modification).

In the cache computer of the present embodiment, an instruction, such as a lock/unlock instruction, is written to the cache memory 210 (or the main memory 207), the CPU 201 reads the instruction from the cache memory 210 (or the main memory 207), and processes the data of the cache block of the cache memory at a designated address of the instruction. Accordingly, the operation of the cache computer of the present embodiment is effective in increasing the efficiency of the instruction execution of the CPU by using the cache memory and in increasing the accessing speed of the CPU to the main memory by using the cache memory.

Figure 30:
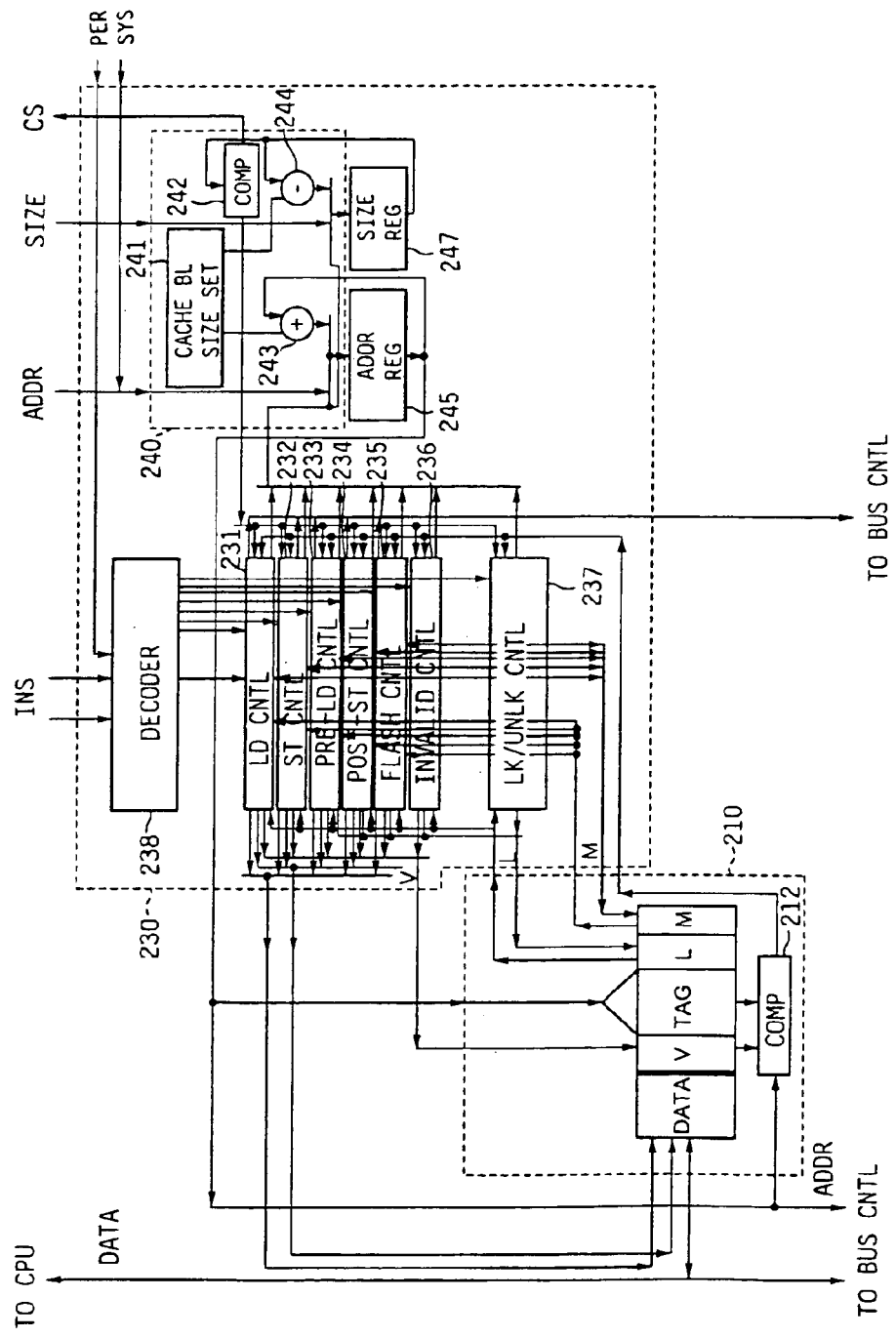
FIG. 30 is a block diagram of a cache control unit in the cache computer of FIG. 29.

FIG. 30 shows a configuration of the cache control unit 230 in the cache computer of FIG. 29.

As shown in FIG. 30, the cache control unit 230 generally includes a load control unit 231, a store control unit 232, a preload control unit 234, a poststore control unit 234, a flash control unit 235, an invalidate control unit 236, a lock/unlock control unit 237, a decoder 238, an address region control unit 240, an address register 245, and a size register 247. The address region control unit 240 includes a cache block size setting unit 241, a comparator 242, an adder 243, and a subtracter 244.

In the cache memory 210 of FIG. 30, a comparator 212 (not shown in FIG. 29) is provided. The comparator 212 compares the address sent by the address register 245 with the address contained in the tag of one of the cache blocks in the cache memory 210.

The IEU 213 of the CPU 201 is connected to the decoder 238. The decoder 238 is connected to the load control unit 231, the store control unit 232, the preload control unit 233, the poststore control unit 234, the flash control unit 235, the invalidate control unit 236 and the lock/unlock control unit 237, respectively. The address region control unit 240 is connected to the IEU 213 and manages the address of the data being processed.

A description will be given of operations of the cache computer of the present embodiment.

First, the IFU 211 sends an address, which is designated by the needed instruction, to the cache memory 210 via the address register 219, in order to requests the cache memory 210 to supplies the instruction, stored at the designated address of the cache memory 210, to the IFU 211. When a match between the address of the needed instruction and the tag of one of the cache blocks of the cache memory 210 occurs, the instruction is read from one of the cache blocks of the cache memory 210 at the corresponding address. The read instruction is supplied from the cache memory 210 to the IFU 211 via the data register 223.

On the other hand, when a cache miss occurs, the instruction is read from the main memory 207 at an address supplied through the address register 221. The instruction, read from the main memory 207, is supplied to the IFU 211 via the data registers 225 and 223.

Next, the IFU 211 sends the instruction, which is read from either the cache memory 210 or the main memory 207, to the IEU 213. The IEU 213 executes the instruction received from the IFU 211. The operation of the cache computer of the present embodiment varies depending on the kind of the instruction, which will be described below.

When the lock/unlock instruction is executed by the CPU 201 (the IEU 213), a corresponding start address for the lock/unlock instruction and a corresponding size of the address region for the lock/unlock instruction are supplied to the address region control unit 240 of the cache control unit 230. The start address is supplied to the comparator 212 through the address register 245. Before supplying the start address to the comparator 212, an address value corresponding to a size of one cache block, set by the cache block size setting unit 241, is added to the start address at the adder 243. The comparator 212 determines whether the address designated by the lock/unlock instruction matches with an address of one of the cache blocks of the cache memory 210 by sequentially scanning the tags of the cache blocks in the cache memory 210.

The signal for the lock/unlock instruction is supplied to the lock/unlock control unit 237 from the comparator 242. When a given address region of the cache memory is scanned, the lock/unlock control unit 237 is made active. Each time the tag of one of the cache blocks in the cache memory 210 is scanned, the size of one cache block is subtracted from the size of the address region output by the size register 247, at the subtracter 244. When the scanning of the entire address region of the cache memory 210 is completed, the comparator 242 sends a scan-complete signal to the IEU 213.

When the match between the address of the lock/unlock instruction and the address of one of the cache blocks of the cache memory 210 is determined by the comparator 212, the comparator 212 sends a cache hit signal to the lock/unlock control unit 237. The lock/unlock control unit 237, in response to the cache hit signal, sends a lock/unlock signal to the cache memory 210 to either set a replace-inhibition state of one of the cache blocks in which replacing the one of the cache blocks to the main memory 207 or the peripheral system 209 is inhibited, or reset the replace-inhibition state of the one of the cache blocks such that replacing the one of the cache blocks to the main memory 207 or the peripheral system 209 is allowed.

Specifically, in the cache memory 210, when the replace-inhibition state of the cache block is set, the lock flag L of the cache block is set to one. When the replace-inhibition state of the cache block is reset, the lock flag L of the cache block in the cache memory 210 is reset to zero.

In the cache computer of FIG. 29, the values of the lock flags L of all the cache blocks in the cache memory 210 are supplied to the load control unit 231, the store control unit 232, the preload control unit 233, the poststore control unit 234, the flash control unit 235, the invalidate control unit 236 and the lock/unlock control unit 237, respectively. When the lock flag L=0, replacing the corresponding one of the cache blocks to the main memory 207 or the peripheral system 209 is allowed. When the lock flag L=1, replacing the corresponding one of the cache blocks to the main memory 207 or the peripheral system 209 is inhibited.

In the above-described embodiment, a cache hit for the cache block data of the cache memory at the designated address of the instruction occurs with a high possibility and a reduced access time. The cache memory control method and computer of the above-described embodiment is effective in increasing the access speed of the CPU to the main memory even when a program with which it is not expected to suitably construct the referential locality is executed by the CPU.

Figure 31:
FIG. 31 is a diagram for explaining a format of a lock/unlock instruction in the above preferred embodiment of the invention.

FIG. 31 shows a format of a lock/unlock instruction used in the cache computer of FIG. 29. As shown in FIG. 31, each of the lock instruction and the unlock instruction contains an operation code (OP-CODE), an address designation field (AD) and an address-region size designation field (SIZE). Each of the operation codes of the lock instruction and the unlock instruction identifies a specific one of these instructions. The format of the instruction shown in FIG. 31 may be used in the cache computer of the present embodiment for other kinds of instruction.

When the load instruction is executed by the CPU 201 (the IEU 213), a corresponding start address for the load instruction and a corresponding size of the address region for the load instruction are supplied to the load control unit 231 of the cache control unit 230. The start address is supplied to the comparator 212 through the address register 245. Before supplying the start address to the comparator 212, an address value corresponding to a size of one cache block, set by the cache block size setting unit 241, is added to the start address at the adder 243. The comparator 212 determines whether the address designated by the load instruction matches with an address of one of the cache blocks of the cache memory 210 by sequentially scanning the tags of the cache blocks in the cache memory 210.

The signal for the load instruction is supplied to the load control unit 231 from the comparator 242. When a given address region of the cache memory is scanned, the load control unit 231 is made active. Each time the tag of one of the cache blocks in the cache memory 210 is scanned, the size of one cache block is subtracted from the size of the address region output by the size register 247, at the subtracter 244. When the scanning of the entire address region of the cache memory 210 is completed, the comparator 212 sends a scan-complete signal to the IEU 213.

When the match between the address of the load instruction and the address of one of the cache blocks of the cache memory 210 is determined by the comparator 212, the comparator 212 sends a cache hit signal to the load control unit 231. The load control unit 231, in response to the cache hit signal, sends a load signal to the cache memory 210 to load data of the corresponding one of the cache blocks into the CPU 201.

In the above-described embodiment, a cache hit for the cache block data of the cache memory at the designated address of the instruction occurs with a high possibility and a reduced access time. The cache memory control method and computer of the above-described embodiment is effective in increasing the access speed of the CPU to the main memory even when a program with which it is not expected to suitably construct the referential locality is executed by the CPU.

Figures 33, 34:
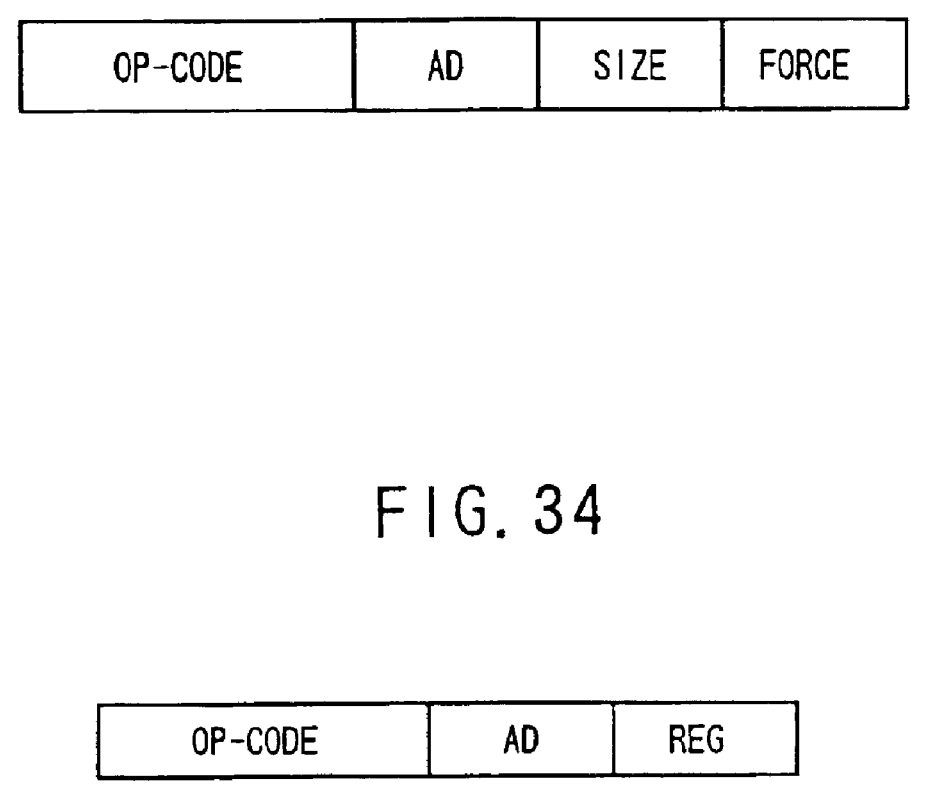

FIG. 34 shows a format of a load/store instruction for a single register, used in the cache computer of FIG. 29. As shown in FIG. 34, each of the load instruction and the store instruction for a single register contains an operation code (OP-CODE), an address designation field (AD), and a register designation field (REG). Each of the operation codes of the load instruction and the store instruction identifies a specific one of these instructions.

In addition, the format of a load/store instruction for plural registers is essentially the same as the format of the instruction shown in FIG. 31. That is, each of the load instruction and the store instruction for plural registers contains an operation code (OP-CODE), an address designation field (AD), and an address-region size field (SIZE).

When the store instruction is executed by the CPU 201 (the IEU 213), a corresponding start address for the store instruction and a corresponding size of the address region for the store instruction are supplied to the store control unit 232 of the cache control unit 230. The start address is supplied to the comparator 212 through the address register 245. Before supplying the start address to the comparator 212, an address value corresponding to a size of one cache block, set by the cache block size setting unit 241, is added to the start address at the adder 243. The comparator 212 determines whether the address designated by the store instruction matches with an address of one of the cache blocks of the cache memory 210 by sequentially scanning the tags of the cache blocks in the cache memory 210.

The signal for the store instruction is supplied to the store control unit 232 from the comparator 242. When a given address region of the cache memory is scanned, the store control unit 232 is made active. Each time the tag of one of the cache blocks in the cache memory 210 is scanned, the size of one cache block is subtracted from the size of the address region output by the size register 247, at the subtracter 244. When the scanning of the entire address region of the cache memory 210 is completed, the comparator 212 sends a scan-complete signal to the IEU 213.

When the match between the address of the store instruction and the address of one of the cache blocks of the cache memory 210 is determined by the comparator 212, the comparator 212 sends a cache hit signal to the store control unit 232. The store control unit 232, in response to the cache hit signal, sends a store signal to the cache memory 210 to store data from the CPU 201 into the corresponding one of the cache blocks of the cache memory 210.

In the above-described embodiment, a cache hit for the cache block data of the cache memory at the designated address of the instruction occurs with a high possibility and a reduced access time. The cache memory control method and computer of the above-described embodiment is effective in increasing the access speed of the CPU to the main memory even when a program with which it is not expected to suitably construct the referential locality is executed by the CPU.

When the preload instruction is executed by the CPU 201 (the IEU 213), a corresponding start address for the preload instruction and a corresponding size of the address region for the preload instruction are supplied to the preload control unit 233 of the cache control unit 230. The start address is supplied to the comparator 212 through the address register 245. Before supplying the start address to the comparator 212, an address value corresponding to a size of one cache block, set by the cache block size setting unit 241, is added to the start address at the adder 243. The comparator 212 determines whether the address designated by the preload instruction matches with an address of one of the cache blocks of the cache memory 210 by sequentially scanning the tags of the cache blocks in the cache memory 210.

The signal for the preload instruction is supplied to the preload control unit 233 from the comparator 242. When a given address region of the cache memory is scanned, the preload control unit 233 is made active. Each time the tag of one of the cache blocks in the cache memory 210 is scanned, the size of one cache block is subtracted from the size of the address region output by the size register 247, at the subtracter 244. When the scanning of the entire address region of the cache memory 210 is completed, the comparator 212 sends a scan-complete signal to the IEU 213.

When the match between the address of the preload instruction and the address of one of the cache blocks of the cache memory 210 is determined by the comparator 212, the comparator 212 sends a cache hit signal to the preload control unit 233. The preload control unit 233, in response to the cache hit signal, sends a preload signal to the cache memory 210 to preload data from the main memory 207 into the corresponding one of the cache blocks of the cache memory 210.

In the above-described embodiment, a cache hit for the cache block data of the cache memory at the designated address of the instruction occurs with a high possibility and a reduced access time. The cache memory control method and computer of the above-described embodiment is effective in increasing the access speed of the CPU to the main memory even when a program with which it is not expected to suitably construct the referential locality is executed by the CPU.

Figure 32:
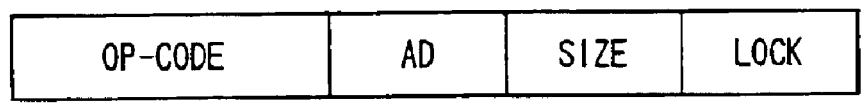
FIG. 32 is a diagram for explaining a format of an instruction in the above preferred embodiment of the invention, which includes a lock designation field.

In the above-described embodiment, a preload instruction with a lock designation field may be executed by the CPU 201. FIG. 32 shows a format of a preload instruction, used in the cache computer of FIG. 29, which includes a lock designation field. As shown in FIG. 32, the preload instruction contains an operation code (OP-CODE), an address designation field (AD), an address-region size field (SIZE), and a lock designation field (L0CK).

When the poststore instruction is executed by the CPU 201 (the IEU 213), a corresponding start address for the poststore instruction and a corresponding size of the address region for the poststore instruction are supplied to the poststore control unit 234 of the cache control unit 230. The start address is supplied to the comparator 212 through the address register 245. Before supplying the start address to the comparator 212, an address value corresponding to a size of one cache block, set by the cache block size setting unit 241, is added to the start address at the adder 243. The comparator 212 determines whether the address designated by the poststore instruction matches with an address of one of the cache blocks of the cache memory 210 by sequentially scanning the tags of the cache blocks in the cache memory 210.

The signal for the poststore instruction is supplied to the poststore control unit 234 from the comparator 242. When a given address region of the cache memory is scanned, the poststore control unit 234 is made active. Each time the tag of one of the cache blocks in the cache memory 210 is scanned, the size of one cache block is subtracted from the size of the address region output by the size register 247, at the subtracter 244. When the scanning of the entire address region of the cache memory 210 is completed, the comparator 212 sends a scan-complete signal to the IEU 213.

When the match between the address of the poststore instruction and the address of one of the cache blocks of the cache memory 210 is determined by the comparator 212, the comparator 212 sends a cache hit signal to the poststore control unit 234. The poststore control unit 234, in response to the cache hit signal, sends a poststore signal to the cache memory 210 to poststore the cache block data (DATA) from the corresponding one of the cache blocks of the cache memory 210 into the main memory 207 only when the lock flag L of that cache block is reset to 0 and the modification flag M of that cache block is set 1. After the data is stored in the main memory 207, the poststore control unit 234 resets the validity flag V of that cache block to 0.

In the above-described embodiment, a cache hit for the cache block data of the cache memory at the designated address of the instruction occurs with a high possibility and a reduced access time. The cache memory control method and computer of the above-described embodiment is effective in increasing the access speed of the CPU to the main memory even when a program with which it is not expected to suitably construct the referential locality is executed by the CPU. In the above-described embodiment, a poststore instruction with an unlock designation field may be executed by the CPU 201. The format of such instruction is essentially the same as that shown in FIG. 32.

When the flash instruction is executed by the CPU 201 (the IEU 213), a corresponding start address for the flash instruction and a corresponding size of the address region for the flash instruction are supplied to the flash control unit 235 of the cache control unit 230. The start address is supplied to the comparator 212 through the address register 245. Before supplying the start address to the comparator 212, an address value corresponding to a size of one cache block, set by the cache block size setting unit 241, is added to the start address at the adder 243. The comparator 212 determines whether the address designated by the flash instruction matches with an address of one of the cache blocks of the cache memory 210 by sequentially scanning the tags of the cache blocks in the cache memory 210.

The signal for the flash instruction is supplied to the flash control unit 235 from the comparator 242. When a given address region of the cache memory is scanned, the flash control unit 235 is made active. Each time the tag of one of the cache blocks in the cache memory 210 is scanned, the size of one cache block is subtracted from the size of the address region output by the size register 247, at the subtracter 244. When the scanning of the entire address region of the cache memory 210 is completed, the comparator 212 sends a scan-complete signal to the IEU 213.

When the match between the address of the flash instruction and the address of one of the cache blocks of the cache memory 210 is determined by the comparator 212, the comparator 212 sends a cache hit signal to the flash control unit 235. The flash control unit 235, in response to the cache hit signal, sends a flash signal to the cache memory 210 to transfer the cache block data (DATA) from the corresponding one of the cache blocks of the cache memory 210 into the main memory 207 only when the lock flag L of that cache block is reset to 0 and the modification flag M of that cache block is set to 1 in the cache memory 210. After the data is stored in the main memory 207, the flash control unit 235 sets the validity flag V of that cache block to 1. When a cache miss signal is received from the comparator 212 for all the cache blocks B1 through B8, the flash control unit 235 does not perform the above-mentioned operation.

In the above-described embodiment, a cache hit for the cache block data of the cache memory at the designated address of the instruction occurs with a high possibility and a reduced access time. The cache memory control method and computer of the above-described embodiment is effective in increasing the access speed of the CPU to the main memory even when a program with which it is not expected to suitably construct the referential locality is executed by the CPU. In the above-described embodiment, a flash instruction with an unlock designation field may be executed by the CPU 201. The format of such instruction is essentially the same as that shown in FIG. 32.

When the invalidate instruction is executed by the CPU 201 (the IEU 213), a corresponding start address for the invalidate instruction and a corresponding size of the address region for the invalidate instruction are supplied to the invalidate control unit 236 of the cache control unit 230. The start address is supplied to the comparator 212 through the address register 245. Before supplying the start address to the comparator 212, an address value corresponding to a size of one cache block, set by the cache block size setting unit 241, is added to the start address at the adder 243. The comparator 212 determines whether the address designated by the invalidate instruction matches with an address of one of the cache blocks of the cache memory 210 by sequentially scanning the tags of the cache blocks in the cache memory 210.

The signal for the invalidate instruction is supplied to the invalidate control unit 236 from the comparator 242. When a given address region of the cache memory is scanned, the invalidate control unit 236 is made active. Each time the tag of one of the cache blocks in the cache memory 210 is scanned, the size of one cache block is subtracted from the size of the address region output by the size register 247, at the subtracter 244. When the scanning of the entire address region of the cache memory 210 is completed, the comparator 212 sends a scan-complete signal to the IEU 213.

When the match between the address of the invalidate instruction and the address of one of the cache blocks of the cache memory 210 is determined by the comparator 212, the comparator 212 sends a cache hit signal to the invalidate control unit 236. The invalidate control unit 236, in response to the cache hit signal, sends an invalidate signal to the cache memory 210 to reset the validity flag (V) of the corresponding one of the cache blocks of the cache memory 210 to zero only when the lock flag L of that cache block is reset to 0 in the cache memory 210. After the validity flag (V) of the cache block is reset to zero, the invalidate control unit 236 does not write the cache block data (DATA) of the cache block back to the main memory 7. When a cache miss signal is received from the comparator 212 for all the cache blocks B1 through B8, the invalidate control unit 236 does not perform the above-mentioned operation.

In the above-described embodiment, a cache hit for the cache block data of the cache memory at the designated address of the instruction occurs with a high possibility and a reduced access time. The cache memory control method and computer of the above-described embodiment is effective in increasing the access speed of the CPU to the main memory even when a program with which it is not expected to suitably construct the referential locality is executed by the CPU. In the above-described embodiment, a invalidate instruction with a force designation field may be executed by the CPU 201.

FIG. 33 shows a format of the invalidate instruction with the force designation field, used in the cache computer of FIG. 29. As shown in FIG. 33, the invalidate instruction contains an operation code (OP-CODE), an address designation field (AD), an address-region size field (SIZE), and a force designation field (FORCE). When the invalidate instruction with the force designation field is executed, the invalidate control unit 236 resets the validity flag (V) of one of the cache blocks of the cache memory 210 to zero regardless of whether the lock flag L of the corresponding cache block is set to 1 or 0. The invalidate control unit 236 does not write the cache block data (DATA) of the cache block back to the main memory 7, resets the validity flag (V) to zero, and resets the lock flag (L) to zero.

As described above, in the cache computer of FIG. 29, the comparator 212 determines that an address designated by an instruction matches with an address of one of the cache blocks of the cache memory 210. The lock/unlock control unit 237 supplies, when a lock/unlock instruction is received. from the CPU 201 and the match is determined by the comparator 212, a lock/unlock signal to the cache memory 210 to either set a replace-inhibition state of one of the cache blocks in which replacing the one of the cache blocks to the main memory 207 or the peripheral system 209 is inhibited, or reset the replace-inhibition state of the one of the cache blocks such that replacing the one of the cache blocks to the main memory 207 or the peripheral system 209 is allowed.

In the cache computer 230 of FIG. 29, the cache control unit 230 further includes the load control unit 231 which supplies, when a load instruction is received from the CPU 201 and the match is determined by the comparator 212, a load signal to the cache memory 210 to load data of the one of the cache blocks into the CPU 201.

In the cache computer 230 of FIG. 29, the cache control unit 230 further includes the store control unit 232 which supplies, when a store instruction is received from the CPU 201 and the match is determined by the comparator 212, a store signal to the cache memory 210 to store data from the CPU 201 into the one of the cache blocks of the cache memory 210.

In the cache computer 230 of FIG. 29, the cache control unit 230 further includes the flash control unit 235 which supplies, when a flash instruction is received from the CPU 201 and the match is determined by the comparator 212, a flash signal to the cache memory 210 to transfer data of the one of the cache blocks to the main memory 207 or the peripheral system 209.

In the cache computer 230 of FIG. 29, the cache control unit 230 further includes the invalidate control unit 236 which supplies, when an invalidate instruction is received from the CPU 201 and the match is determined by the comparator 212, an invalidate signal to the cache memory 210 to invalidate the one of the cache blocks of the cache memory 210.

The operations of the cache computer of the present embodiment with respect to various kinds of instructions are summarized the following table.

| INSTRUCTIONS | OPERATIONS (A) | OPERATIONS (B) | LOCK FLAG | VALIDITY FLAG |
|---|---|---|---|---|
| Load | yes | yes | no change | set/no change |
| Store | yes | yes | no change | set/no change |
| Lock | yes | no | set | no change |
| Unlock | no | yes | reset | no change |
| Preload | yes | A1 | no change | set |
| Preload with Lock | yes | A2 | no change | set/no change |
| Preload without Lock Designation | yes | A1 | no change | set |
| Preload with Lock Designation | yes | A2 | set | set |
| Poststore | yes | no | no change | reset |
| Poststore with Unlock | yes | yes | reset | reset |
| Poststore without Unlock Designation | yes | no | no change | reset |
| Poststore with Unlock Designation | yes | yes | reset | reset |
| Flash | yes | no | no change | no change |
| Flash with Unlock | yes | yes | reset | no change |
| Flash without Unlock Designation | yes | no | no change | no change |
| Flash with Unlock Designation | yes | yes | reset | no change |
| Invalidate | yes | no | reset | reset |
| Forced Invalidate | yes | yes | reset | reset |
| Invalidate without Force Designation | yes | no | reset | reset |
| Invalidate with Force Designation | yes | yes | reset | reset |

In the above table, (A) indicates whether the operation in the unlocked state of the cache memory is performed or not, and (B) indicates whether the operation in the locked state of the cache memory is performed or not. "A1" indicates the operation when the cache block is not locked, and either the execution of the no operation instruction (NOP) or the loading of data into a different cache block is allowed. "A2" indicates the operation when the lock flag of the cache block is set to one (the locked condition), and either the execution of the "no operation" instruction (NOP) or the loading of data into a different cache block is allowed.

Figure 35:
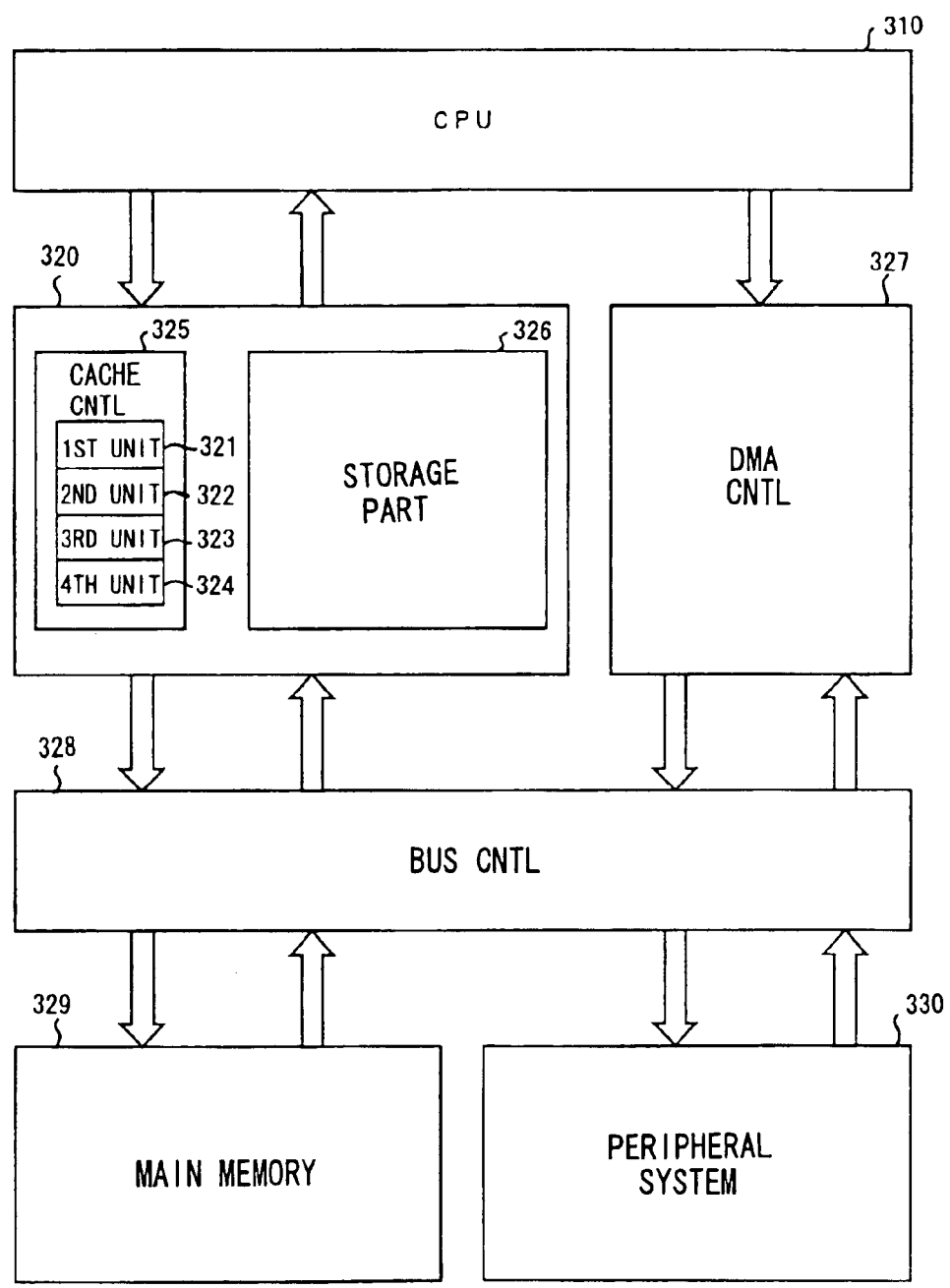
FIG. 35 is a block diagram of a cache computer to which another preferred embodiment of the invention is applied.

Next, FIG. 35 shows a cache computer to which another preferred embodiment of the invention is applied.

In a conventional cache memory control method or computer, a cache memory is connected to a main memory and capable of acting as a random access memory. The main memory has an address space, and this address space is assigned for the cache memory that is acting as the random access memory. The instructions and data of the main memory are temporarily transferred to the cache memory acting as the random access memory, and the access speed of the CPU to the main memory is increased by using the cache memory. However, when a program with which it is not expected to suitably construct the referential locality is executed by the CPU, it is difficult for the conventional cache memory control method or computer to sufficiently increase the access speed of the CPU to the main memory.

In the cache computer of the present embodiment, a cache controller assigns an address space that is separate from an address space of the main memory, for the cache memory acting as the random access memory, so as to optimize the use of the cache memory and increase the access speed of the CPU to the main memory.

As shown in FIG. 35, the cache computer of the present embodiment generally comprises a CPU 310, a cache portion 320, a DMA (direct memory access) control circuit 327, a bus control unit 328, a main memory 329, and a peripheral system 330. The cache portion 320 includes a cache controller 325 and a storage part 326. The cache controller 325 includes a first unit 321, a second unit 322, a third unit 323 and a fourth unit 324.

In the cache computer of FIG. 35, the CPU 310 accesses the cache portion 320 when accessing an instruction or data in the main memory 329. The CPU 310 has a function to start operation of the DMA control circuit 327. The cache portion 320 connects the CPU 310 and the bus control unit 328. The cache portion 320 has a function of acting as a cache memory or a random access memory (RAM). The storage part 326 may include a plurality of cache ways. When a request for writing of data using the DMA transfer is sent to the cache portion 320 by the bus control unit 328, the data is transferred to the storage part 326. When a request for reading of data using the DMA transfer is sent to the cache portion 320 by the bus control unit 328, the data is read from the storage part 326 and transferred to the bus control unit 328.

The cache controller 325 controls the cache portion 320. The first unit 321 performs switching to allow the cache memory, contained in the storage part 326, to act as the RAM. The second unit 322 sets a range in which the cache memory 326 acts as the RAM. The third unit 323 sets an address space of the RAM. The fourth unit 324 receives information from the cache memory when an address space of the cache memory acting as the RAM is accessed, and accesses an external storage device, such as the main memory 329 or the peripheral system 330, when an address outside the address space of the cache memory is accessed.

The storage part 326 includes the cache memory that acts as the RAM, and stores information. The bus control unit 328 interconnects the cache portion 320, the DMA control circuit 327, the main memory 329, and the peripheral system 330. The bus control unit 328 refers to the right of access of the bus between these elements when data is transferred between the cache portion 320 and the peripheral system 330. The bus control unit 328 controls the access to the main memory 329 and to the peripheral system 330. The bus control unit 328 controls the DMA transfer of data from the DMA control circuit 327.

The main memory 329 is connected to the bus control unit 328 and stores information that is used by the CPU 310. The DMA control circuit 327 connects the CPU 310 and the bust control unit 328, and instructs the bus control unit 328 to perform the DMA transfer of data between the peripheral system 330 and the storage part 326. The start of operation of the DMA transfer with the DMA control circuit 327 may be instructed by either the CPU 310 or the peripheral system 330.

Another CPU or another memory (not shown) may be connected to the peripheral system 330. The peripheral system 330 has a function to start the operation of the DMA transfer with the DMA control circuit 327.

Figure 36:
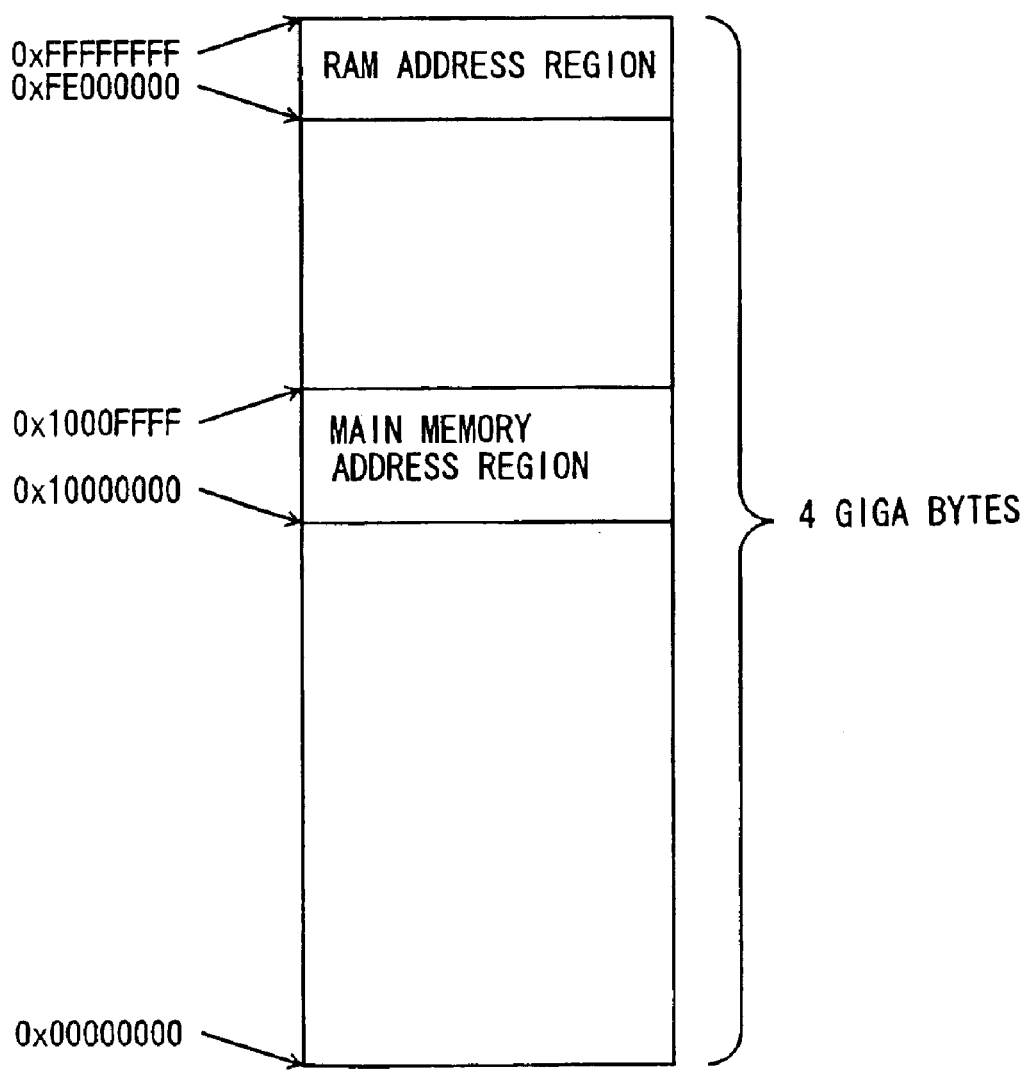
FIG. 36 is a diagram for explaining an address mapping of the cache computer of FIG. 35.

FIG. 36 shows an address mapping of the cache computer of FIG. 35. In the example of FIG. 36, an address space of 4 gigabytes is represented by a 32-bit address, and a consecutive 64-mega-byte address space of the main memory 329 is provided from "0x10000000" to "0x1000FFFF". Hereinafter, the address space of the main memory 329 is called the first address space. Further, in the address mapping of FIG. 36, a second address space that is separate from the first address space of the main memory 329 is assigned for the cache memory acting as the RAM. The second address space of the cache memory (the RAM) is provided from "0xFE000000" to "0xFFFFFFFF".

In the present embodiment, the cache computer is configured such that the second address space that does not overlap the first address space of the main memory 329 is assigned for the cache memory when the cache memory is acting as the RAM. The cache memory control method and computer of the present embodiment are effective in sufficiently increasing the access speed of the CPU to the main memory even when a program with which it is not expected to suitably construct the referential locality is executed by the CPU.

Figure 37:
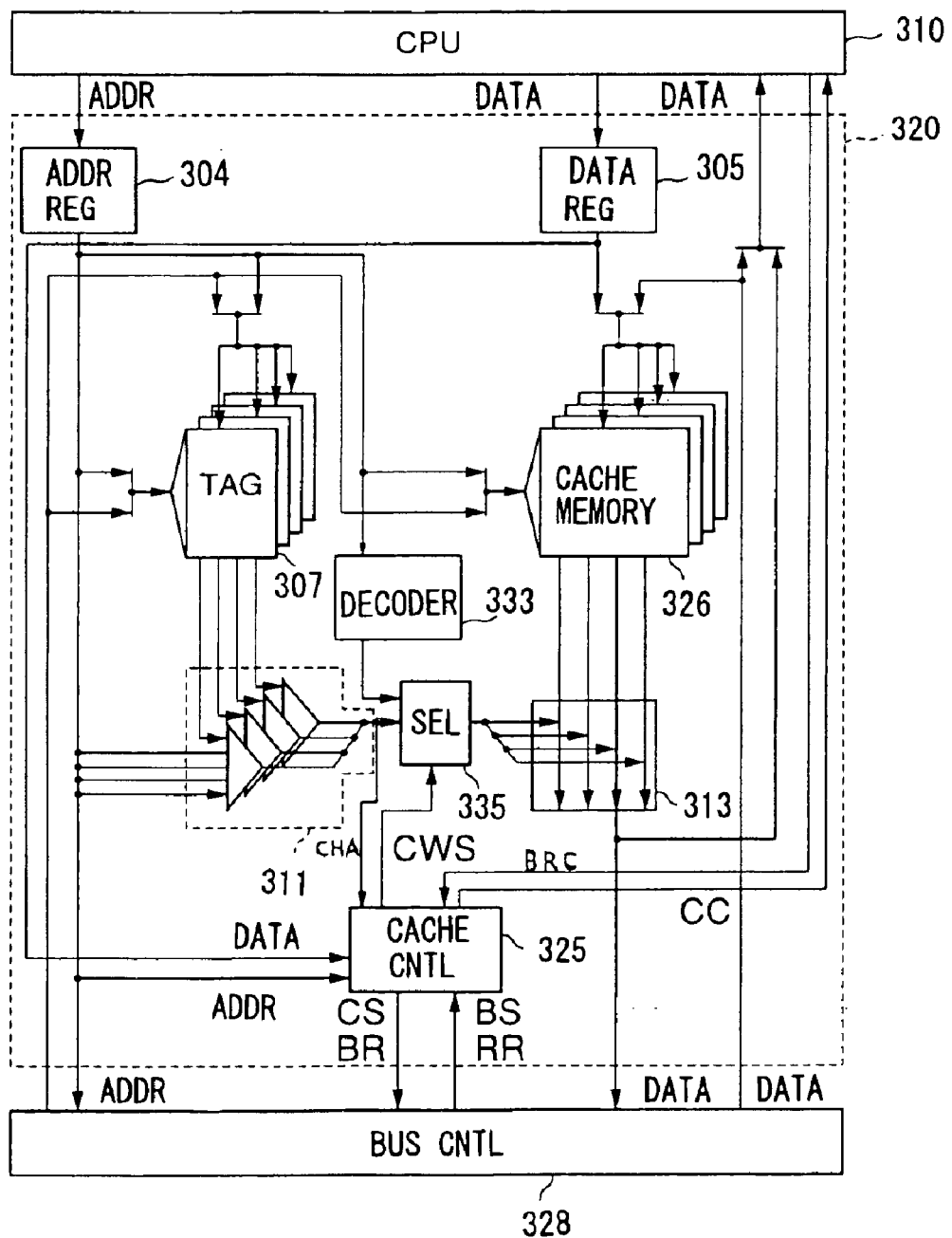
FIG. 37 is a block diagram of one preferred embodiment of the cache computer.

FIG. 37 shows a configuration of a 4-way set-associative cache computer to which one preferred embodiment of the cache computer of FIG. 35 is applied.

As shown in FIG. 37, the cache portion 320 of the present embodiment generally comprises an address register 304, a data register 305, a plurality of tags 307, a cache memory 326 having four cache ways, a decoder 333, a plurality of tag address comparators 311, a selector 335, a data selection unit 313, and the cache controller 325. The address register 304 and the data register 305 are connected to the cache controller 325. The address register 304 is connected to the decoder 333. The selector 335 has a first input to which the decoder 333 is connected, a second input to which the tag address comparators 311 are connected in parallel, and a third input to which the cache controller 325 is connected. The selector 335 has an output connected to the data selection unit 313.

Figure 38:
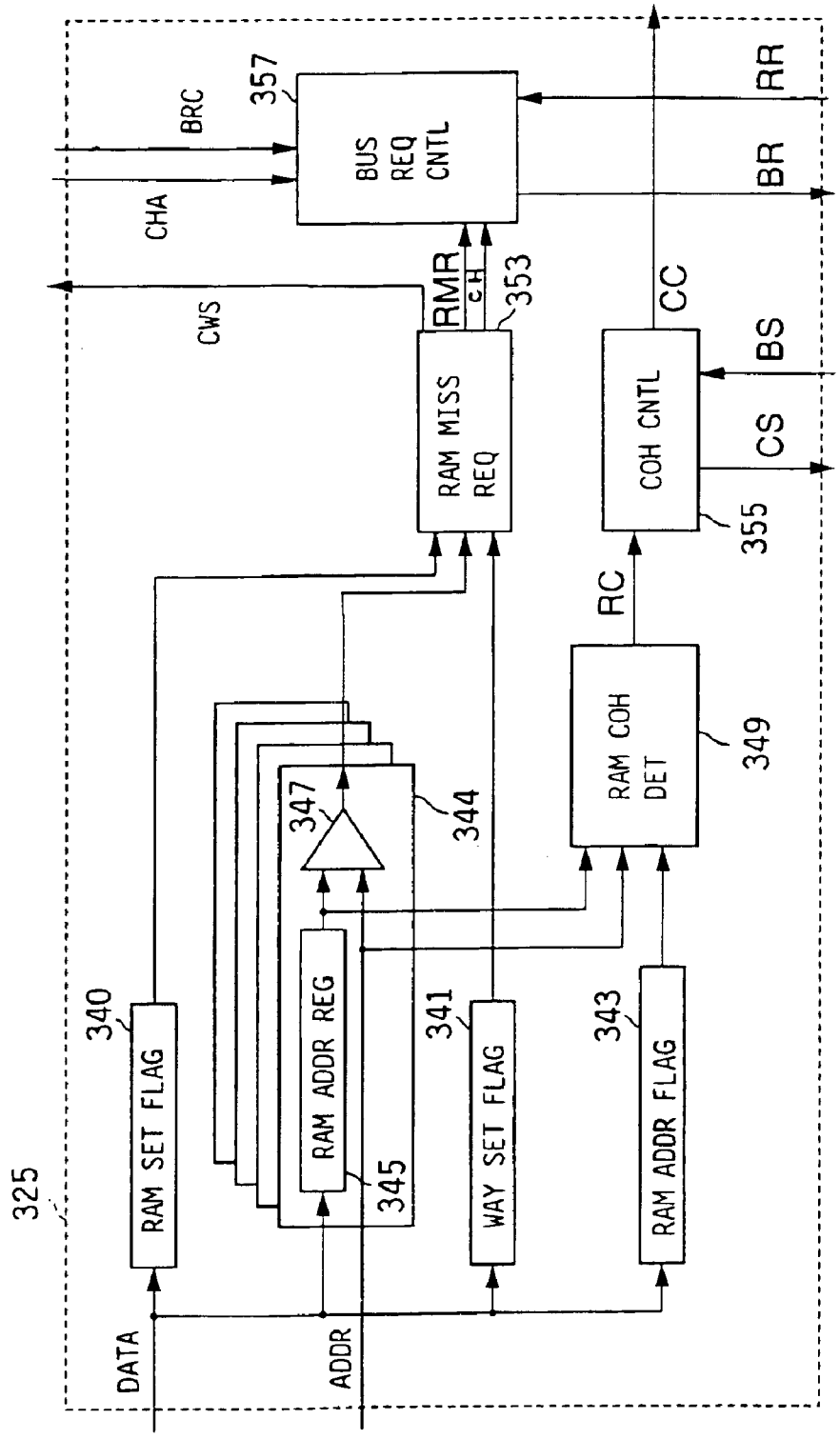
FIG. 38 is a block diagram of a cache controller in the cache computer of FIG. 37.

FIG. 38 shows a configuration of the cache controller 325 in the cache computer of FIG. 37.

As shown in FIG. 38, the cache controller 325 generally comprises an RAM setting flag 340, a way setting flag 341, an RAM address-region flag 323, four RAM address comparator units 344 (corresponding to the cache ways of the cache memory 326), an RAM coherence determination unit 349, an RAM miss request unit 353, a coherence control unit 355, and a bus request control unit 357. Each of the RAM address comparator unit 344 includes an RAM address register 345 and a comparator 347.

In the cache portion 320, the data register 305 is connected to the RAM setting flag 340, the RAM address comparator units 344, the way setting flag 341, and the RAM address-region flag 343, respectively. In each of the RAM address comparator units 344, the data register 305 is connected to the RAM address register 345, and the RAM address register 345 is connected to one of two inputs of the comparator 347. The address register 304 is connected to the other input of the comparator 347 of each RAM address comparator unit 344.

The RAM coherence determination unit 349 has a first input to which the RAM address register 345 is connected, a second input to which the address register 304, and a third. input to which the RAM address-region flag 343 is connected.

The RAM miss request unit 353 has a first input to which the RAM setting flag 340 is connected, a second input to which the comparator 347 is connected, and a third input to which the way setting flag 341 is connected. The RAM miss request unit 353 has a first output connected to the bus request control unit 357, and a second output connected to the selector 335.

The coherence control unit 355 has a first input to which the RAM coherence determination unit 349 is connected, and a second input to which the bus control unit 328 is connected. The coherence control unit 355 has a first output connected to the CPU 310, and a second output connected to the bus control unit 328. The bus request control unit 357 is connected to each of the CPU 310 and the bus control unit 328. The CPU 310 supplies a bus request control signal (BRC) to the bus request control unit 357.

In the cache computer of FIG. 38, the RAM setting flag 340 corresponds to the first unit 321 of FIG. 35, the way setting flag 341 corresponds to the second unit 322 of FIG. 35, the RAM address comparator units 344 correspond to the third unit 323 of FIG. 35, and the RAM address-region flag 343 corresponds to the fourth unit 324.

The above-described cache computer of FIG. 37 is configured to selectively operate in one of a normal mode and an RAM mode. When the cache computer is operating in the normal mode, the storage part 326 is acting as the cache memory. When the cache compute is operating in the RAM mode, the cache memory 326 is acting as the RAM. The normal-mode operation of the cache computer of the present embodiment is essentially the same as the operation of the conventional cache computer, and a description thereof will be omitted. A description will now be provided of the RAM-mode operation of the cache computer of the present embodiment.

Figure 39:
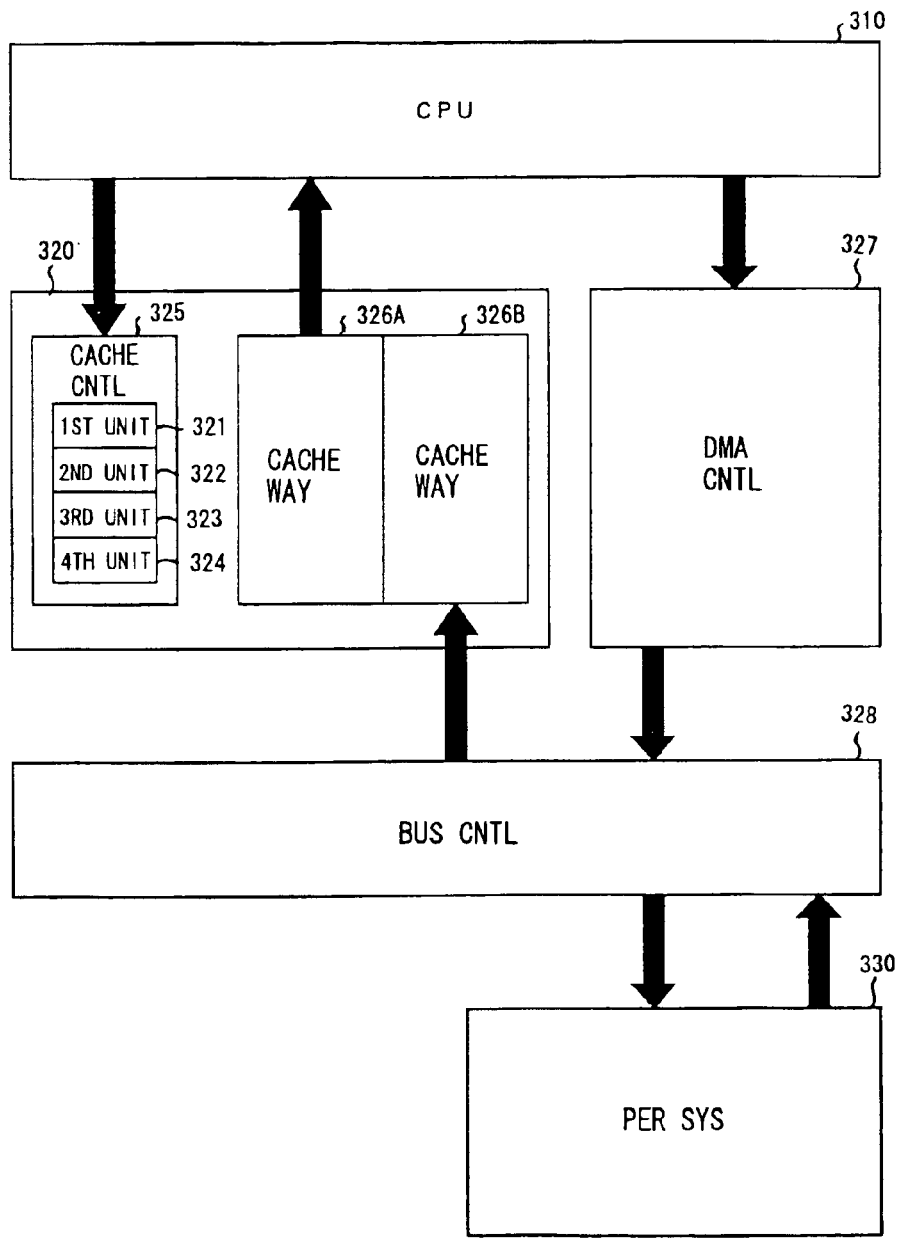
FIG. 39 is a diagram for explaining an operation of the cache computer of FIG. 37 when the CPU accesses an address space of the peripheral system.

FIG. 39 shows an RAM-mode operation of the cache computer of FIG. 37 when the CPU 310 accesses an address space of the peripheral system 330. For the sake of simplicity of description, it is assumed that the storage part 326 includes only two cache ways 326A and 326B as shown in FIG. 39.

At a start of the RAM-mode operation, shown in FIG. 39, the CPU 310 supplies an RAM-mode setting data to the cache controller 325 via the data register 305. The RAM-mode setting data, received from the CPU 310, sets the RAM setting flag 340 (the first unit 321) to one, which indicates that the cache memory 326 acts as the RAM. At the same time, the RAM-mode setting data sets the way setting flag 341 (the second unit 322) to a required value, which indicates which of the cache ways 326A and 326B acts as the RAM. In the present embodiment, suppose that, when the way setting flag 341 is set to one, both the cache ways 326A and 326B act as the RAM, and, when the way setting flag 341 is set to zero, one of the cache ways 326A and 326B acts as the RAM.

Further, the RAM-mode setting data, received from the CPU 310, causes the RAM address register 345 (the third unit 323) to hold a required address value that corresponds to the second address space of the cache memory 326 acting as the RAM. At the same time, the RAM-mode setting data sets the RAM address-region flag 343 (the fourth unit 324) to a required value, which indicates which of the second address space and a third address space is assigned for the cache memory acting as the RAM. In the present embodiment, the second address space (as shown in FIG. 36) is separate from the first address space of the main memory 329, and the third address space partially overlaps the first address space of the main memory 329. Suppose that, when the RAM address-region flag 343 is set to one, the second address space is assigned for the cache memory 326, and when the RAM address-region flag 343 is set to zero, the third address space is assigned for the cache memory 326.

Next, the CPU 310 instructs the DMA control circuit 327 to perform the DMA transfer of data from the peripheral system 330 to the cache memory 326 (the RAM). In response to the request of the CPU 310, the DMA control circuit 327 requests the bus control unit 328 to read out the data from the address space of the peripheral system 330. The bus control unit 328 requests the peripheral system 330 to send the data to the bus control unit 328, and the peripheral system 330 supplies the data to the bus control unit 328. When the data is received at the bus control unit 328, the bus control unit 328 performs the writing of the received data to, for example, the cache way 326A of the cache memory 326 (the RAM).

After the above-mentioned operation is performed, the CPU 310 accesses a certain address of the RAM. The address accessed by the CPU 310 is transferred to the comparator 347. The address accessed by the CPU 310 is compared with the RAM address (the RAM address space) sent by the RAM address register 345 at the comparator 347. The result of the comparison is sent from the comparator 347 to the RAM miss request unit 353.

When a match between the accessed address and the stored RAM address occurs at the comparator 347, the RAM miss request unit 353 sends a cache hit signal (CH) to the bus control unit 328. At the same time, the RAM miss request unit 353 supplies a cache way select signal (CWS) to the selector 335 in accordance with the signal sent by the way setting flag 341. The selector 335 supplies a select signal to the data selection unit 313 in accordance with both the cache way select signal (CWS) sent by the RAM miss request unit 353 and the decoded address sent by the decoder 333. The data selection unit 313 supplies the selected data, output by the cache memory 326, to both the CPU 310 and the bus control unit 328.

When a miss between the accessed address and the stored RAM address occurs at the comparator 347, the RAM miss request unit 353 sends an RAM miss request signal (RMR) to the bus request control unit 357. The bus request control unit 357 supplies a bus request signal (BR) to the bus control unit 328. The bus control unit 328 accesses the main memory 329 or the peripheral system 330 in accordance with the BR sent by the bus request control unit 357. When a request reception signal (RR) sent by the bus control unit 328 is received at the bus request control unit 357, the bus request control unit 357 terminates the sending of the bus request signal (BR).

In the above operation, when assigning the third address space, which partially overlaps the first address space of the main memory 329, for the cache memory acting as the RAM, the RAM coherence determination unit 349 is made active. The RAM coherence determination unit 349 determines the coherence between the stored RAM address sent by the RAM address register 345 and the accessed address sent by the address register 304, and sends an RAM coherence ON/OFF signal (RC) to the coherence control unit 355 in accordance with the result of the determination.

When the RC signal is set to one (ON), it indicates that maintaining the coherence is needed. When the RC signal is reset to zero (OFF), it indicates that maintaining the coherence is not needed. In the above operation, when the RC signal, sent to the coherence control unit 355, is set to one (ON), the coherence control unit 355 outputs a coherence control signal (CC) to the CPU 310 in order to maintain the coherence. At the same time, the coherence control unit 355 supplies a cache snoop signal (CS) to the bus control unit 328, in order to confirm that the main memory 329 is not updated by another CPU (not shown) of the peripheral system 330. In addition, a bus snoop signal (BS) is supplied to the coherence control unit 355 in order to confirm that the RAM of the cache memory 326 is not updated.

In the cache computer of the present embodiment, by performing the above-described operation, when the CPU 310 accesses a certain address of the cache memory (acting as the RAM) and a miss between the accessed address and the RAM address (RAM address space) stored in the RAM address register 345 occurs, the CPU 310 can read data from the peripheral system 330 in order to access the main memory 329 or the peripheral system 330. Therefore, the CPU 310 can access an external address outside the address space of the cache memory 326 (the RAM) as well as an internal address within the address space of the cache memory 326.

Figure 40:
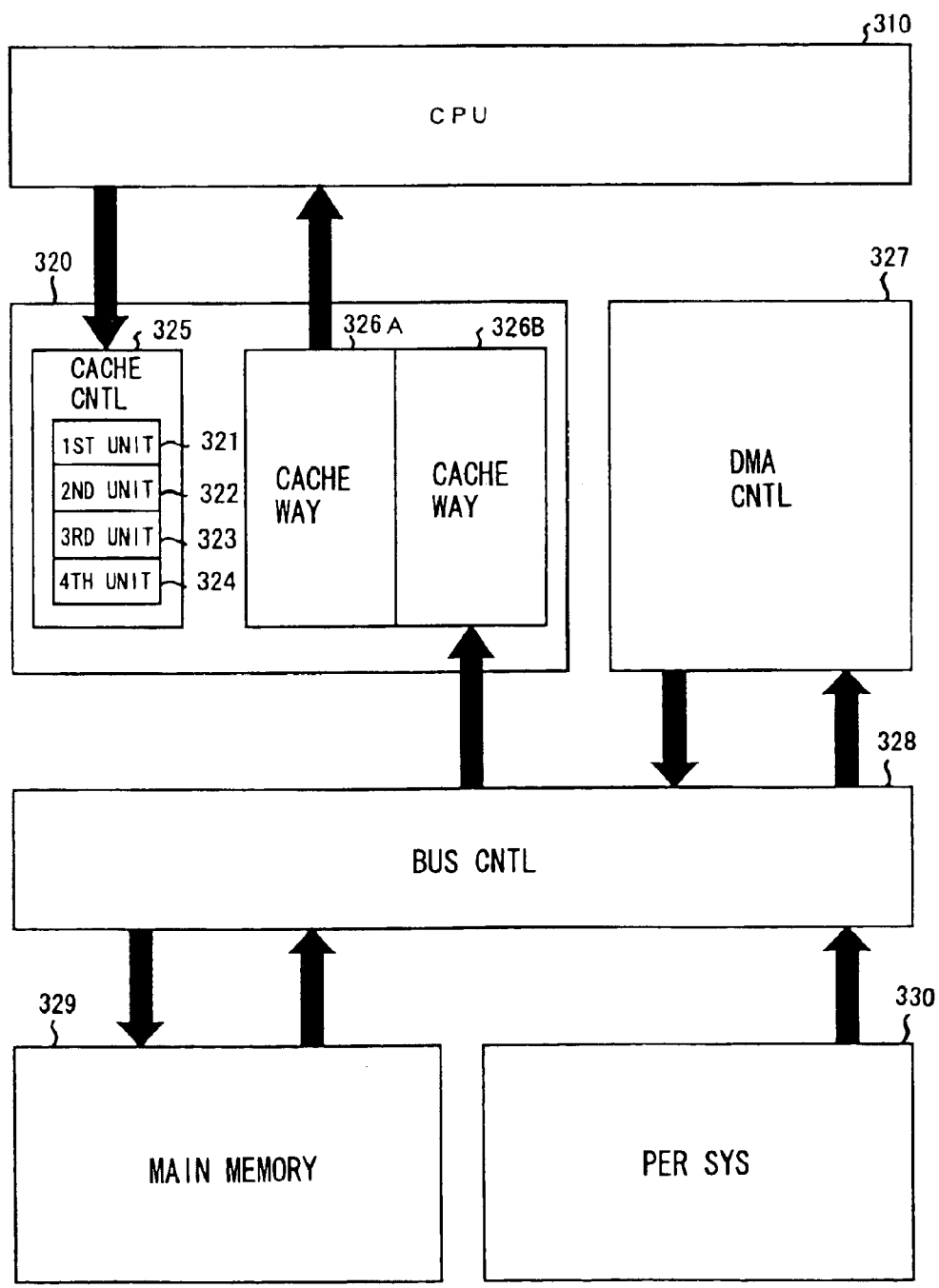
FIG. 40 is a diagram for explaining an operation of the cache computer of FIG. 37 when the CPU accesses an address space of the main memory.

FIG. 40 shows an operation of the cache computer of FIG. 37 when the CPU 310 accesses the address space of the main memory 329.

In the operation of the cache computer, shown in FIG. 40, the CPU 310 supplies the RAM-mode setting data to the cache controller 325 via the data register 305. The RAM-mode setting data, received from the CPU 310, sets the RAM setting flag 340 (the first unit 321) to one, which indicates that the cache memory 326 acts as the RAM. At the same time, the RAM-mode setting data sets the way setting flag 341 (the second unit 322) to the required value, which indicates which of the cache ways 326A and 326B acts as the RAM. In the present embodiment, suppose that, when the way setting flag 341 is set to one, both the cache ways 326A and 326B act as the RAM, and, when the way setting flag 341 is set to zero, one of the cache ways 326A and 326B acts as the RAM.

Further, the RAM-mode setting data, received from the CPU 310, causes the RAM address register 345 (the third unit 323) to hold the required address value that corresponds to the second address space of the cache memory 326 acting as the RAM. At the same time, the RAM-mode setting data sets the RAM address-region flag 343 (the fourth unit 324) to the required value, which indicates which of the second address space and the third address space is assigned for the cache memory acting as the RAM.

Next, the CPU 310 instructs the DMA control circuit 327 to perform the DMA transfer of data from the main memory 329 to the cache memory 326 (the RAM). In response to the request of the CPU 310, the DMA control circuit 327 requests the bus control unit 328 to read out the data from the address space of the main memory 329. The bus control unit 328 requests the main memory 329 to send the data to the bus control unit 328, and then the main memory 329 supplies the data to the bus control unit 328. When the data is received at the bus control unit 328, the bus control unit 328 performs the writing of the received data to, for example, the cache way 326A of the cache memory 326 (the RAM).

After the above-mentioned operation is performed, the CPU 310 accesses a certain address of the RAM. The address accessed by the CPU 310 is transferred to the comparator 347. The address accessed by the CPU 310 is compared with the RAM address (the RAM address space) sent by the RAM address register 345 at the comparator 347. The result of the comparison is sent from the comparator 347 to the RAM miss request unit 353.

When a match between the accessed address and the stored RAM address occurs at the comparator 347, the RAM miss request unit 353 sends a cache hit signal (CH) to the bus control unit 328. At the same time, the RAM miss request unit 353 supplies a cache way select signal (CWS) to the selector 335 in accordance with the signal sent by the way setting flag 341. The selector 335 supplies a select signal to the data selection unit 313 in accordance with both the cache way select signal (CWS) sent by the RAM miss request unit 353 and the decoded address sent by the decoder 333. The data selection unit 313 supplies the selected data, output by the cache memory 326, to both the CPU 310 and the bus control unit 328.

When a miss between the accessed address and the stored RAM address occurs at the comparator 347, the RAM miss request unit 353 sends an RAM miss request signal (RMR) to the bus request control unit 357. The bus request control unit 357 supplies a bus request signal (BR) to the bus control unit 328. When a request reception signal (RR) sent by the bus control unit 328 is received at the bus request control unit 357, the bus request control unit 357 terminates the sending of the bus request signal (BR). Then, the bus control unit 328 accesses the main memory 329 or the peripheral system 330.

In the above operation, when the CPU 310 accesses the address space of the cache memory (the RAM) and a miss between the accessed address and the RAM address (RAM address space) stored in the RAM address register 345 occurs, the CPU 310 accesses the main memory 329 or the peripheral system 330, so that the CPU 310 can read the data from the main memory 329.

Figure 41:
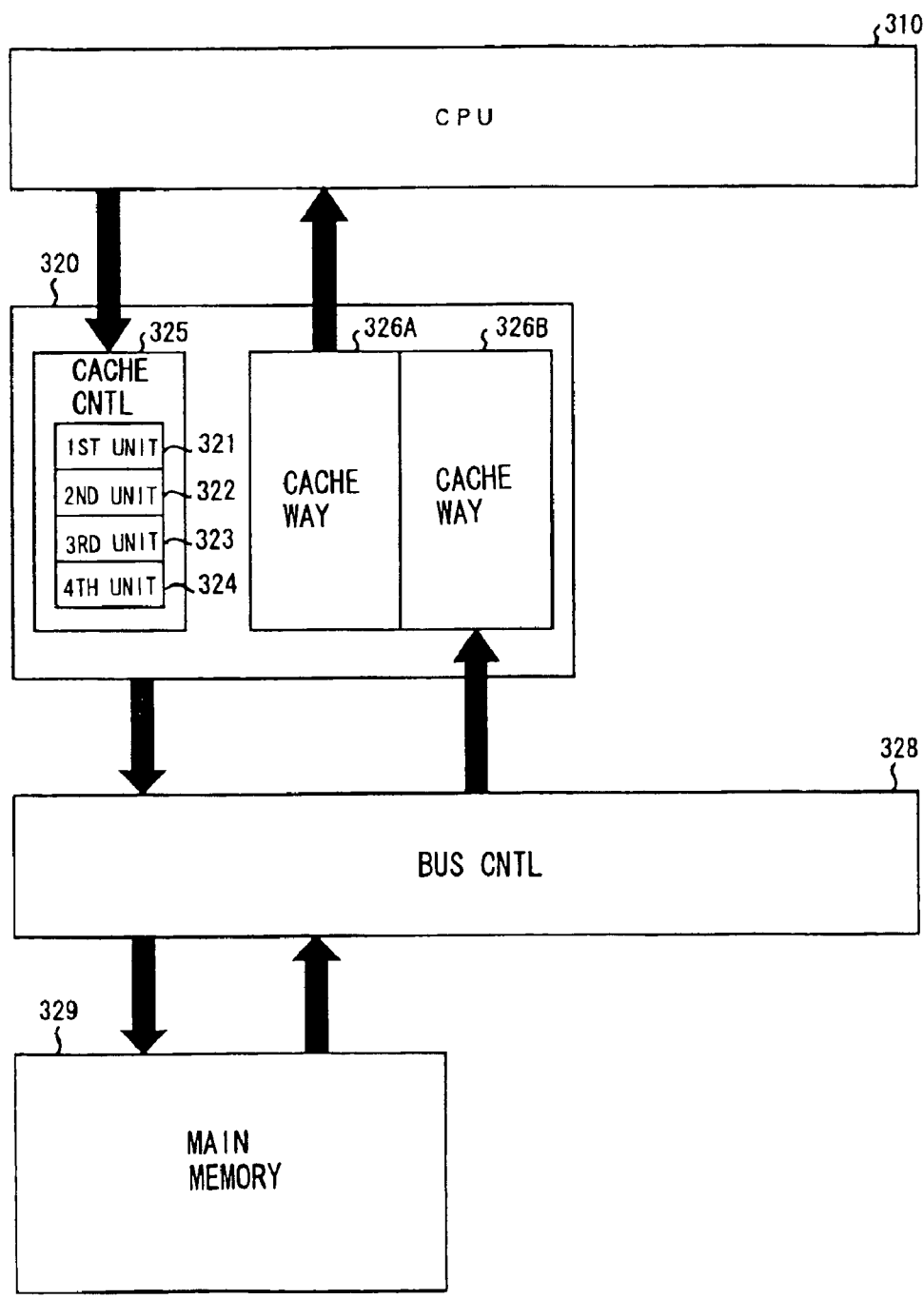
FIG. 41 is a diagram for explaining another operation of the cache computer of FIG. 37 when the CPU accesses the address space of the main memory.

FIG. 41 shows another operation of the cache computer of FIG. 37 when the CPU 310 accesses the address space of the main memory 329.

In the operation of the cache computer, shown in FIG. 41, the CPU 310 supplies the RAM-mode setting data to the cache controller 325 via the data register 305. The RAM-mode setting data, received from the CPU 310, sets the RAM setting flag 340 (the first unit 321) to one, which indicates that the cache memory 326 acts as the RAM. At the same time, the RAM-mode setting data sets the way setting flag 341 (the second unit 322) to the required value, which indicates which of the cache ways 326A and 326B acts as the RAM. In the present embodiment, suppose that, when the way setting flag 341 is set to one, both the cache ways 326A and 326B act as the RAM, and, when the way setting flag 341 is set to zero, one of the cache ways 326A and 326B acts as the RAM.

Further, the RAM-mode setting data, received from the CPU 310, causes the RAM address register 345 (the third unit 323) to hold the required address value that corresponds to the second address space of the cache memory 326 acting as the RAM. At the same time, the RAM-mode setting data sets the RAM address-region flag 343 (the fourth unit 324) to the required value, which indicates which of the second address space and the third address space is assigned for the cache memory acting as the RAM.

Next, the CPU 310 instructs the cache memory 326 to transfer data from the main memory 329 to the cache memory 326 (the RAM). In response to the request of the CPU 310, the cache memory 326 requests the bus control unit 328 to read out the data from the address space of the main memory 329. The bus control unit 328 requests the main memory 329 to send the data to the bus control unit 328, and then the main memory 329 supplies the data to the bus control unit 328. When the data is received at the bus control unit 328, the bus control unit 328 performs the writing of the received data to, for example, the cache way 326A of the cache memory 326 (the RAM).

After the above-mentioned operation is performed, the CPU 310 accesses a certain address of the RAM. The address accessed by the CPU 310 is transferred to the comparator 347. The address accessed by the CPU 310 is compared with the RAM address (the RAM address space) sent by the RAM address register 345 at the comparator 347. The result of the comparison is sent from the comparator 347 to the RAM miss request unit 353.

When a match between the accessed address and the stored RAM address occurs at the comparator 347, the RAM miss request unit 353 sends a cache hit signal (CH) to the bus control unit 328. At the same time, the RAM miss request unit 353 supplies a cache way select signal (CWS) to the selector 335 in accordance with the signal sent by the way setting flag 341. The selector 335 supplies a select signal to the data selection unit 313 in accordance with both the cache way select signal (CWS) sent by the RAM miss request unit 353 and the decoded address sent by the decoder 333. The data selection unit 313 supplies the selected data, output by the cache memory 326, to both the CPU 310 and the bus control unit 328.

When a miss between the accessed address and the stored RAM address occurs at the comparator 347, the RAM miss request unit 353 sends an RAM miss request signal (RMR) to the bus request control unit 357. The bus request control unit 357 supplies a bus request signal (BR) to the bus control unit 328. When a request reception signal (RR) sent by the bus control unit 328 is received at the bus request control unit 357, the bus request control unit 357 terminates the sending of the bus request signal (BR). Then, the bus control unit 328 accesses the main memory 329 or the peripheral system 330.

In the above operation, when the CPU 310 accesses the address space of the cache memory (the RAM) and a miss between the accessed address and the RAM address (RAM address space) stored in the RAM address register 345 occurs, the CPU 310 accesses the main memory 329 or the peripheral system 330, so that the CPU 310 can read the data from the main memory 329.

In the above-described operations of FIG. 39 through FIG. 41, the CPU 310 instructs, while the cache way 326A is being accessed, the DMA control circuit 327 to perform the DMA transfer of the next needed data, so that the next needed data, sent from the main memory 329 by the bus control unit 328, is written to the cache way 326B of the cache memory. After the access to the cache way 326A is completed, the CPU 310 immediately accesses the cache way 326B. Hence, the cache memory control method and computer of the present embodiment is effective in increasing the access speed of the CPU to the main memory even when a program with which it is not expected to suitably construct the referential locality is executed by the CPU.

Figure 42:
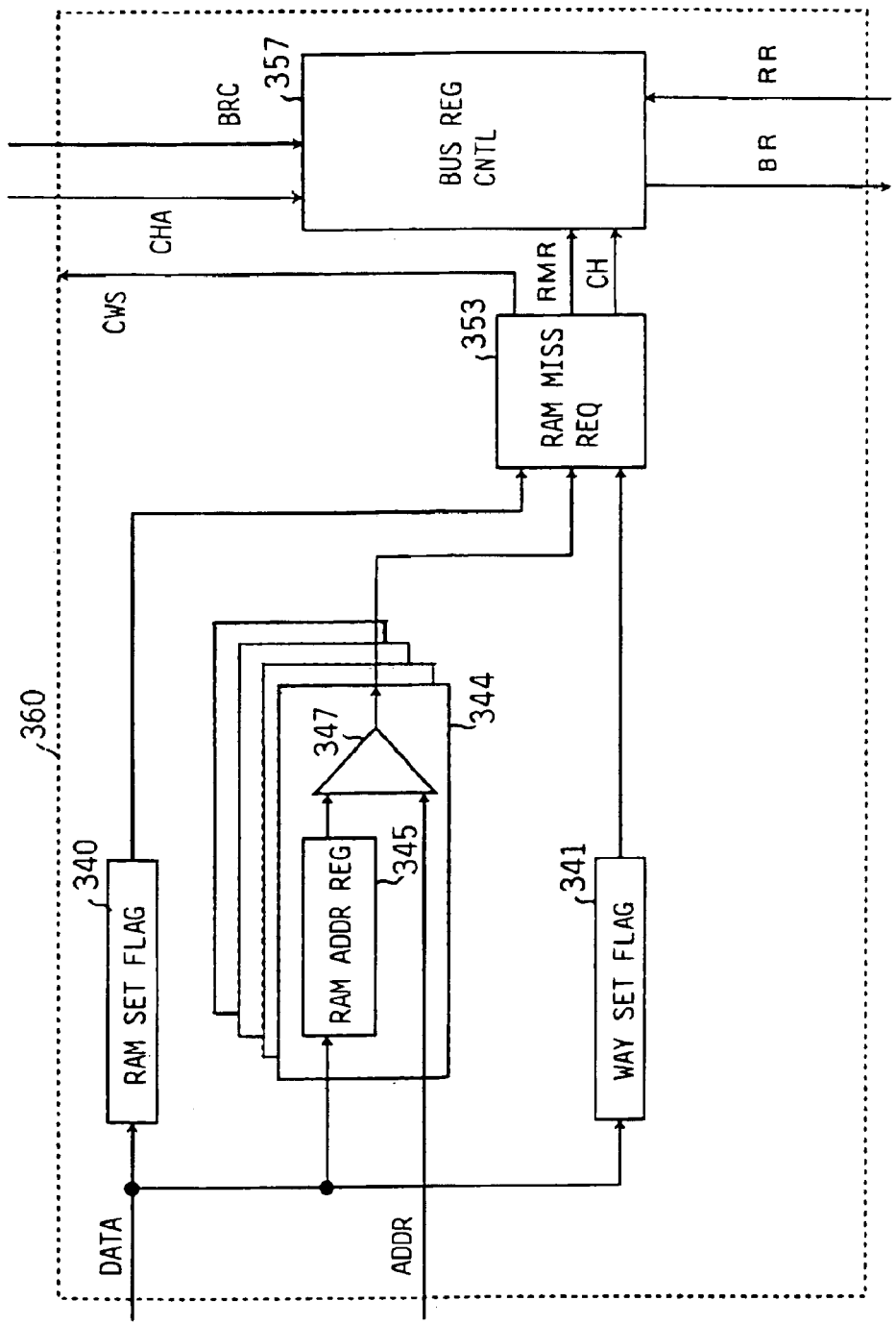
FIG. 42 is a block diagram of a cache controller in another preferred embodiment of the cache computer.

FIG. 42 shows a configuration of a cache controller in another preferred embodiment of the cache computer.

As shown in FIG. 42, the cache controller 360 of the present embodiment is similar to the cache controller 325 of FIG. 38 except that it does not include the RAM address-region flag 343, the RAM coherence determination unit 349 and the coherence control unit 355 as in the previous embodiment of FIG. 38.

The cache computer of the present embodiment is configured to allow the cache memory 326 to act as the RAM and assign the second address space, which is separate from the first address space of the main memory 329, for the cache memory 326 when the cache memory 326 is acting as the RAM. When it is assumed that the CPU 310 solely accesses the main memory 329 or the RAM, it is not necessary to maintain the coherence between the main memory 329 and the RAM, as in the present embodiment. Hence, the cache computer of the present embodiment is not provided with the RAM coherence determination unit 349 or the like.

According to the above-described embodiment, it is possible to reduce the size of the cache computer and lower the manufacture cost when the second address space is assigned for the cache memory 326 acting as the RAM, and the CPU 310 solely accesses the main memory 329 or the RAM.

The present invention is not limited to the above-described preferred embodiments, and variations and modifications may be made without departing from the scope of the present invention.

Further, the present invention is based on Japanese priority application No. 11-281958, filed on Oct. 1, 1999, Japanese priority application No. 11-311455, filed on Nov. 1, 1999, and Japanese priority application No. 11-345824, filed on Dec. 6, 1999, the entire contents of which are hereby incorporated by reference.

What is claimed is:

1. A computer including a main memory and a cache memory, the main memory having a first address space and the cache memory being capable of acting as a random access memory, comprising:

a determination unit which determines whether the cache memory is acting as the random access memory;

an assignment unit which assigns a second address space, which is separate from the first address space of the main memory, for the cache memory when the cache memory is acting as the random access memory; and a selection unit which selects one of a first assignment state and a second assignment state for the cache memory in response to a control signal, wherein, when the first assignment state is selected by the selection unit, the second address space is assigned for the cache memory, and when the second assignment state is selected by the selection unit, a third address space that partially overlaps the first address space is assigned for the cache memory.

2. The computer according to claim 1, further comprising:

a bus control unit connecting the main memory and the cache memory;

a peripheral system connected to the computer through the bus control unit; and an access control unit which accesses one of the main memory or the peripheral system instead of the cache memory when the cache memory is acting as the random access memory and an access request externally sent from an address outside the second address space of the cache memory is received.

3. The computer according to claim 1 further comprising a cache controller controlling the cache memory, the cache controller comprising:

a first unit performing a switching to allow the cache memory to act as the random access memory;

a second unit setting a range of the cache memory in which the cache memory is acting as the random access memory;

a third unit setting an address space of the random access memory; and a fourth unit receiving a notification from the cache memory when an address space of the cache memory acting as the random access memory is accessed, and accessing an external storage device when an address outside the address space of the cache memory is accessed.

4. A system which controls a cache memory that is connected to a main memory with a first address space of a memory map and capable of acting as a random access memory, comprising:

a determining unit which determines whether the cache memory is acting as the random access memory;

an assigning unit which assigns a second address space of the memory map, which is separate from the first address space of the main memory, for the cache memory when the cache memory is acting as the random access memory; and a selection unit which selects one of a first assignment state and a second assignment state for the cache memory in response to a control signal, wherein, when the first assignment state is selected by the selection unit, the second address space is assigned for the cache memory, and when the second assignment state is selected by the selection unit, a third address space that partially overlaps the first address space is assigned for the cache memory.

5. The system according to claim 4 further comprising:

a bus control unit connecting the main memory and the cache memory;

a peripheral system connected to a computer through the bus control unit; and an access control unit which accesses one of the main memory or the peripheral system instead of the cache memory when the cache memory is acting as the random access memory and an access request externally sent from an address outside the second address space of the cache memory is received.

6. The system according to claim 4 further comprising a cache controller controlling the cache memory, the cache controller comprising:

a first unit performing a switching to allow the cache memory to act as the random access memory;

a second unit setting a range of the cache memory in which the cache memory is acting as the random access memory;

a third unit setting an address space of the random access memory; and a fourth unit receiving a notification from the cache memory when an address space of the cache memory acting as the random access memory is accessed, and accessing an external storage device when an address outside the address space of the cache memory is accessed.

* * * * *

UNITED STATES PATENT AND TRADEMARK OFFICE
CERTIFICATE OF CORRECTION

PATENT NO. : 6,868,472 B1
DATED : March 15, 2005
INVENTOR(S) : Hideo Miyake et al.

It is certified that error appears in the above-identified patent and that said Letters Patent is hereby corrected as shown below:

Item [56], References Cited, FOREIGN PATENT DOCUMENTS, change
"EP 0 568 221 4/1993" to -- EP 0 568 221 11/1993 --.

Column 42,
Line 48, after "claim 4" insert -- , --.
Line 59, after "claim 6" insert -- , --.

Signed and Sealed this

Fourteenth Day of February, 2006

JON W. DUDAS
*Director of the United States Patent and Trademark Office*